(12) United States Patent
Furuya et al.

(10) Patent No.: US 11,508,344 B2
(45) Date of Patent: Nov. 22, 2022

(54) INFORMATION PROCESSING DEVICE, INFORMATION PROCESSING METHOD AND PROGRAM

(71) Applicant: SONY CORPORATION, Tokyo (JP)

(72) Inventors: Shinichi Furuya, Tokyo (JP); Takanori Oku, Tokyo (JP)

(73) Assignee: SONY CORPORATION, Tokyo (JP)

( * ) Notice: Subject to any disclaimer, the term of this patent is extended or adjusted under 35 U.S.C. 154(b) by 227 days.

(21) Appl. No.: 16/956,116

(22) PCT Filed: Oct. 22, 2018

(86) PCT No.: PCT/JP2018/039144
§ 371 (c)(1),
(2) Date: Jun. 19, 2020

(87) PCT Pub. No.: WO2019/130755
PCT Pub. Date: Jul. 4, 2019

(65) Prior Publication Data
US 2021/0104213 A1  Apr. 8, 2021

(30) Foreign Application Priority Data

Dec. 27, 2017 (JP) .............................. JP2017-250392
Aug. 28, 2018 (JP) .............................. JP2018-159382

(51) Int. Cl.
*G10G 1/02* (2006.01)
*G06F 3/01* (2006.01)
(Continued)

(52) U.S. Cl.
CPC ............... *G10G 1/02* (2013.01); *G06F 3/016* (2013.01); *G06V 40/107* (2022.01); *G06V 40/28* (2022.01); *G09B 15/023* (2013.01); *G09B 15/08* (2013.01)

(58) Field of Classification Search
CPC .......... G10G 1/02; G06F 3/016; G09B 15/023
See application file for complete search history.

(56) References Cited

U.S. PATENT DOCUMENTS 4,635,516 A * 1/1987 Giannini .................. G10H 1/32
84/DIG. 8
4,905,560 A * 3/1990 Suzuki ................. G10H 1/0558
600/595

(Continued)

FOREIGN PATENT DOCUMENTS

CN     102039042 A    5/2011
CN     201946292 U    8/2011
(Continued)

OTHER PUBLICATIONS

Tindale et al., Training Surrogate Sensors in Musical Gesture Acquisition Systems, IEEE Transactions on Multimedia, Feb. 2011, pp. 50-59, vol. 13, No. 1, IEEE.
(Continued)

*Primary Examiner* — Robert W Horn
(74) *Attorney, Agent, or Firm* — Paratus Law Group, PLLC

(57) ABSTRACT

There is provided an information processing device, an information processing method and a program that provide, as feedback to a user, information based on a level of collaboration of multiple movement elements in a performance provided by collaborative or non-collaborative moves of multiple parts of a body of the user and that are usable to support mastering a performance. The information processing device includes a sensing data acquisition unit configured to acquire multiple sets of sensing data from at least one sensors configured to sense a condition of multiple movement elements in a performance that is performed because multiple parts of a body of a user move; a calculator configured to calculate collaboration information represent- (Continued)

ing move collaborativeness of the movement elements from the acquired multiple sets of sensing data; and a notification unit configured to notify the user of feedback information based on the calculated collaboration information is provided.

20 Claims, 30 Drawing Sheets

(51) Int. Cl.
*G09B 15/02* (2006.01)
*G09B 15/08* (2006.01)
*G06V 40/20* (2022.01)
*G06V 40/10* (2022.01)

(56) References Cited

U.S. PATENT DOCUMENTS

| | | | | |
|---|---|---|---|---|
| 5,025,705 | A * | 6/1991 | Raskin | G10H 1/344 84/478 |
| 5,029,508 | A * | 7/1991 | Suzuki | G10H 1/34 84/742 |
| 5,046,394 | A * | 9/1991 | Suzuki | G10H 1/34 84/718 |
| 5,127,301 | A * | 7/1992 | Suzuki | G10H 1/00 84/670 |
| 5,151,553 | A * | 9/1992 | Suzuki | G10H 1/0558 341/20 |
| 5,166,463 | A * | 11/1992 | Weber | G10H 1/00 84/645 |
| 5,216,193 | A * | 6/1993 | Masubuchi | G10H 1/0558 84/626 |
| 5,338,891 | A * | 8/1994 | Masubuchi | G10H 1/0558 84/670 |
| 5,429,140 | A * | 7/1995 | Burdea | A63B 21/008 600/587 |
| 5,516,249 | A * | 5/1996 | Brimhall | E02F 9/2008 703/3 |
| 5,571,020 | A * | 11/1996 | Troudet | G09B 19/00 341/20 |
| 5,581,484 | A * | 12/1996 | Prince | G06F 3/014 340/407.1 |
| 5,631,861 | A * | 5/1997 | Kramer | G06F 3/016 703/7 |
| 5,716,352 | A * | 2/1998 | Viola | B25J 3/00 606/1 |
| 5,945,978 | A * | 8/1999 | Holmes | G06F 3/014 345/157 |
| 5,963,331 | A * | 10/1999 | Arai | A61B 5/4528 356/628 |
| 6,042,555 | A * | 3/2000 | Kramer | G06F 3/014 600/595 |
| 6,049,327 | A * | 4/2000 | Walker | G01B 7/287 345/158 |
| 6,110,130 | A * | 8/2000 | Kramer | A61B 5/4528 600/595 |
| 6,141,643 | A * | 10/2000 | Harmon | G10L 21/06 340/407.1 |
| 6,262,355 | B1 * | 7/2001 | Koch | G10H 1/34 84/723 |
| 6,388,181 | B2 * | 5/2002 | Moe | G09B 15/08 84/478 |
| 7,381,884 | B1 * | 6/2008 | Atakhanian | G10H 1/34 84/723 |
| 7,582,825 | B2 * | 9/2009 | Chien | G09B 15/08 84/723 |
| 7,674,969 | B2 * | 3/2010 | Xu | G10H 1/34 84/615 |
| 7,772,474 | B2 * | 8/2010 | Osuga | G10C 3/12 84/174 |
| 8,255,079 | B2 * | 8/2012 | Linn | B25J 13/025 700/250 |
| 8,338,684 | B2 * | 12/2012 | Pillhofer | G09B 15/00 84/483.2 |
| 8,362,350 | B2 * | 1/2013 | Kockovic | G10H 1/34 84/743 |
| 8,620,661 | B2 * | 12/2013 | Ramstrum | G10L 13/06 84/645 |
| 8,766,077 | B2 * | 7/2014 | Soejima | G09B 5/06 84/477 R |
| 8,895,829 | B2 * | 11/2014 | Soejima | G09B 15/06 84/467 |
| 8,957,296 | B2 * | 2/2015 | Helms | G10H 1/0016 84/669 |
| 9,262,940 | B2 * | 2/2016 | Farber | G09B 15/04 |
| 9,652,038 | B2 * | 5/2017 | Osman | G06F 3/0346 |
| 9,750,290 | B2 * | 9/2017 | Carey | A41D 19/01582 |
| 9,905,207 | B2 * | 2/2018 | Louhivuori | G10H 1/365 |
| 10,055,019 | B2 * | 8/2018 | Beran | G06F 3/0304 |
| 10,121,388 | B2 * | 11/2018 | Seim | G09B 21/003 |
| 10,255,894 | B1 * | 4/2019 | Bonner | G06F 3/02 |
| 10,437,335 | B2 * | 10/2019 | Daniels | G06F 3/014 |
| 10,446,048 | B2 * | 10/2019 | Wang | G09B 15/00 |
| 10,466,784 | B2 * | 11/2019 | Cohen | B25J 13/025 |
| 10,732,711 | B2 * | 8/2020 | Rubin | G06T 19/006 |
| 10,761,605 | B1 * | 9/2020 | Sunshine | A41D 19/0024 |
| 10,809,804 | B2 * | 10/2020 | Goupil | G06F 3/016 |
| 10,810,984 | B2 * | 10/2020 | Katsuta | G10H 1/344 |
| 10,860,102 | B2 * | 12/2020 | Remaley | G02B 27/0172 |
| 10,895,914 | B2 * | 1/2021 | Young | A63F 13/245 |
| 11,229,787 | B2 * | 1/2022 | Daniels | A61N 1/025 |
| 2006/0137511 | A1 * | 6/2006 | McGregor | G09B 15/023 84/478 |
| 2012/0139731 | A1 | 6/2012 | Razoumov et al. | |
| 2014/0180632 | A1 | 6/2014 | Yataka | |
| 2019/0213904 | A1 * | 7/2019 | Wang | G06F 3/017 |
| 2021/0104213 | A1 * | 4/2021 | Furuya | G10G 1/00 |
| 2021/0319715 | A1 * | 10/2021 | Kitazawa | G10H 1/0058 |
| 2021/0350773 | A1 * | 11/2021 | Furuya | A61B 5/1118 |
| 2021/0383714 | A1 * | 12/2021 | Furuya | G09B 5/00 |

FOREIGN PATENT DOCUMENTS

| | | |
|---|---|---|
| CN | 103657030 A | 3/2014 |
| CN | 103721398 A | 4/2014 |
| CN | 104025004 A | 9/2014 |
| CN | 106310660 A | 1/2017 |
| JP | H11-133953 A | 5/1999 |
| JP | 2000-056669 A | 2/2000 |
| JP | 2006-162916 A | 6/2006 |
| JP | 2010-057611 A | 3/2010 |
| JP | 2011-087794 A | 5/2011 |
| JP | 2016-087420 A | 5/2016 |
| JP | 2017-055913 A | 3/2017 |
| WO | WO 2015/107737 A1 | 7/2015 |
| WO | WO 2015/155977 A1 | 10/2015 |

OTHER PUBLICATIONS

Ji, Kinesthetic Human-Robot Interaction based Learning from Demonstration technology for humanoid robot, A Thesis for Mechanical Engineering, China Excellent Master Dissertation Full-text Database Information Technology Series, Dec. 2016, pp. 1-109.

* cited by examiner

INFORMATION PROCESSING DEVICE, INFORMATION PROCESSING METHOD AND PROGRAM

CROSS REFERENCE TO PRIOR APPLICATION

This application is a National Stage Patent Application of PCT International Patent Application No. PCT/JP2018/039144 (filed on Oct. 22, 2018) under 35 U.S.C. § 371, which claims priority to Japanese Patent Application Nos. 2017-250392 (filed on Dec. 27, 2017) and 2018-159382 (filed on Aug. 28, 2018), which are all hereby incorporated by reference in their entirety.

FIELD

The present disclosure relates to an information processing device, an information processing method and a program.

BACKGROUND

A performance, such as playing piano, stands on a complicated and collaborative or non-collaborative combination of a large number of movement elements caused by moves of a large number of parts (such as fingers, shoulders, elbows and muscles) of the body of a person. Accordingly, in the aforementioned performance, it is not necessarily possible to realize a perfect performance even when each movement element is in a preferable condition and causing a large number of movement elements to collaborate preferably or not to collaborate makes it possible to realize a perfect performance.

Easily usable various sensors have been developed in recent years and accordingly approaches in which movement elements in a performance are sensed and the sensing result is provided as feedback and is thereby utilized to support mastering the performance have been made. The following Patent Literature 1 discloses a device that senses moves of multiple persons and provides feedback based on the obtained sensing data.

CITATION LIST

Patent Literature

Patent Literature 1: Japanese Laid-open Patent Publication No. 2011-87794

Technical Problem

As described above, a performance, such as playing piano, stands on collaboration or non-collaboration of a large number of movement elements are represented by a function of several variables using a large number of motion elements as variables. Accordingly, as for movement that is represented by a function of several variables, a large number of variables makes it is difficult to analyze mutual collaborativeness and relationship. For this reason, an approach in which a level of collaboration of multiple movement elements in the performance is calculated and the calculated level of collaboration is provided as feedback to lead to mastering the performance has not been made.

The disclosure thus proposes a new and novel information processing device that provides, as feedback to a user, information based on a level of collaboration of multiple movement elements in a performance provided by collaborative or non-collaborative moves of multiple parts of a body of the user and that is usable to support mastering a performance; an information processing method; and a program.

Solution to Problem

According to the disclosure, an information processing device is provided that includes: a sensing data acquisition unit configured to acquire multiple sets of sensing data from at least one sensors configured to sense a condition of multiple movement elements in a performance that is performed because multiple parts of a body of a user move; a calculator configured to calculate collaboration information representing move collaborativeness of the movement elements from the acquired multiple sets of sensing data; and a notification unit configured to notify the user of feedback information based on the calculated collaboration information.

Moreover, according to the disclosure, an information processing method is provided that includes: acquiring multiple sets of sensing data from at least one sensors configured to sense a condition of multiple movement elements in a performance that is performed because multiple parts of a body of a user move; calculating collaboration information representing move collaborativeness of the movement elements from the acquired multiple sets of sensing data; and notifying the user of feedback information based on the calculated collaboration information.

Moreover, according to the disclosure, a program is provided that causes a computer to implement functions including: acquiring multiple sets of sensing data from at least one sensors configured to sense a condition of multiple movement elements in a performance that is performed because multiple parts of a body of a user move; calculating collaboration information representing move collaborativeness of the movement elements from the acquired multiple sets of sensing data; and notifying the user of feedback information based on the calculated collaboration information.

Advantageous Effects of Invention

As described above, according to the disclosure, it is possible to provide a new and novel information processing device that provides, as feedback to a user, information based on a level of collaboration of multiple movement elements in a performance provided by collaborative or non-collaborative moves of multiple parts of a body of the user and that is usable to support mastering a performance; an information processing method; and a program.

The above-described effect is not necessarily definitive and, together with the above-described effect, or instead of the above-described effect, any one of the effects represented in the specification or another effect that can be known from the specification may be derived.

DESCRIPTION OF EMBODIMENTS

Figure 1:
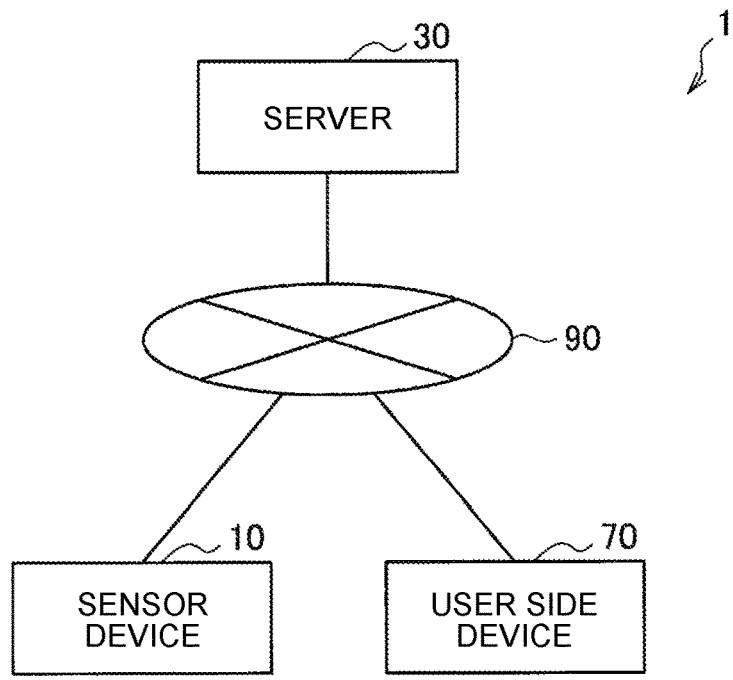
FIG. 1 is an explanatory view to explain an examplary configuration of an information processing system 1 according to an embodiment of the disclosure.

With reference to the accompanying drawings, preferable embodiments of the disclosure will be described below in detail. In the description and drawings, components that have substantially the same functions are denoted with the same numbers and redundant description is thus omitted.

In the specification and the drawings, multiple components having substantially the same or similar functional configurations may be distinguished by adding different numbers to the end of the same numbers. When it is not particularly necessary to distinguish multiple components having substantially the same or similar functional configurations, only the same numbers are added. Similar components between different embodiments may be distinguished from each other by adding different alphabets to the ends of the same numbers. Note that when it is not particularly necessary to distinguish the similar components, only the same numbers are added.

Description will be given in the following order.
1. How Embodiments of Disclosure were created
2. Embodiments of Disclosure
  2.1. Overview of Information Processing System 1 according to Embodiment of Disclosure
  2.2. Configuration. of Sensor Device 10 according to Embodiment of Disclosure
  2.3. Configuration of Server 30 according to Embodiment of Disclosure
  2.4. Configuration of User Side Device 70 according to Embodiment of Disclosure
  2.5. Information Processing Method according to Embodiment of Disclosure
3. Examples of Embodiment of Disclosure
  3.1. Example 1
  3.2. Example 2
  3.3. Other Application Examples
4. Summary
5. About. Hardware Configuration
6. Second Embodiment
  6.1. Modification 1
  6.2. Modification 2
  6.3. Modification 1
7. Third Embodiment
8. Supplement

1. HOW EMBODIMENTS OF DISCLOSURE WERE CREATED

Before embodiments according to the disclosure will be described, the background of creation of the embodiments according to the disclosure by the inventors will be described.

As described above, a performance, such as music instrument playing like piano playing, stands on a complicated and collaborative or non-collaborative combination of a large number of movement elements caused by moves of a large number of parts (such as fingers, shoulders, elbows and muscles) of the body of a person. For example, in piano playing, joints of hand fingers and elbows collaboratively move and the right hand fingers and left hand fingers move non-collaboratively and independently. Accordingly, in piano playing, etc., even when a single movement element, such as move of one hand finger, preferably moves, it is not necessarily possible to realize a perfect performance. In other words, it possible to realize a perfect performance by causing a large number of movement elements to collaborate preferably or not to collaborate such that joints of hand fingers and elbows move collaboratively or the right hand fingers and the left hand fingers move independently and non-collaboratively.

In a performance, such as piano playing, stands on collaboration or non-collaboration of a large number of movement elements and thus can be referred to as movement that is represented by a function of several variables using a large number of motion elements as variables. Accordingly, as for movement that is represented by a function of several variables, a large number of variables makes it difficult to analyze mutual collaborativeness and relationship. For this reason, scientific and quantitative movement scientific analysis that is performed on a move in sports (such as hitting with a baseball bat or hitting with a tennis racket) representable by a variable function formed of a single variable or a small number of variables has not been performed on piano playing, etc.

Measuring each movement element and muscle activities of a player during piano playing and providing the result of measuring as feedback to the player have been performed in recent years and, in most cases, a measurement value on a single movement element is only provided as feedback. In other words, information on collaboration of multiple movement elements is not provided as feedback to the player and thus, even with the above-described feedback, it is difficult for the player to learn how to move multiple parts of his/her body collaboratively or non-collaboratively. For this reason, such collaborative or non-collaborative moves of multiple movement elements are considered as one of "knacks" for piano playing and thus are considered as being mastered uniquely by the player through trial and error.

The collaboration and non-collaboration of multiple movement elements herein mean how other movement elements behave dependently or non-dependently on the behavior (displacement, speed, direction of move, amount of activity or a change therein) of one movement element (such as a hand finger, a shoulder, an elbow or a muscle). More specifically, the level of collaboration (collaboration information) representing a level of collaboration of moves of multiple movement elements is an index indicating to what extent joints and muscles over multiple body parts collaborate intensively or whether the collaboration is reduced to allow independent moves. In the embodiment of the disclosure, the level of collaboration is not limited to collaboration between two movement elements and collaboration may be among three or more movement elements. It is possible to acquire such a level of collaboration by sensing variation patterns of multiple movement elements under given conditions (playing, time, etc.,) and calculating similarity of the sensed variation patterns.

As described above, teaching a piano playing style is not evidence-based because movement scientific analysis has not been performed and, in general, the teaching is performed based on a rule of thumb. Furthermore, such a teaching method is subjective or intuitive and is coupled with poor specifics and thus it is difficult for a teacher to deliver reaching to a taught person and thus it is difficult for the taught person to understand the content of teaching and put the teaching into practice.

Furthermore, for teaching a piano playing style, a scientific and objective teaching method has by no means been established and thus the teaching leaves much that can be improved. For example, it is considered that there are preferable playing styles respectively for genders, ages, body sizes (size of hand, height, skeleton, etc.), muscles and types of music to play. Thus, it can be considered that, if not only a professional music player but also an ordinary person familiar with piano are able to master playing styles respectively preferable to them, they are able to avoid disorders of the body (for example, tenosynovitis) and cranial nerve disease (for example, focal dystonia (a nerve disease that causes involuntary and persistent muscle contraction)) and play "comfortably", that is, "pleasantly". A teaching method of teaching such a playing style according to the attributes of a player however has not been established and, in not a small number of players, a health problem further gets worse while the players are taught according to teaching methods not preferable to the players depending on the case and thus the players have distresses over incapability of playing intended music.

Under such circumstances, the inventors had a great deal of study on a device that makes it possible to scientifically and objectively teach a piano playing style based on a movement scientific analysis. During the study, the inventors learned that, even from movement represented by a function of several variables, it is possible to extract collaboration and non-collaboration of movement elements deeply relative to improvement in a movement skill by multivariate analysis and machine learning. Focusing on the aforementioned learning, the inventors considered that, by simultaneously sensing a large number of movement elements of various motions of hand fingers during playing and analyzing the sensing data, it is possible to search for collaboration and non-collaboration of movement elements crucial to playing. Furthermore, the inventors considered that providing information based on the result of searching as described above to a player as feedback is usable to improve piano playing and reached creation of the embodiments of the disclosure.

Specifically, in an embodiment of the disclosure to be described below, first of all, multiple movement elements that are behaviors of hand fingers, arm joints, and muscles during piano playing or changes resulting from the movement elements (pressure, sound, etc.) are sensed with a single or a plurality of sensors. Furthermore, in the embodiment, multivariate analysis is performed on multiple sets of sensing data (time series data of each movement element) obtained as described above. The multivariate analysis makes it possible to extract, as quantitative information, collaboration or non-collaboration of movement elements that are crucial in piano playing (collaboration or non-collaboration of featuring movement elements). In the embodiment, collecting sensing data relative to a large number of players and performing machine learning on the collected sensing data makes it is possible to scientifically generalize the relationship between a playing condition (accurate playing, or the like) and collaboration or non-collaboration of each movement element. In addition, in the embodiment, it is possible to create a database (DB) of collected sensing data and collaboration or non-collaboration of movement elements (feature values) featuring the playing condition.

In the embodiment, sensing data is collected from a taught person who is taught as described above, a feature value of the collected sensing data (information on collaboration or non-collaboration of movement elements) and a feature value (information on collaboration or non-collaboration of movement elements) of sensing data serving as a model for the taught person (sensing data obtained from perfect playing by an expert) (referred to as a role model below) are compared with each other, and feedback is provided to the taught person based on the result of comparing. Specifically, in the embodiment, in order to approximate playing by the taught person to perfect playing by an expert, levels of collaboration of movement elements that are highly likely to be required to be corrected or to be prioritized in being corrected are compared with each other and a shift (difference) from the role model and specific content to be corrected (body part, amount of move, etc.,) are provided as feedback to the taught person. It is possible to determine necessity and priority for correction from the relationship with the playing condition (accurately playing, or the like) and the degree of shift from the role model, etc. In the embodiment, it is possible to select a role model according to attribute information (gender, age, etc.,) on the taught person and such selection enables tailored feedback according to the attributes of the taught person.

In the embodiment, using a method that is selected according to a preferable sensory modality, feedback is provided to the taught person. Specifically, in the embodiment, it is possible to provide feedback to the taught person by visualizing the above-described shift using color and displaying the visualized shift. Furthermore, in the embodiment, when the shift is minute or when the duration in which the shift occurs is minute, the taught person has a difficulty in sensing the shift and thus information on the shift may be virtually exaggerated and the exaggerated shift may be provided as feedback. More specifically, in the embodiment, the shift may be scalar multiplied and visualized (exaggerated in the spatial direction) or is posted in slow motion (exaggerated in the time direction).

In the embodiment, it is possible to provide information on the shift as biofeedback to a measured person via a wearable device that is worn by the taught person. Specifically, in the embodiment, applying a force to each of joints of hand fingers with a wearable device that is worn on a hand finger, or the like, of the taught person (for example, applying a force according to how much the force in the stretching and bending direction is excessive or insufficient with respect to the role model) enables haptic feedback.

A device configuration and an information processing method according to the embodiment of the disclosure will be described below in detail sequentially. In the following description, the case where the embodiment of the disclosure is applied to teaching a piano playing style (mastering a technique) will be described. The embodiment of the disclosure is not limited to application to teaching a piano playing style and the embodiment is applicable to mastering a technique of a playing style of another instrument, of a sport, and of traditional crafting or rehabilitation of a movement disorder.

In the following description, unless otherwise noted, a user means any one of a taught person who is taught a piano playing style, a player from which sensing data is collected to construct a DB according to the embodiment, and an operator who uses an information processing system according to the embodiment.

In the following description, a condition of piano playing means a speed of playing by the player during playing (tempo or rhythm), accuracy of playing (accuracy of rhythm or volume of each sound), a volume of sound cased by playing (peak of sound waveform), vibrancy of sound (volume of integral of sound waveform), a tone (spectrum), a sound volume difference or time volume difference between sounds in a chord (multiple sounds) (that is, "balance in a chord"), a difference between the maximum value and the minimum value of each sound parameter (range), and granularity of parameter of each sound (resolution). Furthermore, there are parameters with a trade-off relationship between the multiple parameters aforementioned (for example, the speed and accuracy of playing) and thus the piano playing condition may be a ratio of each parameter in consideration of such a case. The playing condition may be an evaluation index resulting from human subjective evaluation (the player has high accuracy). When the embodiment of the disclosure is applied to other moves other than piano playing, the performance condition may be movement patterns of movement elements implemented by the user, movement speeds, movement accuracies, amounts of movement (movement powers, impulses, loads, or the like), or a condition of a result caused by the performance.

In the following description, unless otherwise noted, the feature value covers not only featuring collaboration or non-collaboration of movement elements but also, for example, a maximum speed of key pressing and the timing (a point of time) when the maximum speed is reached, a maximum acceleration of key pressing and the timing when the maximum acceleration is reached, the timing when a keyboard starts moving, and the timing when the keyboard reaches the bottom at the time when the keyboard is up and down by being pressed by a player, or the like. In the following description, the feature value covers the timing when the keyboard separates from the bottom, the timing when the keyboard returns to an initial position, and the difference time between the sets of timing. In the following description, the feature value may cover a duration in which two successive sounds are produced simultaneously (length of time of legato), the difference between sets of timing when multiple keyboards that should be pressed simultaneously for playing are pressed (lag), the difference between sets of timing when a maximum key pressing speed is reached, a difference between or ratio of maximum keying velocities, and a difference between or ratio of maximum accelerations. In addition, the feature value can cover an acceleration achieved when a keyboard reaches the bottom surface, that is, an intensity of impact caused by a strike of the keyboard, and a duration in which the keyboard presses a bottom felt part and furthermore cover an acceleration at a moment when a keyboard starts moving, that is, an intensity of impact caused by a strike of a finger against a key.

2. EMBODIMENT OF DISCLOSURE

2.1. Overview of Information Processing System 1 According to Embodiment of Disclosure First of all, an overall configuration of an information processing system 1 according to an embodiment of the disclosure will be described with reference to FIG. 1. FIG.

1 is an explanatory view to explain an exemplary configuration of the information processing system 1 according to the embodiment.

As illustrated in FIG. 1, the information processing system 1 according to the embodiment includes a sensor device 10, a server 30, and a user side device 70 that are connected with one another via a network 90 such that they can communicate with one another. For example, the sensor device 10, the server 30, and the user side device 70 are connected to the network 90 via a base station (for example, a mobile phone base station or a wireless LAN access point) that is not illustrated in the drawing, or the like. In other words, any system may be used as a communication system that is used in the network 90 regardless whether the system is wireless or wired. Overviews of the respective devices that the information processing system 1 according to the embodiment include will be described below.

(Sensor Device 10)

The sensor device 10 can be a sensor that is wearable on part of the body of a taught person or a player, an imaging device that captures images of the taught person or the player, a pressure sensor that is arranged in a piano that is played by the taught person or the player, or a sound pickup device that picks up sounds of the piano. The sensor device 10 is not particularly limited as for the number of sensor devices and the type as long as the sensor device 10 acquires multiple sets of sensing data. Details of the sensor device 10 will be described below.

(Server 30)

The server 30 is formed of, for example, a computer. For example, a service provider that provides a service according to the embodiment owns the server 30 and the server 30 provides the service to each user or each third party. Specifically the server 30, for example, collects sensing data on the player or the taught person, analyzes the collected sensing data, and provides feedback to the taught person. Details of the server 30 will be described below.

(User Side Device 70)

The user side device 70 is a device that notifies the taught person, or the like, of feedback information from the server 30 and, while the taught person is playing or after the playing, turns the feedback information visible, into a haptic division, auditorily perceptible, or audible and then issues a notification of the feedback information. For example, the user side device 70 may be a device, such as a tablet, a smartphone, a laptop PC (Personal Computer), or a notebook PC. Furthermore, the user side device 70 may be a wearable device wearable on part of the body of the taught person. More specifically, as the wearable device, wearable devices using various systems, such as a HMD (Head Mounted Display) type, an ear device (headphone) type, an anklet type, a bracelet type, a choker type, an eyewear type, a glove type, a pad type, a badge type, and a cloth type, can be used. Details of the user side device 70 will be described below.

FIG. 1 illustrates that the information processing system 1 according to the embodiment includes the single sensor device 10 and the single user side device 70; however, the embodiment is not limited to this. For example, the information processing system 1 according to the embodiment may include a plurality of sensor devices 10 and a plurality of user side devices 70. Furthermore, the information processing system 1 may include another communication device, such as a relay device for transmission of sensing data from the sensor device 10 to the server 30.

2.2 Configuration of Sensor Device 10 of Embodiment of Disclosure

Figure 2:
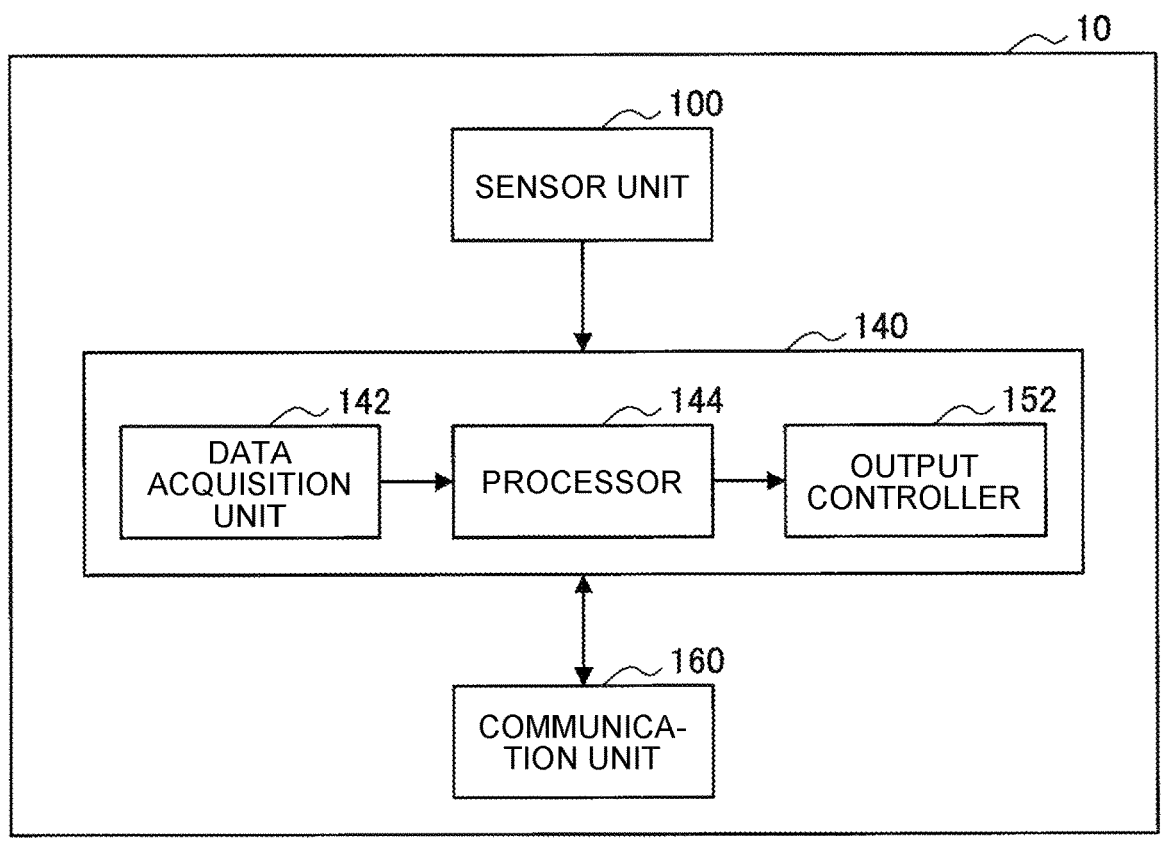
FIG. 2 is a block diagram illustrating a configuration of a sensor device 10 according to the embodiment.
Figure 3:
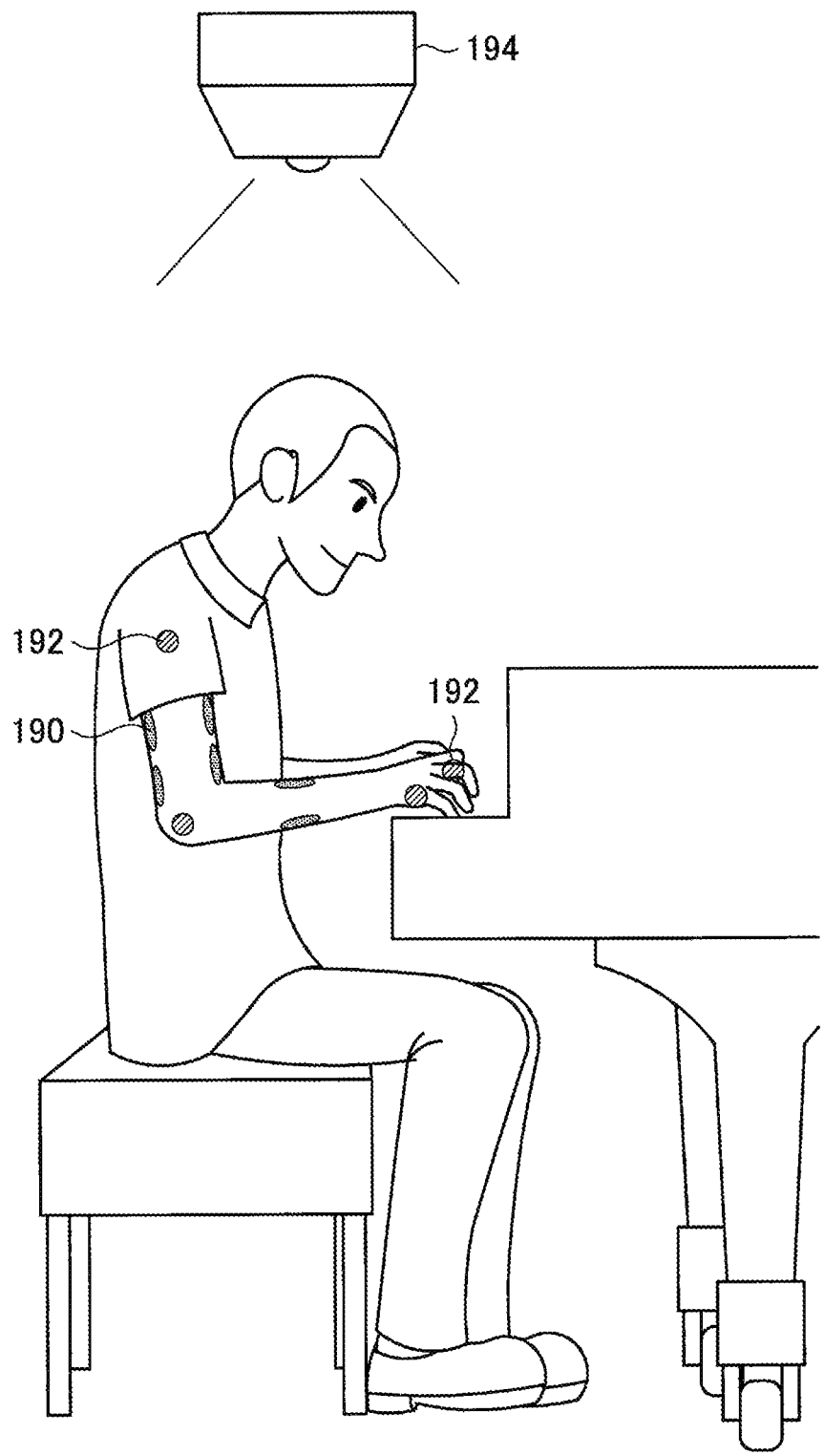
FIG. 3 is an (first) explanatory view illustrating an example of the sensor device 10 according to the embodiment.
Figure 4:
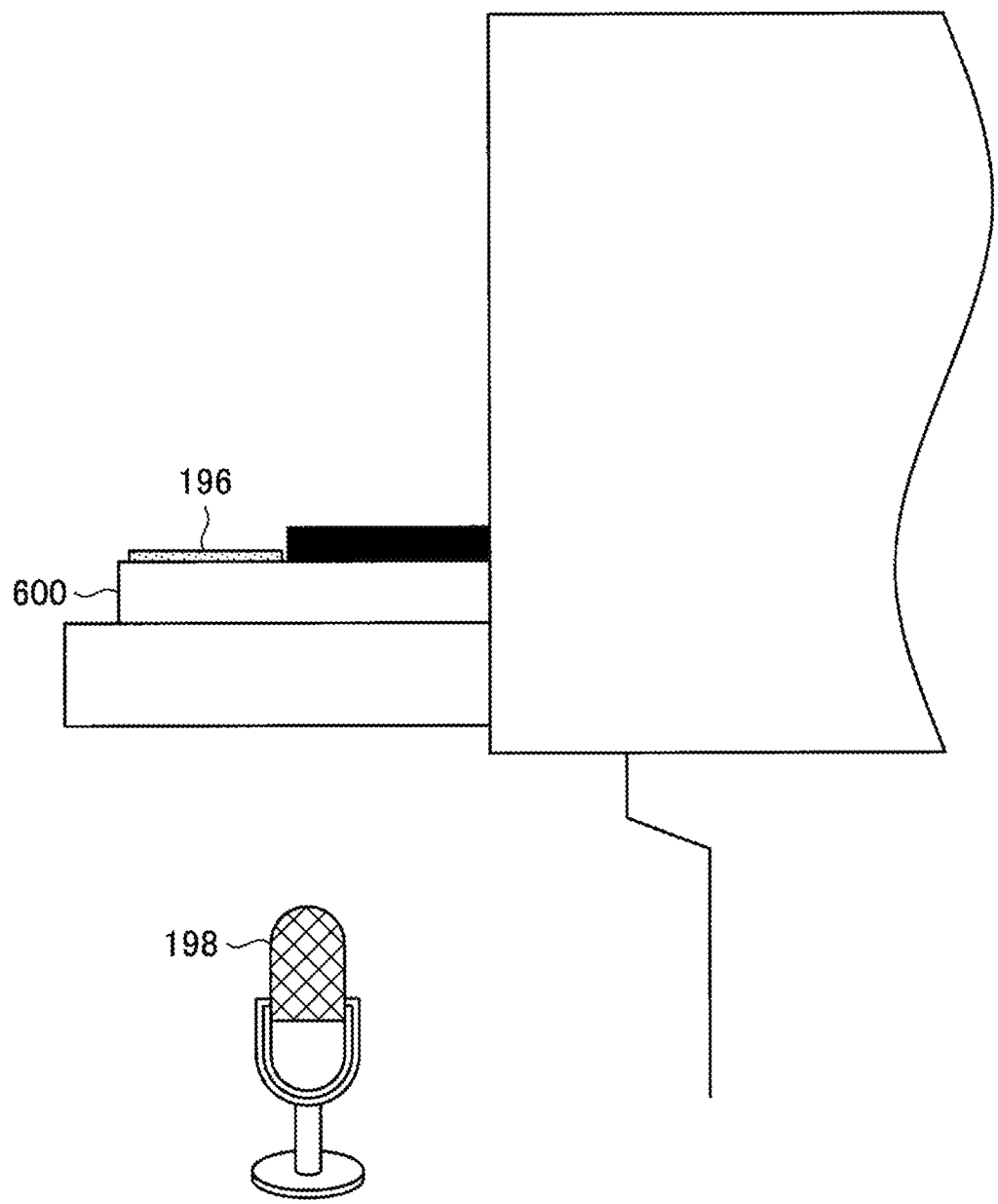
FIG. 4 is an (second) explanatory view illustrating an example of the sensor device 10 according to the embodiment.

With reference to FIGS. 2 to 4, a configuration of the sensor device 10 according to the embodiment of the disclosure will be described. FIG. 2 is a block diagram illustrating a configuration of the sensor device 10 according to the embodiment FIGS. 3 and 4 are explanatory views illustrating the exemplary sensor device 10 according to the embodiment.

As illustrated in FIG. 2, the sensor device 10 according to the embodiment mainly includes a sensor unit 100, a main controller 140, and a communication unit 160. Details of each functional unit of the sensor device 10 will be described below.

(Sensor Unit 100)

The sensor unit 100 is worn on, for example, the body of a taught person or a player and accordingly is able to acquire sensing data representing the condition of each movement element implemented by each part of the body of the taught person or the player who is playing. For example, the sensor unit 100 is implemented using at least one of an acceleration sensor, an angular velocity sensor, a gyro sensor, a geomagnetic sensor, a position sensor, a vibration sensor, and a bending sensor. The above-described sensor device detects variations in acceleration or angular velocity that are provided by movement elements and generates multiple sets of sensing data representing the detected variations. Furthermore, the multiple sets of sensing data that are obtained by the sensor unit 100 are output to the main controller 140. The sensor unit 100 may incorporate a clock mechanism (not illustrated in the drawing) to know the accurate time and associate the time when sensing data is acquired with the sensing data.

The bending sensor herein is a sensor that uses an element whose resistance varies non-linearly according to the degree of bending when the element bends and, for example, the bending sensor is worn on a joint of the user and thus is able to detect an angle at which the joint is bent. In the embodiment, wearing sensor devices like that described above on the joints of the arms, the legs, the body of a user enables quantitative detection of the postures (leaning), moving speeds, joint bending angles of hand fingers and arms in a space.

In the embodiment, the sensor unit 100 may be an imaging device that captures images of the taught person or the player. Specifically, as illustrated in FIG. 3, markers 192 (illustrated in a circular shape) formed of LEDs (Light Emitting Diodes), or the like, are worn on joints, hand fingers, etc., of the taught person. In the embodiment, capturing motions of the markers 192 with a high-speed photography camera (imaging device) 194 that is an example of the sensor unit 100 makes it possible to quantitatively detect positions and motions of the joints of the taught person, or the like. In the embodiment, motions of the eyeballs of the taught person, or the like, may be detected by the imaging device.

In the embodiment, the sensor unit 100 may be a nuclear magnetic resonance sensor that detects an oral or endotracheal condition of the taught person or the player, motions of the lips or tongue utilizing nuclear magnetic resonance. Specifically, the taught person, or the like, executes playing in a magnetic resonance imaging (MRI) apparatus and this enables detection of the aforementioned condition or motions. Particularly when the embodiment of the disclosure is applied to playing styles of various winds (such as a flute, an oboe, a clarinet and a trumpet), the MRI is useful because it enables detection of moves of lips and tongue that are difficult to detect with other methods.

The sensor unit 100 may be position sensors that detect up and down moves of keyboards of the piano caused by movement elements of the taught person or the player. For example, setting position sensors under the respective keyboards makes it possible to detect up and down moves of each keyboard and detect motions of a hand finger that causes each key to move up and down. The sensor unit 100 may be pressure sensors each of which detects a pressure applied by a movement element of the taught person or the player to a keyboard of the piano. For example, the sensor unit 100 may be pressure sensors 196 that are worn on the surfaces of white keys 600 of the piano as illustrated in FIG. 4. The sensor unit 100 may be pressure sensors (not illustrated in the drawing) each of which detects in which position on the white key 600 a hand finger of the taught person or the like presses the white key 600. Specifically, setting thin plates each with two pressure sensors on the respective keyboards makes it possible to estimate positions in which hand fingers of the taught person, or the like, presses keys using sensing data from each of the pressure sensors.

The sensor unit 100 may be a sound pickup device that picks up sound from the piano that is played by the taught person or the player. For example, the sensor unit 100 may be a microphone 198 that is arranged near the piano as illustrated in FIG. 4. Specifically, piano keys are pressed by various forces with a robot, or the like, and the sensor unit 100 detects the sounds caused by the key pressing via the microphone 198. The server 30 to be described below associates parameters (forces, etc.) on key pressing and data of the picked-up sounds with each other using machine learning, or the like, thereby generating relationship information between the parameters and sounds. Utilizing the relationship information enables acquisition of parameters on key pressing by the taught person, or the like, based on the conditions (vibrancy, tone, or volume) of sounds that are newly picked up from playing by the taught person, or the like, with the microphone 198.

In the embodiment, the sensor unit 100 may include biological information sensors, such as a myoelectric sensor, a heart rate sensor, a pulse rate sensor sensor, a blood flow sensor, a respiration sensor, a brain wave sensor, a skin temperature sensor, and a skin conductivity sensor. The myoelectric sensor herein is a sensor that senses a weak electric filed that is generated from muscle fibers forming a muscle. Specifically, using electrodes 190 that are worn on an arm, or the like, of the player or the taught person as illustrated in FIG. 3, the myoelectric sensor measures myoelectric potentials from electric signals that occur in the muscle fibers when the muscle of the arm, or the like, and that are transmitted on the body surface, thereby being capable of quantitatively detect an amount of muscle activity of the muscle.

The heart rate sensor is a sensor that detects a heart rate that is pulsation of arteries that appear on the surface of the body, or the like, because pulsation (heart rate) of the heart causes transmission of blood through the body via the arteries and accordingly changes in pressure occur on the inner walls of the arteries. The blood flow sensor is a sensor that radiates infrared rays to the body and detects a volume of blood flow from reflection of the infrared rays. The respiration sensor may be a respiratory flow meter that detects changes in the respiratory volume. The brain wave sensor is a sensor that detects brain waves by extracting periodic waves in a way that a plurality of electrodes are worn on the surface of the head and noise is removed from measured variations in the potential difference between the electrodes. The skin temperature sensor is a sensor that detects a body temperature of the player or the taught person and the skin conductivity sensor is a sensor that detects an electric resistance of the skin of the player or the taught person.

The sensor unit 100 may further includes a positional information sensor, such as a GPS (Global Positioning System) receiver that acquires positional information on the taught person or the player. The sensor unit 100 may include other various sensors, such as a pneumatic sensor, a temperature sensor and a humidity sensor, in order to acquire environmental information representing a condition of an environment in which the taught person or the player performs playing.

(Main Controller 140)

The main controller 140 is arranged in the sensor device 10 and is capable of controlling each block of the sensor device 10. The main controller 140 is implemented using hardware, such as a CPU (Central Processing Unit), a ROM (Read Only Memory), or a RAM (Random Access Memory). The main controller 140 is also capable of functioning as a data acquisition unit 142, a processor 144, and an output controller 152. Details of these functions of the main controller 140 according to the embodiment will be described below.

Data Acquisition Unit 142

The data acquisition unit 142 controls the sensor unit 100, acquires sensing data that is output from the sensor unit 100, and outputs the acquired sensing data to the processor 144 to be described below. The data acquisition unit 142 incorporates a clock mechanism (not illustrated in the drawing) to know the accurate time, associates the sensing data with the time at which the sensing data is acquired, and outputs the sensing data associated with the time to the processor 144.

Processor 144

The processor 144 converts the sensing data that is output from the data acquisition unit 142 described above into a given form transmittable via the network (for example, converts sensing data that is an analog signal into a digital signal), and outputs the converted sensing data to the output controller 152 to be described below.

Output Controller 152

The output controller 152 controls the communication unit 160 to be described below and transmits the sensing data in the given form, which is output from the processor 144 described above, to the server 30.

(Communication Unit 160)

The communication unit 160 is arranged in the sensor device 10 and is capable of transmitting and receiving information to and from an external device, such as the server 30. In other words, the communication unit 160 can be referred to as a communication interface with a function of transmitting and receiving data. The communication unit 160 is implemented using a communication device, such as a communication antenna, a transmitting-receiving circuit, or a port.

Wearable devices using various systems, such as a HMD type, an ear device type, an anklet type, a bracelet type, a choker type, an eyewear type, a pad type, a badge type, a belt type, and a cloth type, may be used as the sensor device 10. Specifically, these wearable devices can be arranged on the hand fingers, arms, legs, body, head, and toes. The sensor device 10 may be a device that is set around the taught person or the player, such as an imaging device or a sound pickup device.

2.3. Configuration of Server 30 According to Embodiment of Disclosure

Figure 5:
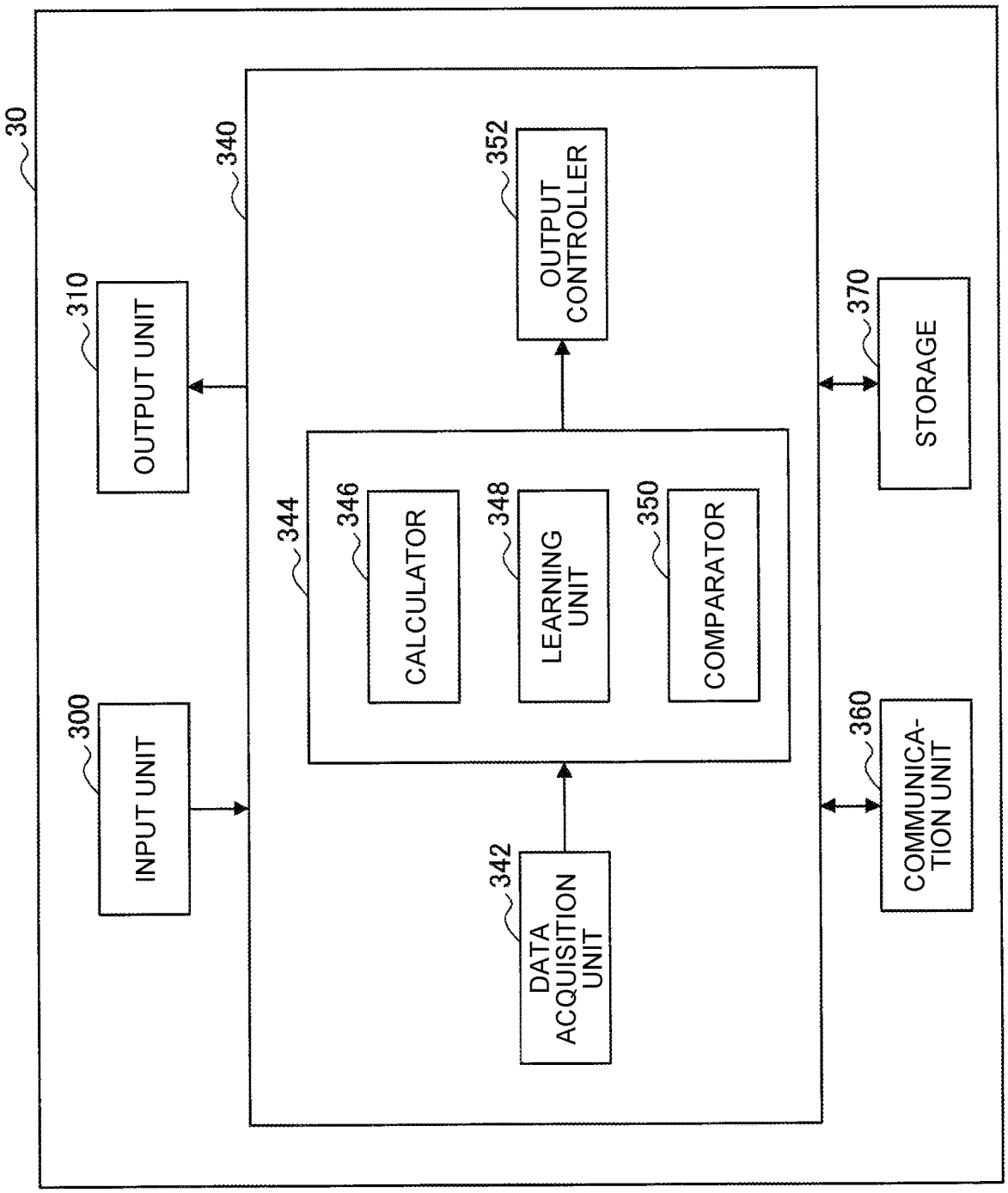
FIG. 5 is a block diagram illustrating a configuration of a server 30 according to the embodiment.
Figure 6:
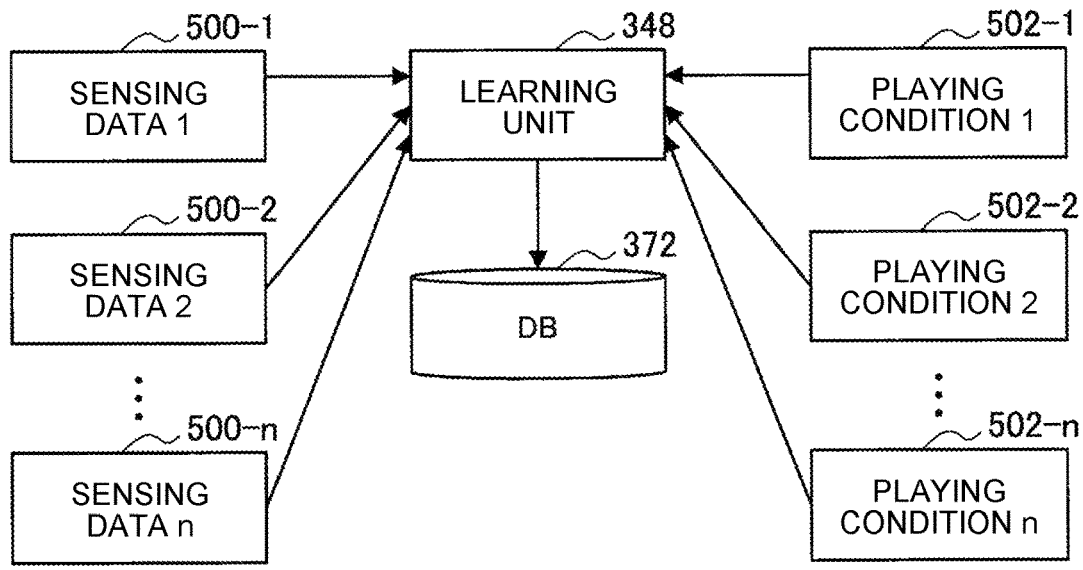
FIG. 6 is an explanatory view for explaining a learning unit 348 according to the embodiment.
Figure 7:
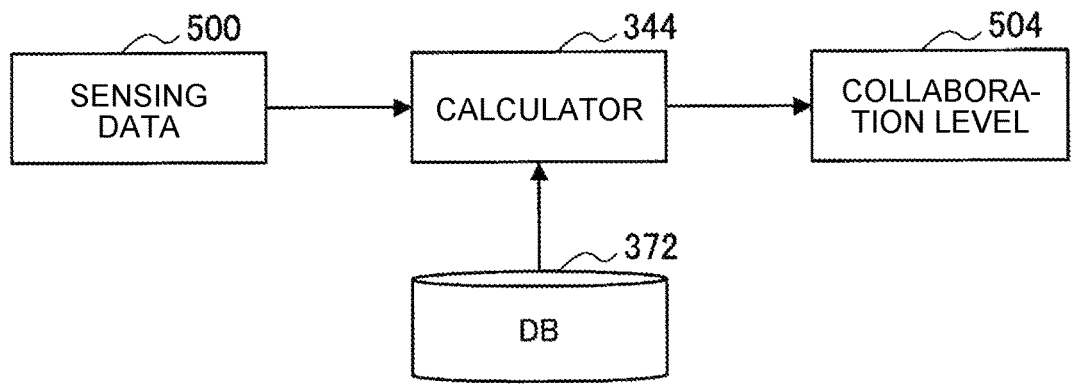
FIG. 7 is an explanatory view for explaining a calculator 346 according to the embodiment.
Figure 8:
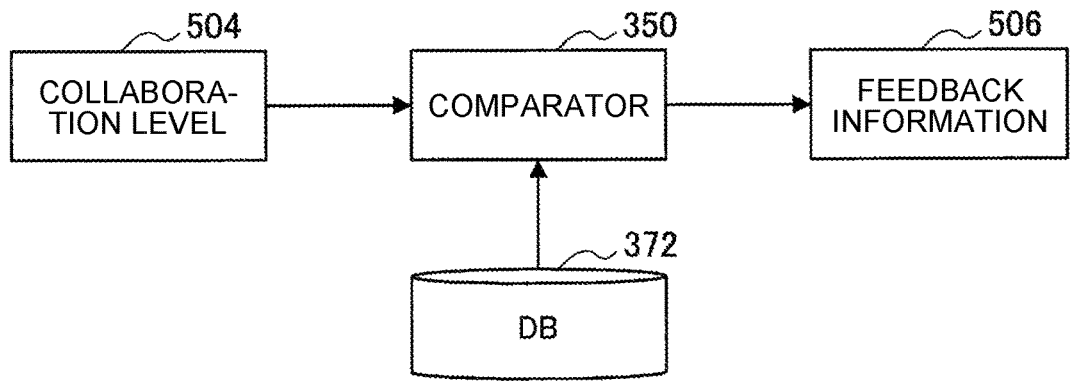
FIG. 8 is an explanatory view for explaining a comparator 350 according to the embodiment.

A configuration of the server 30 according to the embodiment of the disclosure will be described with reference to FIGS. 5 to 8. FIG. 5 is a block diagram illustrating a configuration of the server 30 according to the embodiment. FIG. 6 is an explanatory view for explaining a learning unit 348 according to the embodiment. FIG. 7 is an explanatory view for explaining a calculator 346 according to the embodiment. FIG. 8 is an explanatory view for explaining a comparator 350 according to the embodiment.

As described above, the server 30 is formed of, for example, a computer. As illustrated in FIG. 5, the server 30 mainly includes an input unit (attribute information acquisition unit) 300, an output unit 310, the main controller 340, a communication unit 360, and a storage 370. Details of each functional unit of the server 30 will be described below.

(Input Unit 300)

The input unit 300 receives data and inputs of commands to the server 30. More specifically, the input unit 300 is implemented using a touch panel, a keyboard, or the like, and is capable of receiving inputs of attribute information on the taught person or the player.

(Output Unit 310)

The output unit 310 is formed of, for example, a display, a speaker, a video output terminal, or an audio output terminal, and outputs various types of information by image or sound.

(Main Controller 340)

The main controller 340 is arranged in the server 30 and is capable of controlling each block of the server 30. The main controller 340 is implemented by hardware, such as a CPU, a ROM, or a RAM. The main controller 340 is also capable of functioning as a data acquisition unit (sensing data acquisition unit) 342, a processor 344, and an output controller (notification unit) 352. Details of the functions of the main controller 340 according to the embodiment will be descried.

Data Acquisition Unit 342

The data acquisition unit 342 acquires the sensing data that is transmitted from the above-described sensor device 10 and outputs the acquired sensing data to the processor 344 to be described below.

Processor 344

The processor 344 processes the sensing data that is output from the data acquisition unit 342, calculates a level of collaboration representing collaborativeness of movement elements during playing by the taught person from the sensing data, and generates feedback information to be provided as feedback to the taught person based on the calculated level of collaboration. The processor 344 is capable of creating a DB 372 (refer to FIG. 6) formed of various types of information for calculating the level of collaboration and the feedback information described above. Specifically, in order to implement these functions described above, the processor 344 functions as the calculator 346, the learning unit 348, and the comparator 350. Details of these functions of the processor 344 according to the embodiment will be described.

By using a given algorithm based on the sensing data that is transmitted from the sensor device 10, the calculator 346 calculates a level of collaboration representing collaborativeness of movement elements of the taught person relating to a specific playing condition. The calculator 346 then outputs the calculation result to the comparator 350 and the storage 370 to be described below. More specifically, for example, using the DB 372 that is to be described below (that is stored in the storage 370 to be described below) and that is obtained by machine learning by the learning unit 348 to be described below, the calculator 346 selects an appropriate algorithm according to a pre-set playing target condition (targeted performance condition) (for example, playing quickly) and calculates a level of collaboration representing collaborativeness of movement elements having a relation with the target condition.

Thus, in the embodiment, in order to acquire information for constructing the DB 372 that the calculator 346 uses, a large number of players (for example, about 100 players) are made perform given playing (such as a music, a phrase, a scale, an arpeggio, a chord) and a large number of sets of sensing data according to a large number of movement elements are collected from the players who are playing using the above-described sensor device 10. For example, the sensor device 10 collects sensing data on motions of each hand finger of the players.

The server 30 (the learning unit 348 of the processor 344) collects information on the condition of playing by each player (performance condition). The information on the condition of playing is, as described above, information, such as a playing speed, playing accuracy, a volume of sound caused by playing, vibrancy of sound, tone, a difference in volume and a difference in duration between sounds of a chord, a difference between the maximum value and the minimum value of each sound parameter, and granularity of parameter of each sound. For example, it is possible to collect such information on the playing condition by collecting sounds with the microphone 198 that is arranged near the player and analyzing audio data that is obtained by collecting the sounds.

In the embodiment, attribute information (gender, age, height, weight, muscle strength, size of palm, years of experience of playing piano, etc.) on each player may be acquired and the attribute information may be input to the learning unit 348 of the processor 344.

In the embodiment, information, such as the sensing data and the playing condition that is acquired as described above are input to the learning unit 348 of the processor 344 and the learning unit 348 is caused to perform machine learning. Specifically, for example, the processor 344 includes the supervised learning unit (learning machine) 348, such as support vector regression or a deep neural network. As illustrated in FIG. 6, sensing data 500 and a playing condition 502 that are acquired from the sensor device 10 are input respectively as an input signal and a training signal (label) to the learning unit 348 and the learning unit 348 performs machine learning on the relationship between these sets of information according to given rules. The input signal and the training signal that are input may be not in a one-to-one relationship illustrated in FIG. 6 and multiple input signals (the sensing data 500) and a single training signal (the playing condition 502) may be input in association with each other and, alternatively, multiple input signals and multiple training signals may be input in association with each other. Furthermore, clustering may be performed previously on the playing condition information serving as the training signal and the information is then input. In other words, in the embodiment, a group of sets of information on multiple players with similar playing tendencies may be dealt with as the same cluster data group. For example, in the embodiment, clustering may be performed based on the levels of proficiency of the players that are determined using the above-described attribute information. Such clustering is usable to select information to be used in the comparator to be described below and is usable to classify playing by the taught person.

The learning unit 348 acquires information on the relationship in each player between the levels of collaboration of movement elements of various combinations and the playing condition by performing multivariate analysis. Specifically, it is possible to obtain a level of collaboration of movement elements by calculating a level of similarity in the sensing data 500 between movement elements of the same player. Specifically, for example, it is possible to obtain a level of collaboration by extracting variation patterns of the sets of sensing data 500 of the respective movement elements over time within the same period and calculates a similarity between the variation patterns. For example, it is possible to obtain a level of collaboration by normalizing variation patterns of the sets of sensing data 500 on the respective movement elements in a three dimensional space by a given norm and extracting the variation patterns and then calculating a level of similarity between the variation patterns. The learning unit 348 performs multivariate analysis, such as multiple regression analysis, on the relationship between the level of collaboration obtained as described above and the playing condition 502 and thus acquires a featuring level of collaboration in each playing condition (feature value) (first feature information), thereby being able to perform machine learning on the relationship information of a relationship between the playing condition and the level of collaboration. By storing the relationship information that is obtained by the learning unit 348 through machine learning in the storage 370, the database (DB) 372 is constructed.

The learning unit 348 may perform machine learning with a semi-trained learning machine in order to omit labelling on part of the sensing data 500. In this case, the learning unit 348 classifies sets of sensing data 500 that are not labeled and that are determined as sensing data 500 similar to the sensing data 500 that has been already labeled into the same cluster, thereby constructing the DB 372. The learning unit 348 may, for example, make an inquiry on the playing condition of each player and perform low-trained learning using, as a rough training signal, provisional information that is determined based on the answers to the inquiries. Alternatively, the learning unit 348 may perform untrained leaning in which extraction of clusters is automatically performed using a large volume of data. In this case, the learning unit 348 automatically generates clusters and information resenting the playing condition serving as a training signal.

As illustrated in FIG. 7, the calculator 346 is capable of, based on the DB 372 that is obtained by the learning unit 348 through machine learning, calculating a collaboration level 504 of movement elements of the taught person relating to a specific playing condition from the sensing data on the taught person that is newly acquired from the sensor device 10. Specifically, the calculator 346 extracts, from the DB 372, the collaboration level 504 highly related to a specific playing condition, such as playing accurately or playing fast, that is, the feature level of the given playing condition, and calculates the collaboration level 504 of given movement elements corresponding to the feature value (the collaboration level 504 that is related to the movement that is the same as the extracted feature value) from the sensing data 500 on the taught person that is newly acquired. The level of collaboration that is calculated by the calculator 346 is not limited to one and multiple collaboration levels 504 may be calculated. The calculator 346 further outputs the calculated collaboration level 504 to the comparator 350 to be described below.

As illustrated in FIG. 8, the comparator 350 selects a feature value (collaboration level 504) (role model) of a given playing condition (perfect playing by an expert) serving as a model for the taught person from the DB 372 and compares the feature value with the collaboration level 504 that is calculated by the calculator. The comparator 350, for example, may calculate a difference (shift) from the collaboration level 504 that is calculated as a role model and may calculate a level of conformity between the role model and the calculated collaboration level 504. Furthermore, the comparator 350 may further extract information on movement elements necessary to make the calculated difference zero (on body parts, amounts of move, etc.). The comparator 350 generates feedback information for providing feedback to the taught person and outputs the generate feedback information to the output controller 352.

Specifically, the comparator 350 selects the representative collaboration level 504 (the collaboration level 504 obtained from perfect playing by the expert) serving as a model for the taught person in the given playing condition, such as accurate playing or speedy playing, from the DR 372 and compares the selected role model with the collaboration level of the taught person with each other. When there are multiple representative collaboration levels 504, the comparator 350 may calculate differences of the collaboration levels 504 from the collaboration level 504 of the corresponding taught person and select the representative collaboration level 504 with a large difference as a role model to be compared as the collaboration level 504 with high necessity of playing of the taught person to be corrected in order to be close to the perfect playing by the expert. Alternatively, the comparator 350 may select the collaboration level 504 with the highest relationship with the given playing condition as the collaboration level 504 (role model) whose effect is considered to be significant when improved to bring playing by the taught person close to perfect playing by the expert.

In the embodiment, the comparator 350 may select a role model according to the attribute information of the taught person (such as gender, age, build, muscle strength, flexibility and agility). Such selecting enables tailored feedback according to the attributes of the taught person. For example, according to the attributes of the taught person, the comparator 350 selects the collaboration level 504 of the expert with attributes close to the attributes of the taught person.

In the embodiment, when the level of proficiency differs between right hand fingers and left hand fingers of the taught person, the comparator 350 may invert the collaboration level 504 of the fingers of the expert one of the hands (for example, the dominant hand; and selects the inverted collaboration level 504 as a role model for the collaboration level 504 of the fingers of the other hand. When comparing the played person in the past and the present taught player, the comparator 350 may select the collaboration level 504 or the played person in the past as a role model.

The output controller 352 controls the communication unit 360 to transmit feedback information 506 that is output from the processor 344 to the user side device 70. In other words, the output controller 352 capable of controlling feedback in the user side device 70. The output controller 352 is not limited to transmission of all the feedback information 506 that is output from the processor 344 to the user side device 70. For example, the output controller 352 may select the feedback information 506 based on the attribute information on the taught person, or the like, and transmit the feedback information 506 to the user side device 70. Specifically, a large volume of information to be provided as feedback to the taught person sometimes confuses the taught person and ends up hindering learning the technique. Thus, by restricting the volume of information to be provided as feedback in the output controller 352 according to the attributes of the taught person, etc., it is possible to avoid confusion of the taught person.

In the embodiment, the output controller 352 may select the feedback information 506 to be transmitted to the user side device 70 based on a previous setting. Using, as an example, the case where the taught person uses the information processing system 1 according to the embodiment to make improvement on both objectives in "playing speed" and "key pressing strength", selecting the feedback information 506 by the output controller 352 based on a previous setting will be described. In such a case, when both the feedback information 506 for improving (increasing) the "playing speed" and the feedback information 506 for improving (increasing) the "key pressing strength" are provided as feedback, there is risk that the taught person is confused. Thus, in the embodiment, for example, the taught person or a teacher previously sets which of the feedback information 506 on the playing speed and the feedback information 506 on the key pressing strength should be preferentially provided as feedback. This makes it possible to avoid confusion of the taught person. The embodiment is not limited to provision of the single set of the feedback information 506 as feedback and, for example, multiple sets of feedback information 506 may be sequentially provided as feedback intermittently. In such a case, an order and lags in which and at which sets of feedback are provided my be set such that feedback is provided to the taught person preferably.

In the embodiment, as described above, the output controller 352 may select feedback information to be transmitted to the user side device 70 using an algorithm that is acquired by the above-described learning unit 348 through learning without selecting feedback information based on the attribute information and previous setting. For example, in the embodiment, the content of and the volume of the feedback information 506 provided as feedback to the taught person and the information on improvement of playing by the taught person are input to the learning unit 348. The learning unit 348 to which these sets of information have been input previously learns the feedback information 506 and the relationship information representing the relationship between the volume of information and effect of improvement. Furthermore, using the above-described relationship information obtained by the learning unit 348 and based on the feedback information 506 whose effect by improvement is estimated to be high, the output controller 352 selects the feedback information 506 to be transmitted to the user side device 70. In the embodiment, by appropriately controlling the feedback information 506 that is provided as feedback, it is possible to effectively learn and improve playing by the taught person. In the embodiment, not only the content and the volume of information of the feedback information 506 but also the timing of feedback and a feedback mode (such as display, audio or haptic) in which feedback is provided may be selected based on the information obtained through learning by the learning unit 348.

The output controller 352 may select a feedback mode (such as display, audio or haptic) based on the feedback information 506, the attribute information on the taught person, etc., and transmit the information of the selected feedback mode to the user side device 70. For example, when the embodiment is app tied to mastering a technique to play piano accurately, the output controller 352 selects a mode of feedback that is provided using a haptic mechanism 710 (refer to FIG. 9) that applies and transmits a force to part of the body of the taught person using, as feedback information, moves of the expert serving as a model for the taught person. In a similar case, the output controller 352 selects a mode of feedback that is provided using the display unit 714 (refer to FIG. 9) that visually transmits, as feedback information, a shift in move between the taught person and the expert. The taught person, or the like, may previously set in what feedback mode the output controller 352 provides feedback according to the taste of the taught person.

(Communication Unit 360)

The communication unit 360 is arranged in the server 30 and is capable of transmitting and receiving information to and from external devices, such as the sensor device 10 and the user side device 70. The communication unit 360 is implemented using a communication device, such as a communication antenna, a transmitting-receiving circuit or a port.

(Storage 370)

The storage 370 is arranged in the server 30 and stores programs and information, etc., for the above-described main controller 340 to execute various types of processing and information that is obtained through processing. The storage 370 is implemented using, for example, a magnetic storage medium, such as a hard disk (FID), a nonvolatile memory, such as a flash memory, or the like. The storage 370 is capable of storing the above described DB 372.

2.4. Configuration of User Side Device 70 According to Embodiment

Figure 9:
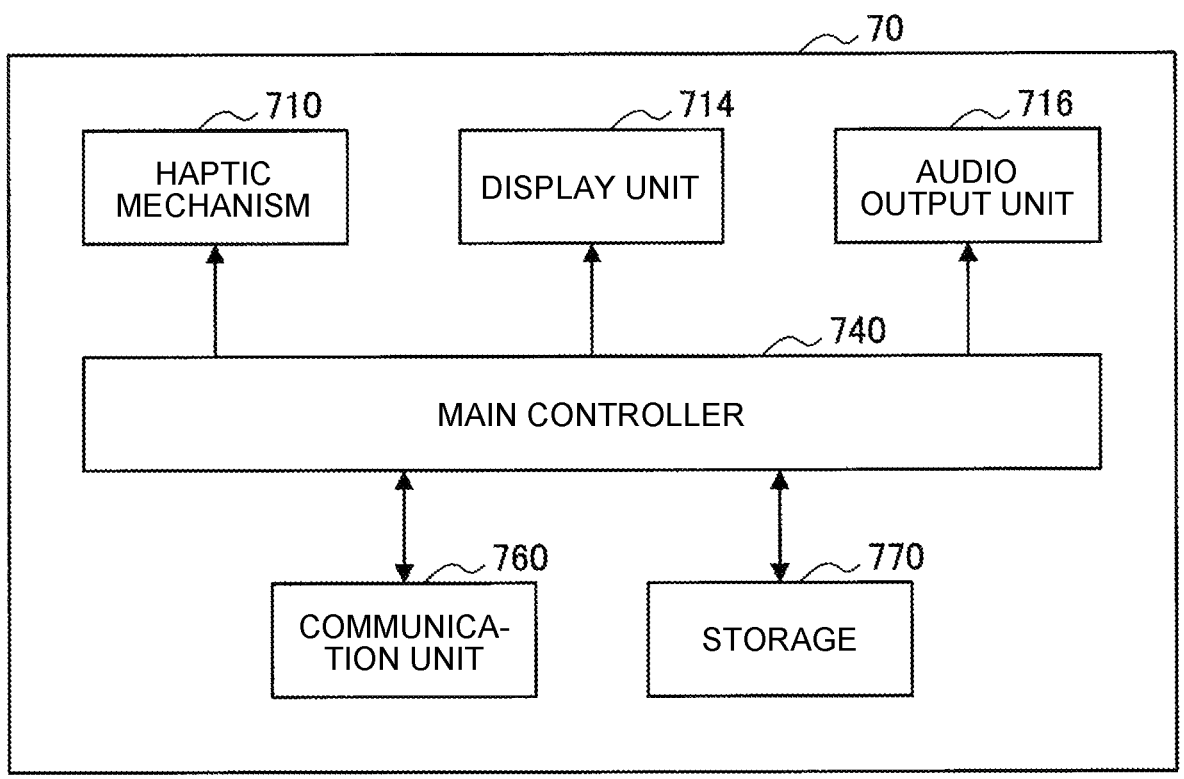
FIG. 9 is a block diagram illustrating a configuration of a user side device 70 according to the embodiment.
Figure 10:
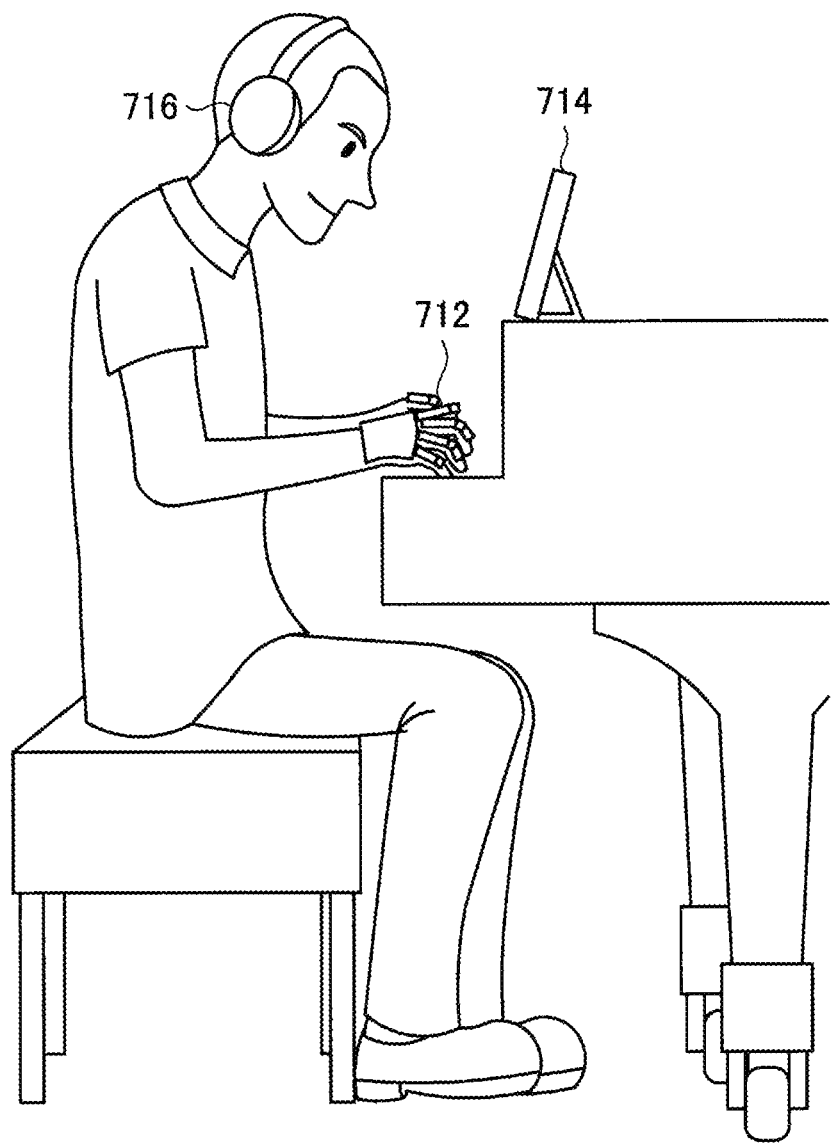
FIG. 10 is an explanatory view for explaining an example of the user side device 70 according to the embodiment.
Figure 11:
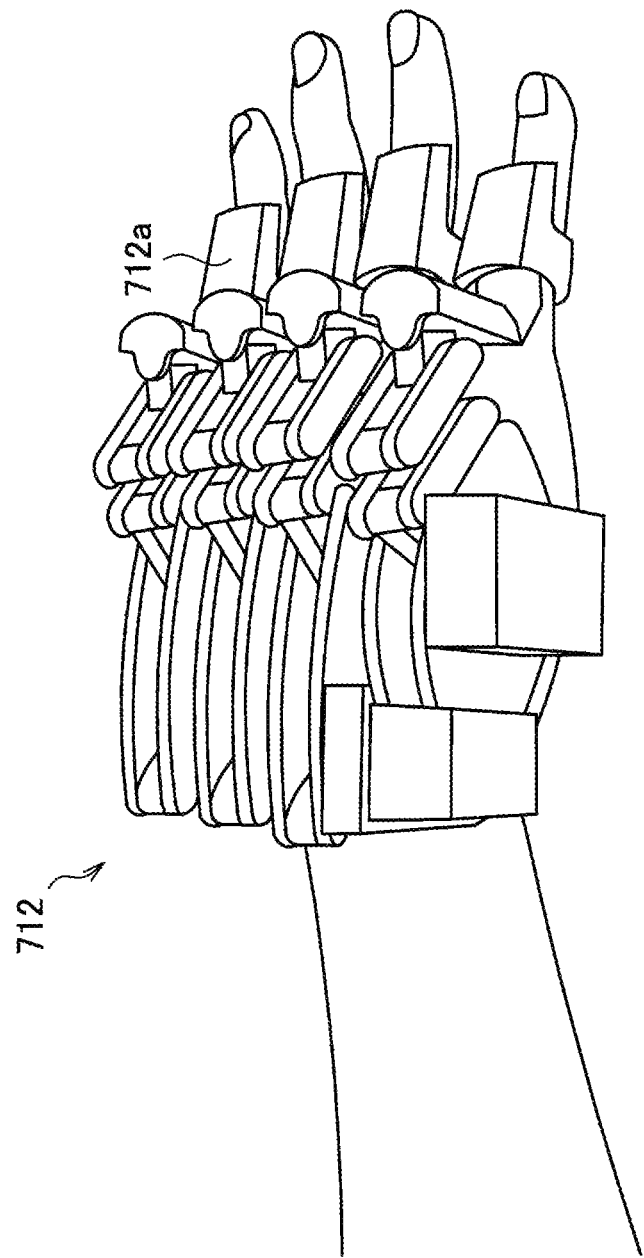
FIG. 11 is an explanatory view for explaining an exoskeleton robot 712 according to the embodiment.

A configuration of the user side device 70 according to the embodiment of the disclosure will be described with reference to FIGS. 9 to 11. FIG. 9 is a block diagram illustrating the configuration of the user side device 70 according to the embodiment. FIG. 10 is an explanatory view for explaining an example of the user side device 70 according to the embodiment. Furthermore, FIG. 11 is an explanatory view for explaining an exoskeleton robot (wearable device) 712 according to the embodiment.

As described above, the user side device 70 may be a device, such as a tablet, a laptop PC, a notebook PC, or a wearable device. As illustrated in FIG. 9, the user side device 70 mainly includes the haptic mechanism 710, the display unit 714, an audio output unit (audio output device) 716, a main controller 740, a communication unit 760, and a storage 770. Details of each functional unit of the user side device 70 will be described below.

(Haptic Mechanism 710)

The haptic mechanism 710 is a device that provides haptic transmission, such as application of a force to part (such as a joint) of the body of the taught person based on the feedback information 506 that is transmitted from the server 30. For example, the haptic mechanism 710 is a globe-type wearable device (wearable device) 712 that is worn on the hands of the taught person as illustrated in FIG. 10. Specifically, the globe-type wearable device 712 is called a hand finger exoskeleton robot and, as illustrated in FIG. 11, is formed of a mechanism consisting of a plurality of exoskeleton members 712a and an actuator (such as an electric actuator or a pneumatic actuator) (not illustrated in the drawing) that enables the exoskeleton members 712a to move. The globe-type wearable device 712 causes the exoskeleton members 712a to move using the actuator to apply forces to hand fingers and joints of the taught person, thereby, for example, allowing the taught person to haptically perceive how much the force in a direction in which a joint stretches out and bends is excessive or insufficient. Accordingly, the globe-type wearable device 712 is able to serve as a guide such that playing by the taught person is close to playing by the expert. In the embodiment, the above-described sensor device 10 may be worn on the haptic mechanism 710 and, in this case, the haptic mechanism 710 may apply a force or stimulation to part of the body of the taught person such that the sensor device 10 acquires a targeted value. In the embodiment, the wearable device 712 is not limited to the glove type like that illustrated in FIG. 11, and the wearable device 712 may be, for example, a wearable device of the arm-cover type that is worn on the arms of the taught person.

In the embodiment, the haptic mechanism 710 is not limited to globe-type wearable device 712, and the haptic mechanism 710 may be, for example, a vibration device that applies vibrations to part of the body of the taught person or a stimulation device utilizing electric muscle stimulation to apply stimulation to muscles. In other words, in the embodiment, the haptic mechanism 710 preferably applies tactile stimulation to part of the body of the taught person, thereby tactilely providing the feedback information 506 as feedback to the taught person (biofeedback).

The haptic mechanism 710 may be used when the taught person performs mental rehearsal. For example, when moves of the expert that serves as a model for the taught person is provided as feedback by the haptic mechanism. 710, the taught person is able to perform mental rehearsal even without a piano, or the like. In this case, playing sound corresponding to the feedback information 506 may be output by the audio output unit 716 to be described below to the taught person. The feedback provided by the haptic mechanism 710 may be reproduced slowly and the playing sound that is output by the audio output unit 716 may be output slowly to increase the effect of mental rehearsal by the taught person.

(Display Unit 714)

The display unit 714 is a device for displaying the feedback information 506 to the user, such as the taught person, and outputs the feedback information 506 using image or light toward the taught person. As illustrated in FIG. 10, the display unit 714 is implemented using a display (image display device), a light-emitting device (not illustrated in the drawing), or the like. Furthermore, the display unit 714 may be implemented using a video output terminal, or the like.

Specifically, the display unit 714 is capable of displaying a difference between the role model and the collaboration level 504 of the taught person that is contained in the feedback information 506 while changing the color according to the magnitude of the difference. Furthermore, as it is difficult for the taught person to perceive the difference when the difference is minute or the duration in which the difference occurs is minute, the display unit 714 may display the aforementioned information of the difference virtually in an enhanced manner. Specifically, the display unit 714 may turns the difference visible by given scalar multiplying (enhancement in a spatial direction) or post the difference in slow motion (enhancement in a time direction). Furthermore, the display unit 714 may display the difference between the previous collaboration level 504 and the current collaboration level 504 of the played person and represent the degree of mastering by the played person.

The display unit 714 may be a projection device capable of displaying an object based on the feedback information 506 as augmented reality (AR) in a real space in a superimposed manner. Such a projection device can be, for example, a smart glass wearable device (not illustrated in the drawing) that is worn in front of the eyes of the taught person. A transmissive display is formed in the smart glass wearable device and the transmissive display holds, in front of the eyes of the taught person, a virtual image optical system formed of a transparent light guide unit, etc., using, for example, a half mirror or a transparent light guide and displays the object on the inside of the virtual image optical system. The projection device may be a HMI) that is mounted on the head of the taught person.

(Audio Output Unit 716)

The audio output unit 716 is a device for outputting the feedback information 506 by sound (alarm) to the user, such as the taught person, and the audio output unit 716 may be, for example, the audio output unit 716 that is worn by the taught person on the ears as illustrated in FIG. 10 or a speaker (not illustrated in the drawing) that is arranged near the taught person. Furthermore, the audio output unit 716 may be implemented using an audio output terminal, or the like. For example, when a difference between the role model and the collaboration level 504 of the taught person occurs, the audio output unit 716 provides feedback by outputting a specific sound to the taught person who is playing.

As described, in the embodiment, it is possible to select a unit corresponding to any one preferable sensory modality from the haptic mechanism 710, the display unit 714 and the audio output unit 716 described above according to the feedback information, etc., and provide feedback to the taught person. Feedback may be provided simultaneously by the haptic mechanism 710, the display unit 714 and the audio output unit 716 simultaneously and the embodiment is not particularly limited. This enables the taught person to feel collaboration of movement elements that is referred to as a "knack" and that is difficult for the taught person to image.

(Main Controller 740)

The main controller 740 is arranged in the user side device 70 and is capable of controlling each block of the user side device 70. The main controller 740 is implemented using, for example, hardware, such as a CPU, a ROM or a RAM.

(Communication Unit 760)

The communication unit 760 is capable of transmitting information to and from an external device, such as the server 30. Note that the communication unit 760 is implemented using a communication device, such as a communication antenna, a transmitting-receiving circuit or a port.

(Storage 770)

The storage 770 is arranged in the user side device 70 and stores programs, etc., for the storage 770 to execute various types of processing and information that is obtained through processing. The storage 770 is implemented using, for example, a magnetic recording medium, such as a hard disk (HD), a nonvolatile memory, such as a flash memory, or the like.

The user side device 70 may include an input unit that is not illustrated in the drawing. The input unit has a function of receiving an input of data and commands to the user side device 70. More specifically, the input unit is implemented using a touch panel, a button, a switch, keys, a keyboard, a microphone, or an image sensor.

In the embodiment, the function of the sensor unit 100 of the sensor device 10 and the haptic mechanism 710 of the user side device 70 may be integrated into a single wearable device.

2.5. Information Processing Method According to Embodiment of Disclosure

Figure 12:
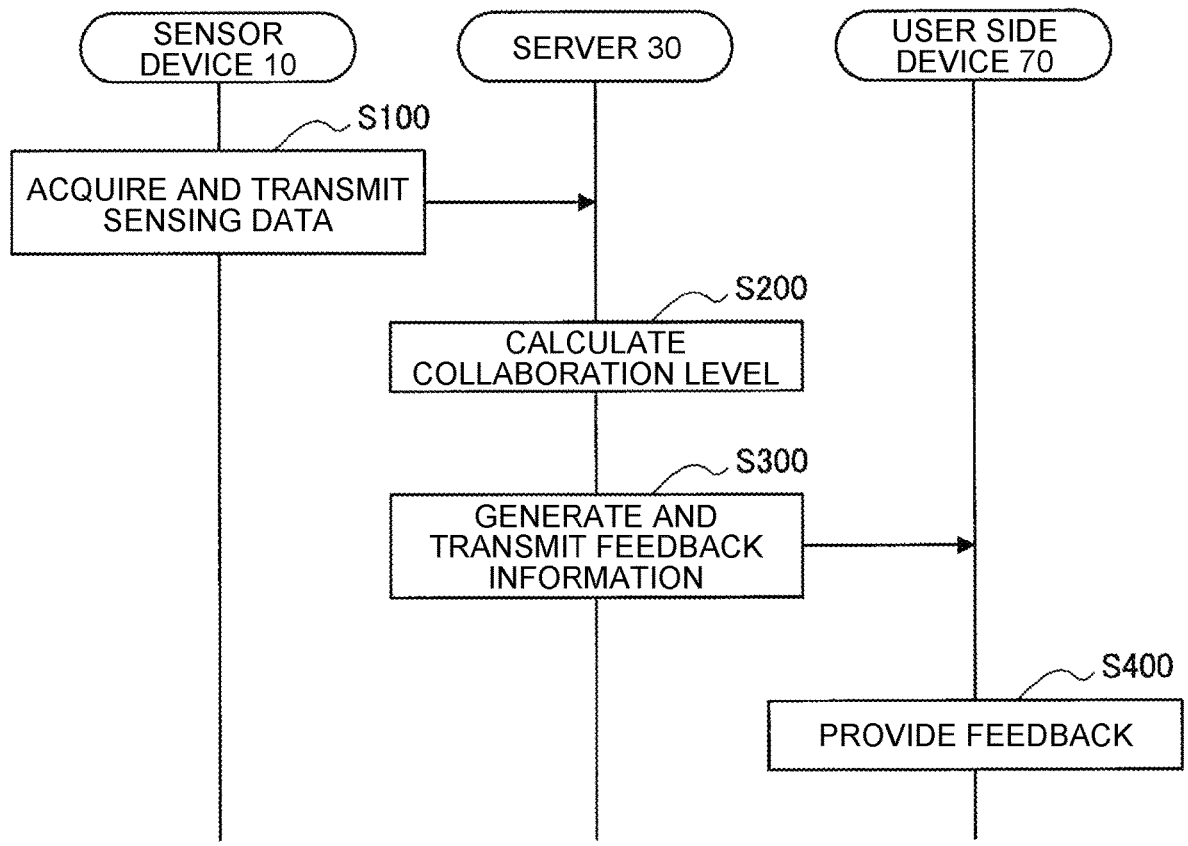
FIG. 12 is a sequence chart to explain an exemplary information processing method according to the embodiment.

The configurations of the information processing system 1 and the sensor device 10, the server 30 and the user side device 70 included by the information processing system 1 have been described in detail. An information processing method according to the embodiment will be described with reference to FIG. 12. FIG. 12 is a sequence chart to explain an exemplary information processing method according to the embodiment. As illustrated in FIG. 12, the information processing method according to the embodiment includes multiple steps from step S100 to step S400. Details of each step that the information processing method includes according to the embodiment will be described.

(Step S100)

First of all, the sensor device 10 is previously worn on part of the body of a taught person before the taught person plays or may be set around the taught person. When the taught person starts given playing (such as a music, a phrase, a scale, an arpeggio, a chord), the sensor unit 100 of the sensor device 10 senses changes in acceleration and angular velocity of each movement element that occur in association with moves of the taught person who is playing and acquires multiple sets of sensing data. The sensor device 10 transmits the acquired sensing data to the server 30.

(Step S200)

The server 30 acquires the sensing data 500 from the sensor device 10. Using a given algorithm based on the sensing data 500, the server 30 calculates the collaboration level 504 of the taught person relating to an intended playing condition.

(Step S300)

The server 30 compares the collaboration level 504 obtained at step S200 described above with a role model that is selected from the DB 372 and, based on the result of comparison, generates the feedback information 506. The server 30 transmits the feedback information 506 to the user side device 70 in order to provide feedback to the taught person.

(Step S400)

The user side device 70 provides feedback to the taught person based on the received feedback information 506.

Figure 13:
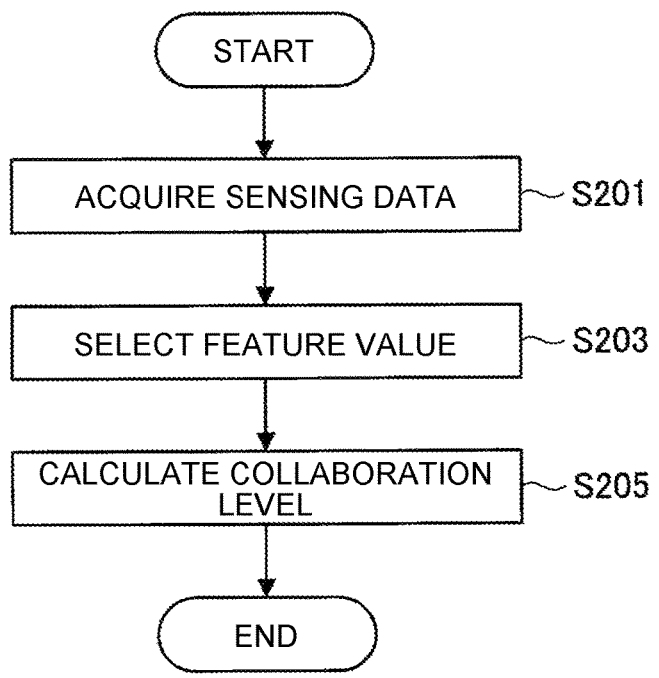
FIG. 13 is a flowchart of step S200 according to the embodiment.

Details of step S200 in FIG. 12 described above will be described with reference to FIG. 13. FIG. 13 is a flowchart of step S200 according to the embodiment. As illustrated in FIG. 13, step S200 according to the embodiment includes multiple steps from step S201 to step S205. Details of each of the steps included by step S200 according to the embodiment will be described below.

(Step S201)

The server 30 acquires multiple sets of sensing data 500 from the sensor device 10.

(Step S203)

The server 30 selects, from the DB 372, the collaboration level 504 highly relating to a pre-set specific playing condition, such as playing accurately or playing fast, that is, a feature value of the specific playing condition.

(Step S205)

The server 30 calculates, from the sensing data 500 on the taught person that is obtained at step S201, the collaboration level 504 of given movement elements corresponding to the feature value that is selected at step S230 described above.

Figure 14:
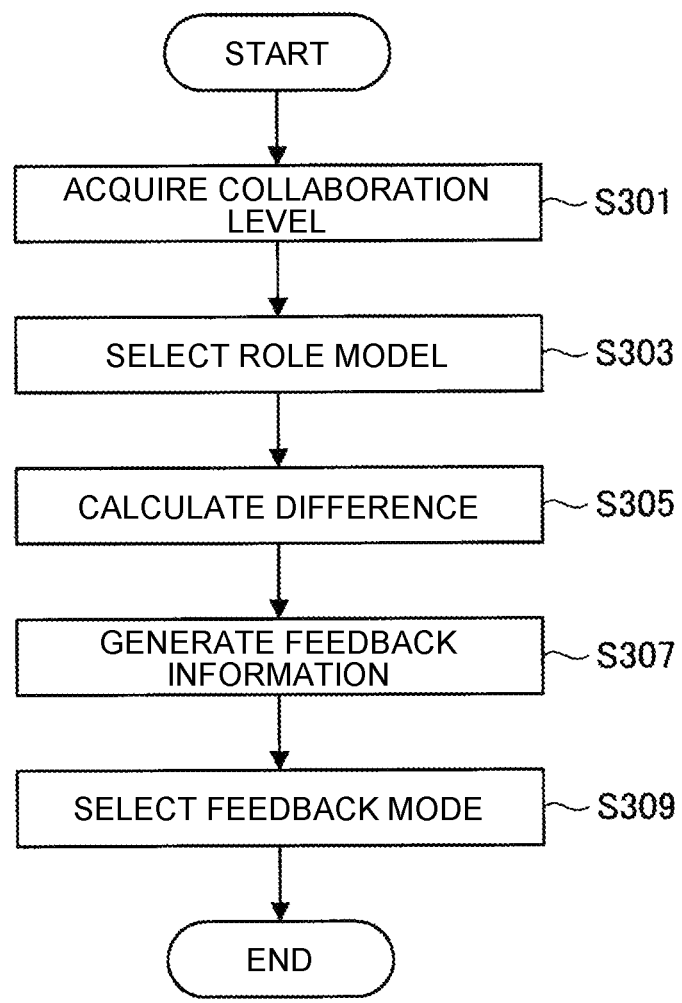
FIG. 14 is a flowchart of step S300 according to the embodiment.

Details of step S300 in FIG. 12 will be described with reference to FIG. 14. FIG. 14 is a flowchart of step S300 according to the embodiment. As illustrated in FIG. 14, specifically, step S300 according to the embodiment includes a plurality of steps from step S301 to step S309. Details of each of the steps included by step S300 according to the embodiment will be described below.

(Step S301)

The server 30 acquires the collaboration level 504 of the taught person that is calculated at step S200 described above.

(Step S303)

The server 30 selects the representative collaboration level 504 (role model) serving as a model for the taught person in a given playing condition, such as accurate playing or speedy playing, from the DB 372.

(Step S305)

The server 30 calculates a difference between the role model that is selected at step S303 described above and the collaboration level 504 of the taught person that is acquired at step 3301.

(Step S305)

The server 30 generates the feedback information 506 based on the difference that is calculated at step S305.

(Step S307)

The server 30 selects a feedback mode (display, audio or haptic) based on the feedback information that is generated at step S305 described above, etc.

As described above, according to the above-described embodiment of the disclosure, it is possible to provide an information processing device that provides, as feedback to a user, information based on a level of collaboration of multiple movement elements in a performance provided by collaborative or non-collaborative moves of multiple parts of a body of the user and that is usable to support mastering a performance; an information processing method; and a program.

Furthermore, according to the embodiment, feedback of the feedback information 506 is provided using a unit corresponding to a preferable sensory modality and thus, for example, the taught person is able to easily know a difference in moves between the taught person and another person (for example, an expert).

3. EXAMPLES ACCORDING TO EMBODIMENT OF DISCLOSURE

Details of the information processing method according to the embodiment of the disclosure has been described. An example of the information processing according to the embodiment of the disclosure will be described more in detail, representing specific examples. The examples given below are examples of the information processing according to the embodiment of the disclosure only and thus the information processing according to the embodiment of the disclosure is not limited to the examples below.

3.1. Example 1

Figure 15:
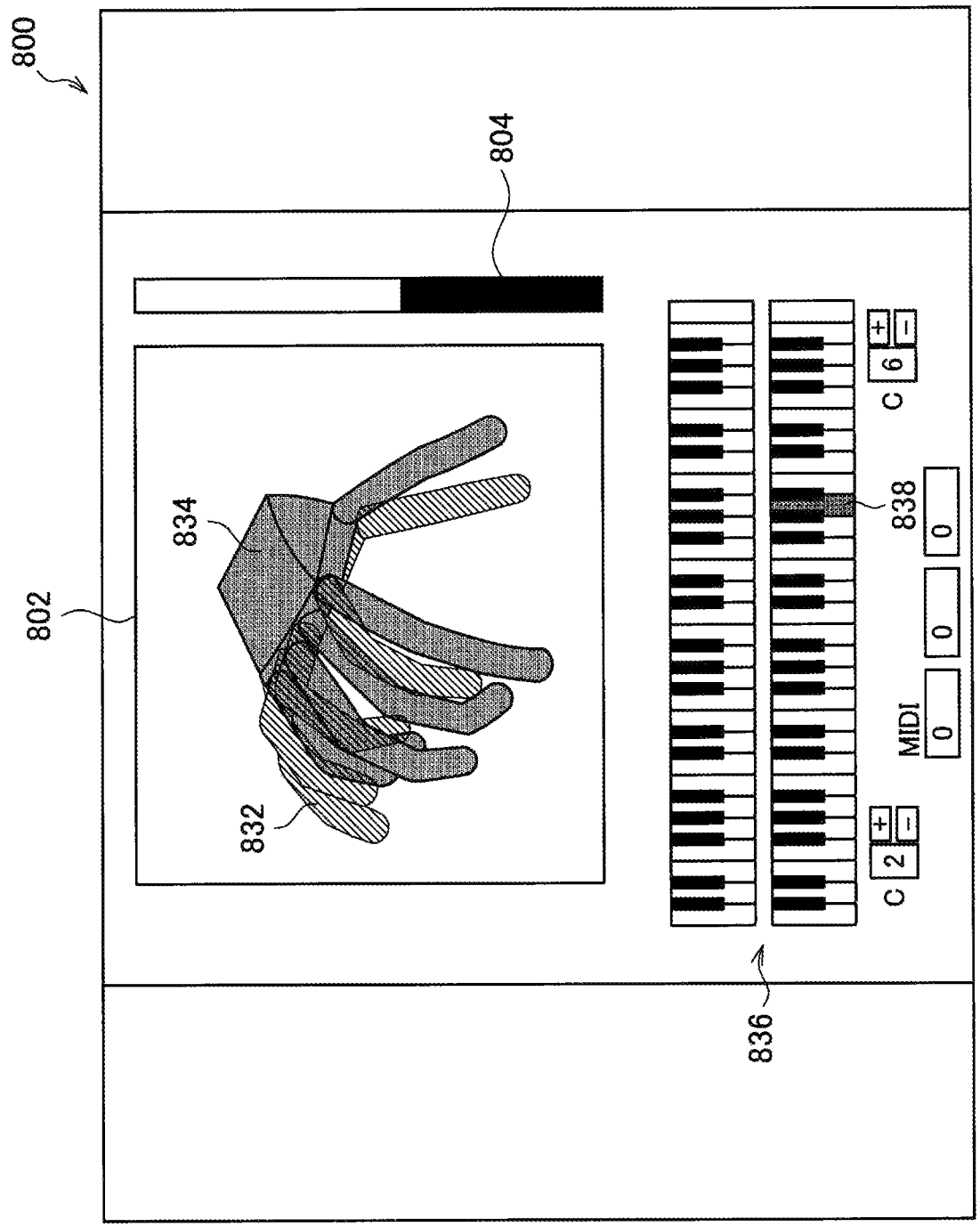
FIG. 15 is an (first) explanatory view for explaining exemplary feedback in Example 1 according to the embodiment of the disclosure.
Figure 16:
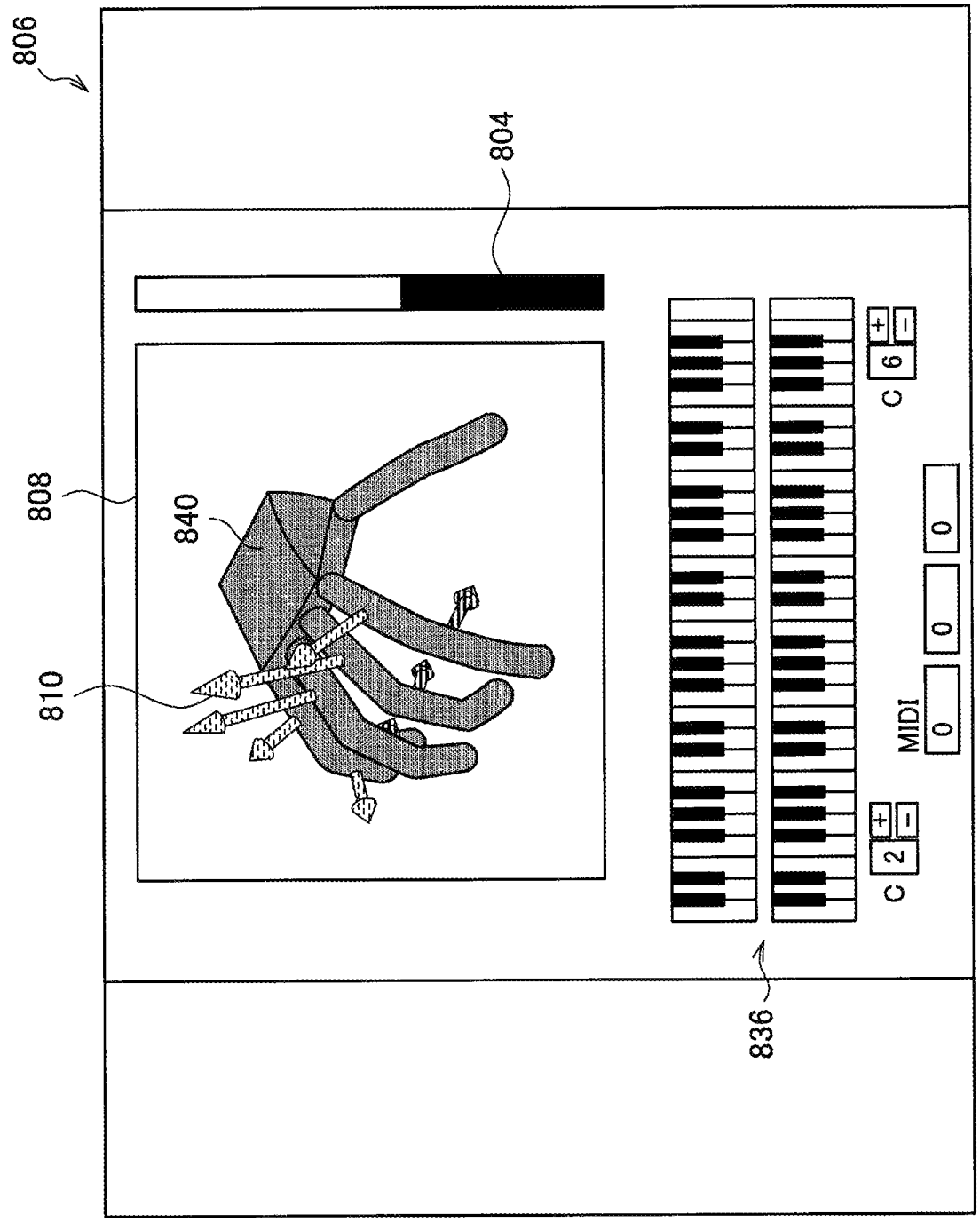
FIG. 16 is an (second) explanatory view for explaining exemplary feedback in Example 2 according to the embodiment of the disclosure.

First of all, Example 1 of the case where the above-described embodiment of the disclosure is applied to a technique mastering support system for playing piano accurately will be described as Example 1 with reference to FIGS. 15 and 16. FIGS. 15 and 16 are explanatory views for explaining exemplary feedback in the example. The technique mastering support system makes it possible to teach a taught person how to move hand fingers to play piano accurately.

In the example, as a preliminary stage, a large number of (for example, about 100) expert players play a given music, part of the music, a phrase (such as a scale, an arpeggio, a chord), or the like. The information processing system 1 according to the embodiment senses movement elements of the player who is playing and collects a large number of sets of sensing data 500. The collected sets of sensing data 500 are labelled according to the playing accuracy (playing condition) 502 and then are input to the server 30 of the information processing system 1. By performing multivariate analysis on the sets of labeled sensing data 500, the server 30 searches for the collaboration level 504 of movement elements highly relating to the playing accuracy.

It is possible to calculate the above-described playing accuracy 502 by sensing the level of conformity between playing by each of the aforementioned players and a score with the microphone 198, or the like, and conforming the playing sound with data of the score that is separately input to the server 30. Specifically, conformity between the rhythm of playing by a player and the rhythm indicated by the score and conformity between the volume of each sound played by a player and a volume of each sound indicated by the score can be taken as the content to determine conformity. The playing accuracy 502 may be, for example, input subjectively by the user, or the like, (for example, an index indicating a level of accuracy of the player that is determined by subjectivity of the user may be input) and the playing accuracy 502 is not particularly limited.

The taught person then performs the given music. The server 30 selects the representative collaboration level 504 (role model) of high playing accuracy that serves as a model for the taught person from the DB 372 and compares the selected role model with the collaboration level 504 that is calculated based on the sensing data 500 obtained from the playing. The server 30 further generates the feedback information 506 based on the result of comparison and transmits the feedback information 506 to the user side device 70. In the example, the role model and the collaboration level 504 of the taught person are compared with each other and it is determined from an analysis that the cause of maximizing the shift from the role model is the movement elements of right hand fingers of the taught person. In that case, the server 30 may extract directions and amounts of moves of right hand fingers of the taught person that are necessary to make the shift zero.

The user side device 70 then provides feedback for accurate playing to the taught person based on the received feedback information 506. Specifically, the user side device 70 displays a display screen 800 like that illustrated in FIG. 15 to the taught person who is playing or is after playing. The display screen 800 includes on the right a conformity index bar 804 indicating the level of conformity between the role model and the collaboration level 504 of the taught person. The higher the level of conformity is, the more the conformity index bar 804 is displayed in an upwardly elongated manner, which allows the taught person to instantly know the shift of the taught person from the role model at a glance.

The top half of the center of the display screen 800 contains a hand finger display screen 802 that displays postures and moves of hand fingers. As illustrated in FIG. 15, two imaging images schematically illustrating the right hand fingers on which it is determined that the right hand fingers maximize the shift from the role model are displayed in a superimposed manner. Specifically, an imaging image 832 of hand fingers that are represented by slashes in FIG. 15 represents the postures and motions of the hand fingers of the expert according to the role model and an imaging image 834 of the hand fingers that is the other image represents the postures and motions of hand fingers of the taught person. According to the hand finger display screen 802, the postures and motions of hand fingers of the expert according to the role model are displayed as an image in a superimposed manner on the hand fingers and motions of the taught person, which allows the taught person to know the shift of the taught person in motion from the expert. Accordingly, in the embodiment, the taught person is able to correct the sift of the right hand fingers of the taught person, approximate the collaboration level 504 of the taught person to the role model, and master a technique for accurate playing.

The bottom half of the center of the display screen 800 contains a keyboard display screen 836 that schematically displays keyboards. For example, the upper keyboard can be a screen corresponding to playing by the left hand fingers and the lower keyboard can be a screen corresponding to playing by the right hand fingers. For example, when the taught person presses a key of a sound different from that of a given score by mistake, a keyboard 838 corresponding to the sound that the taught person cannot make by key pressing may be displayed in a different color from that of other keyboards. In the embodiment, when an event in which a keyboard reaches the bottom or a keyboard key starts lifting occurs, an alert display (not illustrated in the drawing) may be displayed in realtime on the display screen 800 or a given alert sound may be output to represent occurrence of the event to the taught person. The taught person, or the like, is able to previously set what event occurrence causes an output of an alert like that as described above.

The feedback in the example may be a display screen 806 like that illustrated in FIG. 16. Like the display screen 800 in FIG. 15, the display screen 806 includes a hand finger display screen 808, the conformity index bar 804, and the keyboard display screen 836. The conformity index bar 804 of the display screen 806 and the keyboard display screen 836 are the same as those in the display screen 800 and thus description thereof is omitted and the hand finger display screen 808 will be described.

Specifically, the top half of the center of the display screen 806 contains a hand finger display screen 808 that displays postures and moves of hand fingers. As illustrated in FIG. 16, in the display screen 806, an imaging image 840 schematically illustrating the right hand fingers of the taught person is displayed. The imaging image 840 represents postures and moves of the hand fingers of the taught person. Furthermore, multiple vectors 810 are represented in part of the imaging image 840. Each of the vectors 810 represents a direction move of a right hand finger of the taught person and an amount of move (scholar) necessary to make the shift between the role model and the collaboration level 504 of the taught person zero. According to the display screen 806, the shifts each between the posture and motion of the hand finger of the taught person and the posture and motion of the hand finger of the expert according to the role model are illustrated as the vectors 810 in the drawing and this allows the taught person to know the shift in move between the taught person and the expert at a glance. Accordingly, in the example, the taught person is able to correct the shifts of the hand fingers of the taught person according to the displayed vectors 810, approximate the collaboration level 504 of the taught person to the role model, and master a technique for accurate playing.

3.2. Example 2

Figure 17:
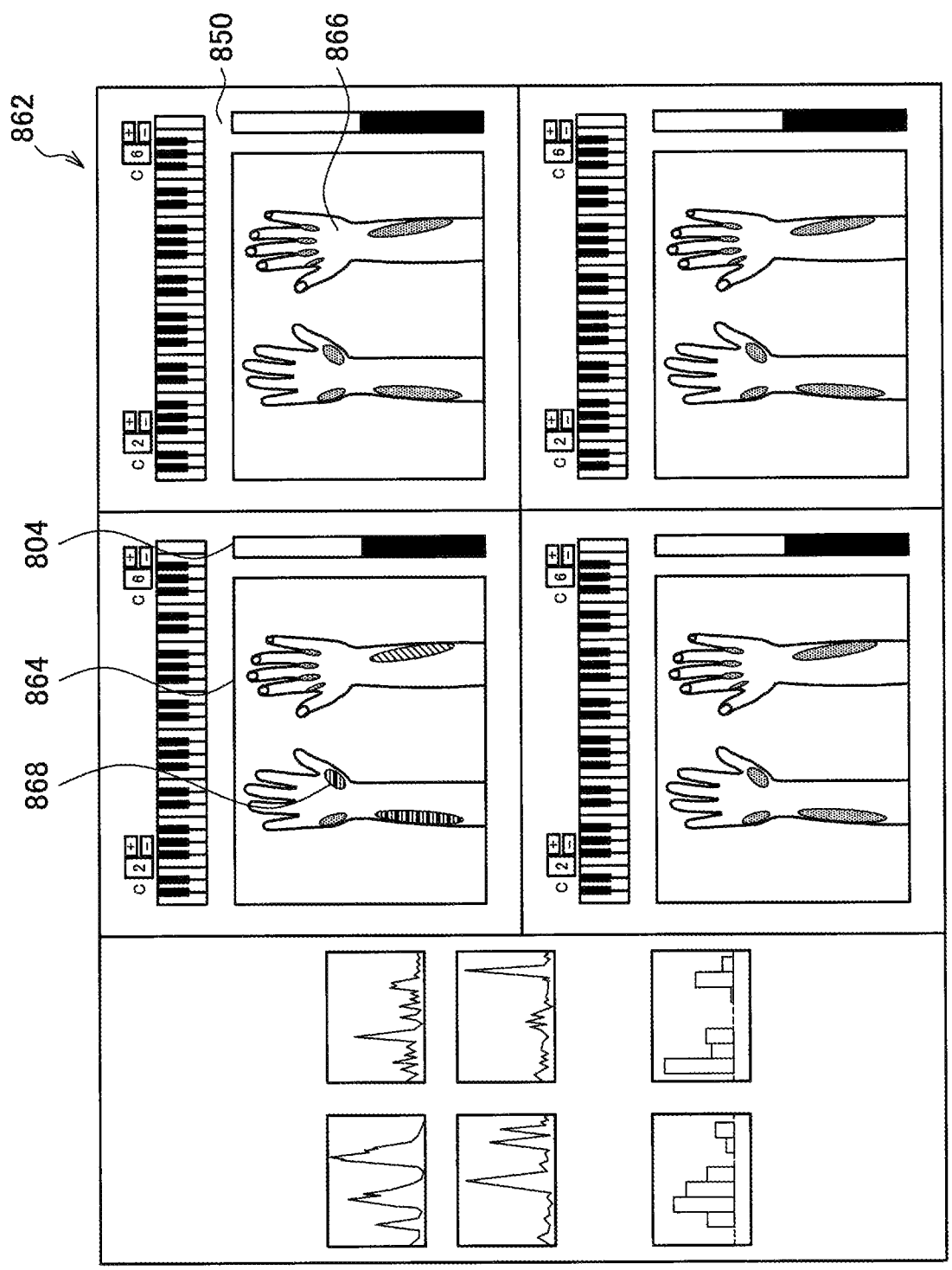
FIG. 17 is an (first) explanatory view for explaining exemplary feedback in Example 2 according to the embodiment of the disclosure.
Figure 18:
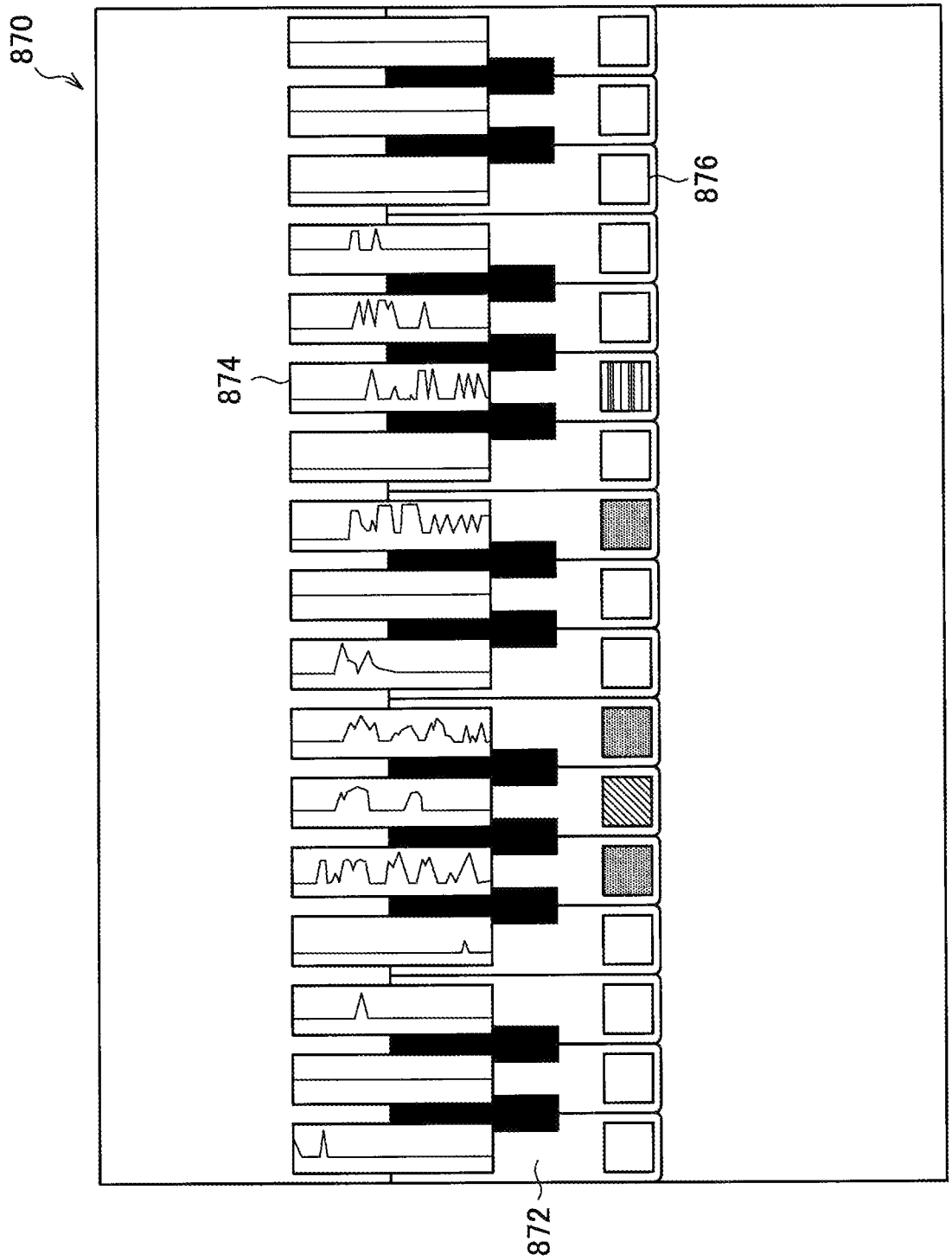
FIG. 18 is an (second) explanatory view for explaining exemplary feedback in Example 2 according to the embodiment of the disclosure.

Example 2 of the case where the above-described embodiment of the disclosure is applied to a technique mastering support system for playing piano fast will be described as Example 2 with reference to FIGS. 17 and 18. FIGS. 17 and 18 are explanatory views for explaining exemplary feedback in the example. The technique mastering support system makes it possible to teach a taught person how to move hand fingers and how to use muscles to play piano fast.

First of all, also in the example, as a preliminary stage, a large number of expert players play a given music, part of the music, a phrase, or the like, and the information processing system 1 according to the embodiment collects a large number of sets of sensing data 500. Furthermore, the collected sets of sensing data are labelled according to the playing speed (playing condition) 502 and then are input to the server 30 of the information processing system 1. By performing multivariate analysis on the sets of labeled sensing data 500, the server 30 searches for the collaboration level 504 of movement elements highly relating to the playing speed.

The taught person then performs the given music. The server 30 selects the representative collaboration level 504 (role model) of high playing speed that serves as a model for the taught person from the DB 372 and compares the selected role model with the collaboration level 504 that is calculated based on the sensing data 500 obtained from the playing. The server 30 further grenades the feedback information 506 based on the result of comparison and transmits the feedback information 506 to the user side device 70. In the example, the role model and the collaboration level 504 of the taught person are compared with each other and it is determined from an analysis that the cause of maximizing the shift from the role model is how the muscles of both the arms and the hand fingers of the taught person are tensed. In that case, the server 30 may extract amounts of activity of muscles of both the arms and the hand fingers of the taught person that are necessary to make the shift zero.

The user side device 70 then provides feedback for fast playing to the taught person based on the received feedback information 506. Specifically, the user side device 70 displays a display screen 862 like that illustrated in FIG. 17 to the taught person. The display screen 862 is a screen for providing feedback on muscle activities of the taught person at each time point. In the example, as described above, because it is determined that the cause of maximizing the shift between the collaboration level 504 of the taught person and the role model is how to tense the muscles of both the arms and the hand fingers of the taught person, information on muscle activities is provided as feedback to the taught person.

Specifically, the display screen 862 includes a plurality of windows 850 for providing, as feedback, information on the muscle activities of the taught person at each time point during playing by the taught person. As illustrated in FIG. 17, like the display screen 800 in FIG. 15, each of the windows 850 contains a hand finger display screen 864 and the conformity index bar 804. The hand finger display screen 864 further includes an imaging image 866 schematically illustrating the two left and right arms from the finger tips to the antebrachial region. Area displays 868 are illustrated in part of each of the imaging images. Specifically, the color of the area displays 868 in the positions of muscles of the arms and hand fingers necessary to make the shift between the role model and the collaboration level 504 of the taught person zero varies according to amounts of muscle activity necessary to make the shift zero (specifically, the level of tension). According to the display screen 862, the positions of muscles in which a difference in the amount of muscle activity between the taught person and the expert of the role model occurs and the difference in the amount of muscle activity are represented by color, which allows the taught person to know the shift in move between the taught person and the expert at a glance. Accordingly, in the example, the taught person is able to tense the muscles of his/her arms and hand fingers or reduce the tension according to the display screen 862 to approximate the collaboration level 504 of the taught person to the role model, thereby mastering techniques for quick playing. In FIG. 17, the difference in color represents the positions of muscles in which a difference in the amount of muscle activity between the taught person and the expert of the role model occurs and the difference in the amount of muscle activity; however, the example is not limited thereto and the difference may be represented using a difference in pattern or symbols (markers).

In the example, a display screen 870 like that illustrated in FIG. 18 may be displayed to the taught person. The display screen 870 incudes a keyboard display screen 872 schematically illustrating a keyboard where each white key illustrated in the keyboard display screen 872 is provided with a speed display 876. The speed display 876 reproduces motions of each keyboard caused by playing by the taught person (or a player) by animation. Furthermore, the color of the speed display 876 varies according to the speed at which the taught person presses the corresponding white key and, more specifically, varies according to a difference between the speed of key pressing by the taught person and the key pressing speed by the expert according to the role model. Thus, according to the keyboard display screen 872, because the difference in speed from the expert is displayed by color, the taught person is able to know at a glance which white key to press and which hand finger has to be moved quickly to press the white key. Note that the speed display 876 may be displayed as part of the keyboard or may be displayed as the whole keyboard. A bar display 908 (refer to FIG. 33) may be used as the speed display 876. The height (or length) of the bar display 908 may vary according to the speed of the keyboard, that is, the key pressing speed. In addition to the key pressing speed, other feature values (a maximum key pressing speed, the timing at which the maximum key pressing speed is reached, a maximum acceleration, the timing when the maximum acceleration is reached, the timing a keyboard starts moving, and the timing at which the keyboard reaches the bottom, etc.) or the sensing data 500 may be displayed using the bar display 908 of a bar graph, a graph such as a pie chart (not illustrated in the drawing), numeric values, animation, or the like. By changing the color, pattern, shape, etc., of the bar display 908 and other displays, whether the taught person (or the player) presses the key or a finger of the taught person, or the like, separates from the key (key release) may be represented. More specifically, for example, a mark (display) with a given color may be displayed at the timing when the taught person, or the like, presses the key, and, on the other hand, a mark with a color other than the aforementioned given color may be displayed at the timing when the key is released, thereby distinguishing whether the key is pressed or the key is released. In this case, the mark not only displays whether the key is pressed or the key is released but also keeps being displayed until a given time elapses after the key is pressed or released. Details of the bar display 908, etc., will be described below.

In the display screen 870, a time series data display 874 representing time series data on the speed of a hand finger of the taught person pressing a corresponding keyboard is provided above each white key of the keyboard display screen 872 such that the time series data displays 874 respectively correspond to white keys. On the time series data display 874, time series data of the difference between the speed of key pressing by the taught person and the speed of the expert may be displayed. The time series data may further contains a marker (not illustrated in the drawing) illustrating the point of time of the fastest speed, the timing when a hand finger is lifted from the keyboard in an enhanced manner.

3.3. Other Application Examples

The embodiment of the disclosure is not limited to the above-described examples and may be applied to various uses. Various application examples of the embodiment of the disclosure will be briefly described.

Application Example 1

The embodiment of the disclosure is applicable to mastering a playing style like that of a specific player A, such as a famous player. Specifically, the information processing system 1 according to the embodiment collects sensing data 500 on playing by the player A. The information processing system 1 (specifically, the learning unit 348) calculates the collaboration level 504 of movement elements of playing by the player A based on the collected sensing data 500 and compares the calculated collaboration level 504 with that of another player. In this manner, in the application example, the collaboration level 504 featuring the playing by the player A, that is, a feature value extracted. By selecting the extracted feature value as a role model, the taught person is able to use the information processing system 1 according to the embodiment to master a playing style like that of the player A. In the application example, using the feature value featuring the playing by the player A enables reproduction of playing similar to that of the player A using a humanoid robot, robot arms, or the like.

In the application example, storing the feature values featuring playing by multiple players as a database makes it possible to determine to which player in the database playing by another player is close in the playing style. Specifically, the information processing system 1 according to the embodiment collects multiple sets of sensing data 500 from playing by a player not in the database and, using the collected sets of sensing data 500, extracts a feature value (second feature information) of playing by another player. Furthermore, by calculating a distance in a virtual space between the calculated feature value of the another player and the feature value of each player in the database and comparing the calculated distances, the information processing system 1 (specifically, the server 30) is able to determine (classify) to which player in the database the another player is close in playing.

In the application example, it is possible to classify the another player from the feature values of the respective players in the database and accordingly, for example, preliminarily diagnose whether there is a disorder, such as dystonia. Specifically, the information processing system 1 according to the embodiment classifies (clusters) multiple players into healthy expert players, healthy general players, healthy beginners, dystonia patients, and non-players (who has never played piano) and has each person to play and collects the sensing data 500 on each person. The information processing system 1 (specifically, the learning unit 348) analyzes the multiple sets of sensing data 500 that are associated with each cluster, extracts the feature value of each cluster, and turns the extracted feature value into the database as the feature value featuring playing by the persons contained in each cluster. Furthermore, by collecting multiple sets of sensing data 500 from playing by a player with a possibility that the player is affected by dystonia, calculating a feature value of the player, and comparing the calculated feature value with the feature value of each cluster in the database, the information processing system 1 is able to diagnose whether the player is affected by dystonia.

In the application example, not only diagnosing whether the player is affection by dystonia but also collecting information of the history of physical troubles of the player, etc., make it possible to predict a future physical trouble of the player (a high risk of physical trouble of a part, or the like).

In the application example, it is also possible to evaluate the effect of practicing by comparing the previous and current and feature values of the taught person. In the application example, by making comparison with a feature value of a player in the best condition, it is possible to examine a clue for the player to come out of a slump.

Application Example 2

The embodiment of the disclosure is applicable to mastering a playing style in order to win an award in a competition. Specifically, the information processing system 1 according to the embodiment collects the sensing data 500 on playing by an award winner in a competition in the past. Furthermore, the information processing system (specifically, the learning unit 348) extracts a feature value of the award winner by calculating the feature value (the collaboration level 504 of movement elements) in the playing by the ward winner based on the collected sensing data 500 and comparing the feature value of a non-awarded person. By selecting the extracted feature value as a role model, the taught person is able to use the information processing system 1 according to the embodiment to master a playing style in order to win an award in a competition.

The application example is not limited to collecting the sensing data 500 of movement elements of the award winner directly, and the sound of the playing by the award winner in the competition may be collected. In such a case, the information processing system 1 acquires relationship information representing a relationship between a parameter (such as a force) of key pressing on a piano with a robot, or the like, and sound caused by the key pressing. Analyzing the sound of the playing in the competition using the aforementioned relationship information makes it possible to acquire the parameter on the key pressing by the award winner as the sensing data 500.

Application Example 3

The embodiment of the disclosure is applicable to the case where a player selects a preferable piano. For example, as described above, the information processing system 1 according to the embodiment acquires relationship information representing a relationship between parameters (such as forces) of key pressing on various pianos with a robot, or the like, and sounds caused by the key pressing. The information processing system 1 analyzes the relationship information, thereby specifies parameter on key pressing necessary to produce a sound (vibrancy or tone) in a given condition in the various pianos and extracts feature values featuring the respective pianos. For example, a feature value of a piano can be information, such as "Piano A is difficult to produce soft tones", "Piano B has weak vibrancy", "Piano C does not have vibrancy without strong key pressing", or "Piano D produces no sound without quick key pressing". By utilizing the piano feature values and the feature value of each player described above in combination with each other, the information processing system 1 makes it possible to select a piano preferable to the player.

In the application example, it is possible to select a piano preferable in operability and expression desired by the player by referring to the feature value of each piano and it is possible to select a piano preferable to a venue for playing (for example, the vibrancy of sound differs depending on the venue for playing). Furthermore, in the application example, the information processing system 1 provides feedback of the feature value of each piano and the feature value of each player to a tuner to enable the information processing system 1 to function as a support device when the tuner tunes a piano according to the player.

In the application example, information of a position or environment (such as a temperature, a pressure, or a humidity) in which a player plays, which is information acquired by the sensor unit 100 of the sensor device 10, may be used. Specifically, the quality of sound (vibrancy, volume, etc.,) of a piano varies according to the environment in which the piano is played (the structure, temperature, humidity of a hall for playing). Thus, in the application example, for example, based on the positional information that is acquired by the positional information sensor of the sensor device 10, the information processing system 1 acquires information on the hall for playing in which the piano is played. The information processing system 1 also acquires information (such as vibrancy of sound) on playing played in the hall for playing and environmental information (such as the temperature, pressure, or humidity) on the environment in which the playing is performed. Utilizing these acquired sets of information, the information processing system 1 acquires and learns the feature value of the hall for playing (such as the vibrancy or volume) and relationship information representing the relationship between the environmental information and sound. Furthermore, utilizing the feature value of the hall for playing and the above-described relationship information and, in addition, the above-described feature value of the piano, the feature value of the player, etc., the information processing system 1 is able to select a piano preferable for the player to play in a hall for playing or a piano preferable to the weather (environment) of the date of a concert.

In each of the above-described application examples, the feature value of the player is described as the collaboration level 504 of movement elements that features playing by the player; however, the embodiment of the disclosure is not limited thereto. In other words, in the embodiment, the feature value of a player is not particularly limited as long as the feature value is information that can feature playing by the player and, for example, the feature value may be sensing data of movement elements.

Application Example 4

In the above description, the case where the embodiment of the disclosure is applied to playing piano; however, the embodiment is also applicable to playing another music instrument. For example, the embodiment is also applicable to another keyboard music instrument (such as an organ, a cembalo or a synthesizer), string instrument (such as a violin or a cello), percussion instrument (such as drums), or wind instrument (such as a flute, an oboe, a clarinet or a trumpet). Specifically, even when the aforementioned various music instruments are played, the sensor device 10 according to the embodiment is able to detect moves of hand fingers, legs, the neck, the throat, or the like, and the positions of strings and holes to press. More specifically, motions of the tongue in the oral cavity of the player are detectable by MRI described above. The embodiment is not limited to application to playing music instruments and the embodiment is also applicable to singing and whistling.

Application Example 5

The embodiment of the disclosure is also applicable to performance other than music. For example, the embodiment is usable for training in phonation (such as English pronunciation or speech), sports, rehabilitation (such as rehabilitation to improve physical paralysis), games, training for medical operations (training for preventive endoscopy), training for driving a vehicle (such as a car, a bike, a wheel chair, an airplane), a training for operating an apparatus (a construction equipment), a technical training for creating arts and artworks (paintings, calligraphies, arts of paper folding), etc. The embodiment is also applicable to mental rehearsal as described above.

4. SUMMARY

As described above, according to the embodiment of the above-described disclosure, it is possible to provide an information processing device that provides, as feedback to a user, information based on a level of collaboration of multiple movement elements in a performance provided by collaborative or non-collaborative moves of multiple parts of a body of the user and that is usable to support mastering a performance; an information processing method; and a program.

Furthermore, according to the embodiment, feedback of the feedback information is provided using a unit corresponding to a preferable sensory modality and thus, for example, the taught person is able to easily know a difference in move between the taught person and another person (for example, an expert) and a difference in move between the previous taught person and the current taught person. Accordingly, in the embodiment, it is possible to support the taught person in mastering a "knack", that is, in mastering a performance. In the embodiment, it is possible to easily know a level of mastering by the taught person by not only making comparison with another person but also comparison between the current taught person and the previous taught person.

5. ABOUT HARDWARE CONFIGURATION

Figure 19:
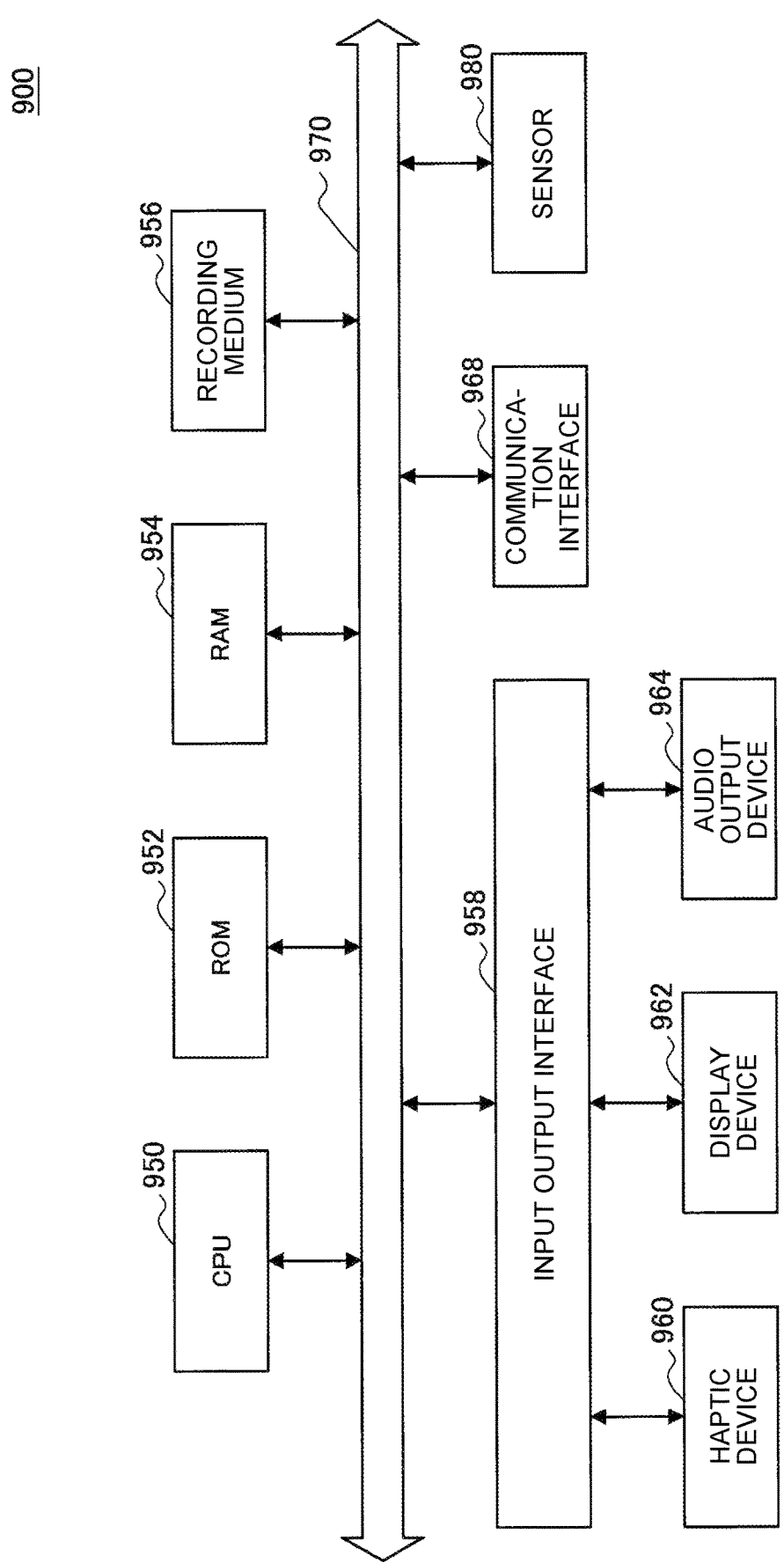
FIG. 19 is an explanatory view illustrating an exemplary hardware configuration of an information processing device 900 according to the embodiment.

FIG. 19 is an explanatory view illustrating an exemplary hardware configuration of an information processing device 900 according to the embodiment. FIG. 19 illustrates an exemplary hardware configuration of the above-described server 30.

The information processing device 900 includes, for example, a CPU 950, a ROM 952, a RAM 954, a recording medium 956, and an input-output interface 958. The information processing device 900 further includes a haptic device 960, a display device 962, an audio output device 964, a communication interface 968, and a sensor 980. The information processing device 900 connects the components with one another, for example, via a bus 970 serving as a data transmission path.

(CPU 950)

The CPU 950, functions as the main controller 340 that is formed using at least one processor formed of an operational circuit, such as a CPU, various processing circuits, or the like, and that controls the entire information processing device 900.

(ROM 952 and RAM 954)

The ROM 952 stores data for control, such as programs and operational parameters that the CPU 950 uses. The RAM 954, for example, temporarily stores programs to be executed by the CPU 950, etc. The RCM 952 and the RAM 954, for example, function as the above-described storage 370 in the information processing device 900.

(Recording Medium 956)

The recording medium 956 function s as the above-described storage 370 and, for example, stores data on the information processing method according to the embodiment and various types of data, such as various applications. For example, a magnetic recording medium, such as a hard disk, or a non-volatile memory, such as a flash memory, is taken as the recording medium 956. The recording medium 956 may be detachable from the information processing device 900.

(Input-Output Interface 958, Haptic Device 960, Display Device 962 and Audio Output Device 964)

The input-output interface 958, for example, connects the haptic device 960, the display device 962, and the audio output device 964 with one another. For example, a USB (Universal Serial Bus) terminal, a DVI (Digital Visual Interface) terminal, a HDMI (High-Definition Multimedia Interface) (trademark) terminal, various processing circuits, etc., are taken as the input-output interface 958.

The haptic device 960 functions as the haptic mechanism 710 described above, the display device 962 functions as the display unit 714 described above, and the audio output device 964 functions as the audio output unit 716 described above. For example, a liquid crystal display or an organic EL (Electro-Luminescence) display is taken as the display device 962.

Needless to say, the input-output interface 958 is connectable with an external device of the information processing device 900, such as an external operational input device (such as a keyboard or a mouse) or an external display device.

(Communication Interface 968)

The communication interface 968 is a communication unit of the information processing device 900 and functions as the communication unit 360 and the communication interface 968 functions as a communication unit (not illustrated in the drawing) for performing wired or wireless communication with external devices via the network 90 (or directly). For example, a communication antenna and a RF (Radio Frequency) circuit (wireless communication), an IEEE802.15.1 port and a transmitter-receiver circuit (wireless communication), an IEEE802.11 port and a transmitter-receiver circuit (wireless communication), or a LAN (Local Area Network) terminal and a transmitter-receiver circuit (wired communication) are taken as the communication interface 968.

The exemplary hardware configuration of the information processing device 900 has been described. The hardware configuration of the information processing device 900 is not limited to the configuration illustrated in FIG. 19. Specifically, each of the components described above may be formed using general-purpose members or hardware specializing in the function of each component. The configuration can be changed appropriately according to the technical level on occasion when implemented.

For example, the information processing device 900 need not include the communication interface 968 when communicating with an external device via a connected external communication device or when configured to perform stand-alone processing. The communication interface 968 may have a configuration enabling communication with at least one external device according to multiple communication systems.

The information processing device according to the embodiment may be applied to a system designed for connection to a network (or communication between devices) and formed of a plurality of devices as in, for example, cloud computing. In other words, the information processing device according to the above-described embodiment is implementable as, for example, an information processing system that performs the process according to the information processing method according to the embodiment with a plurality of devices.

6. SECOND EMBODIMENT

The above-described embodiment of the disclosure can be modified as follows. Various modifications will be described below as a second embodiment of the disclosure.

6.1. Modification 1

Figure 20:
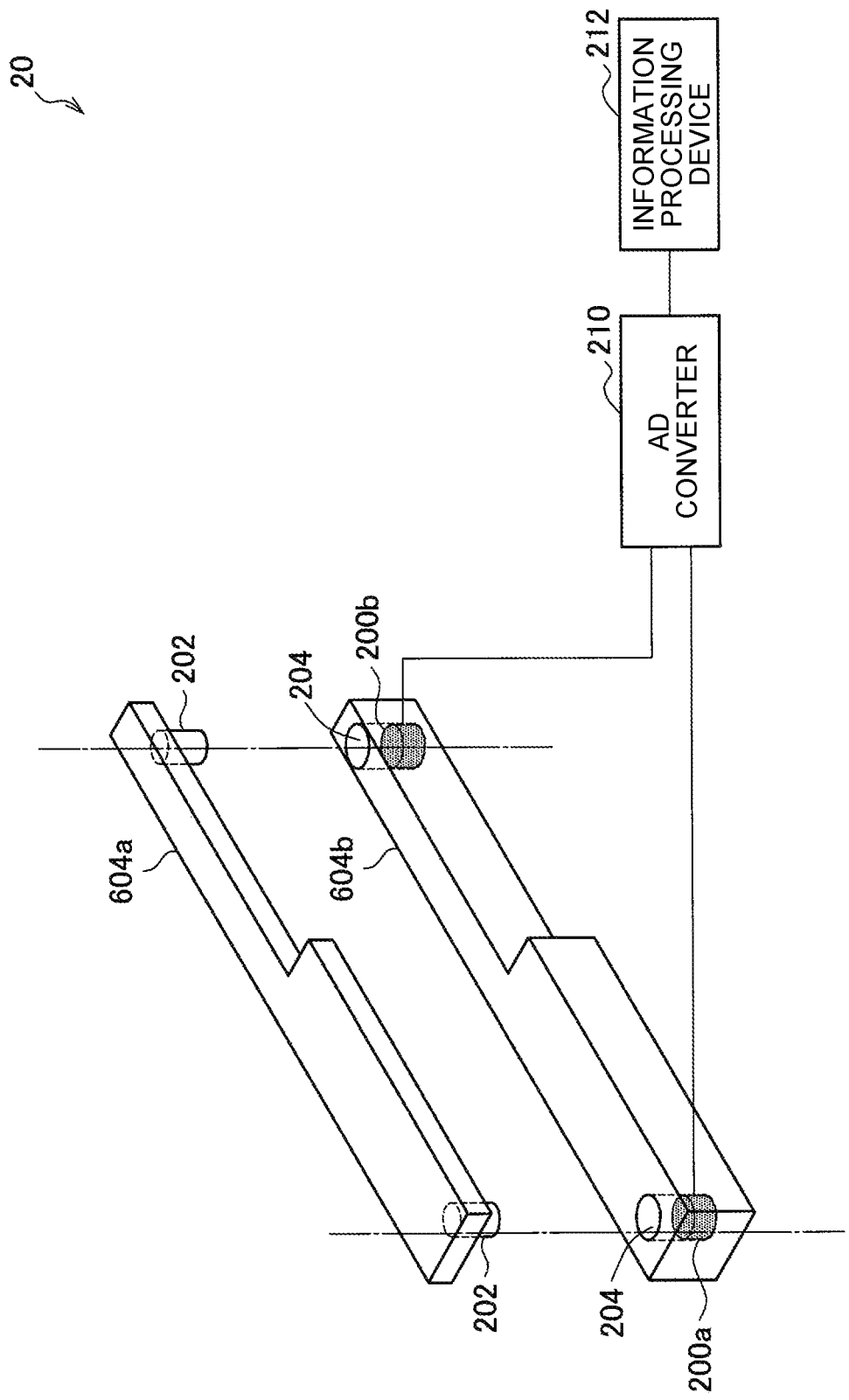
FIG. 20 is an explanatory view for explaining a configuration of a pressure sensor device 20 according to Modification 1 of a second embodiment of the disclosure.
Figure 21:
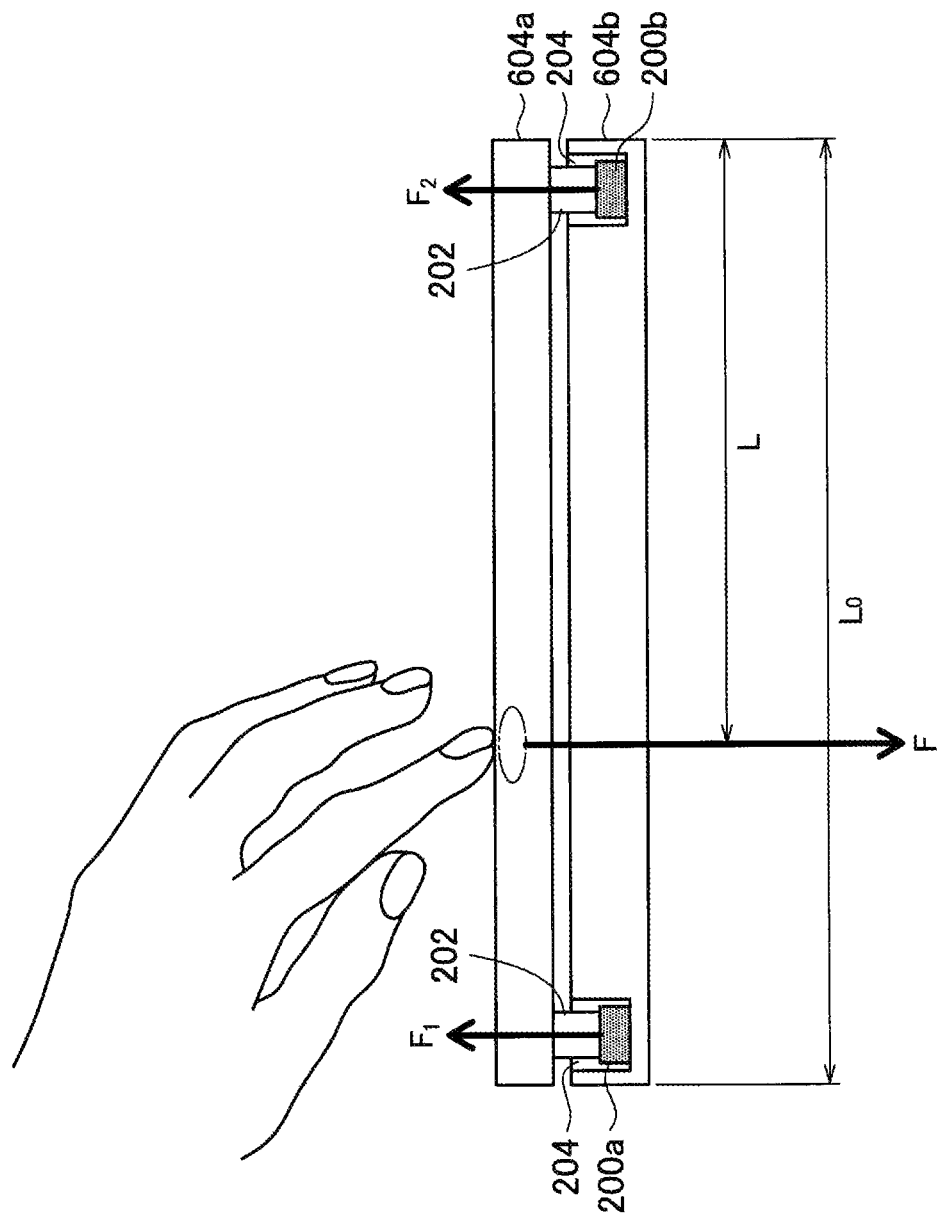
FIG. 21 is an explanatory view for explaining moves of the pressure sensor device 20 according to the modification.
Figure 22:
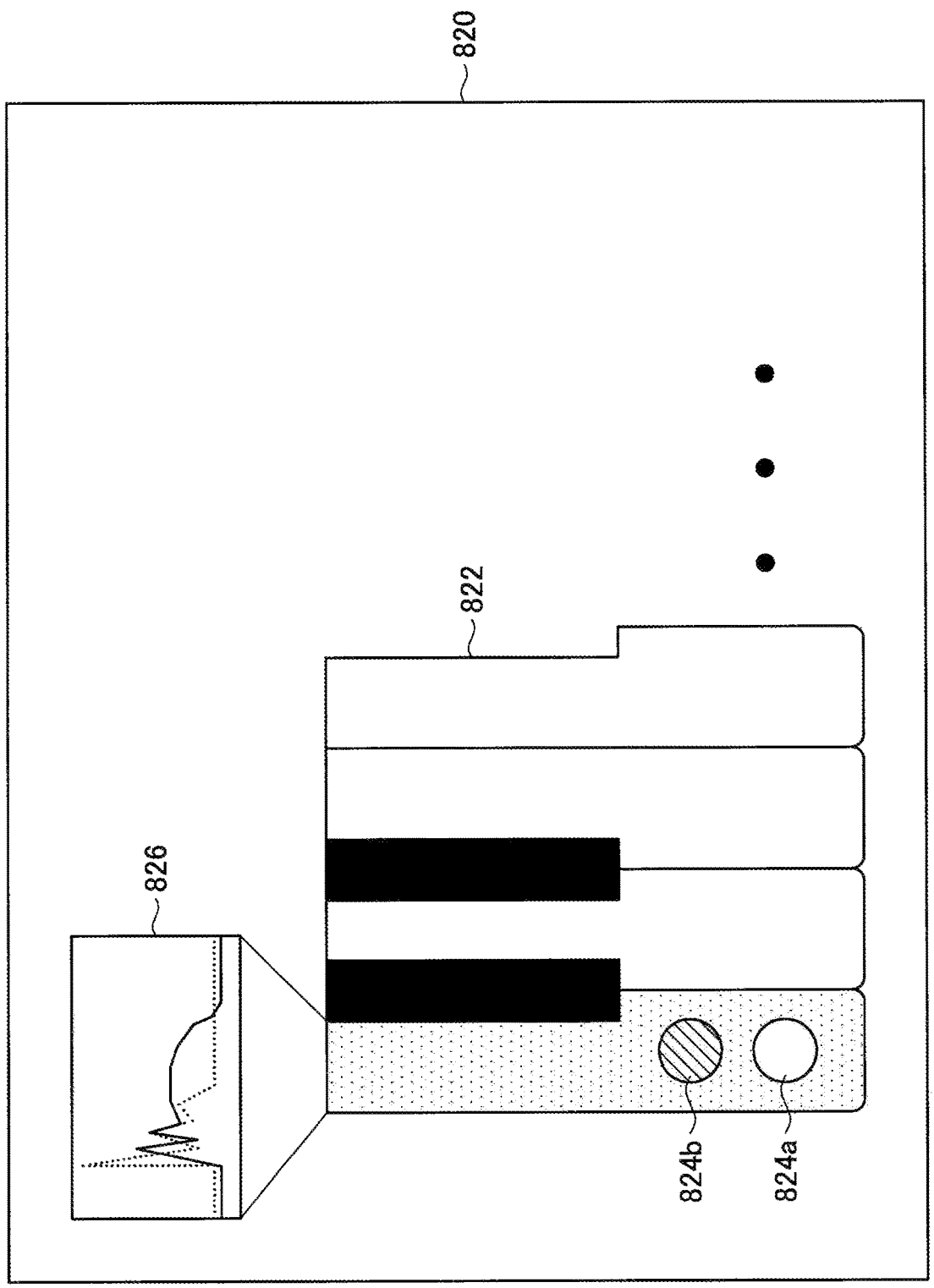
FIG. 22 is an explanatory view to explain exemplary feedback of a result of measuring by the pressure sensor device 20 according to the modification.

First of all, Modification 1 using a pressure sensor device 20 that measures in which position on a piano keyboard a finger of a taught person or a player presses the key and furthermore by how much force the keyboard is pressed will be described with reference to FIGS. 20 to 22. FIG. 20 is an explanatory view for explaining a configuration of the pressure sensor device 20 according to Modification 1. FIG. 21 is an explanatory view for explaining moves of the pressure sensor device 20 according to Modification 1. FIG. 22 is an explanatory view for explaining exemplary feedback of a result of measuring by the pressure sensor device 20 according to Modification 1.

(Configuration)

With reference to FIG. 20, a configuration of the pressure sensor device 20 will be described. As illustrated in FIG. 20, the pressure sensor device 20 according to the modification mainly includes pressure sensors 200 that are arranged at the bottom of a keyboard 604 (a white key in FIG. 20), an AD (Analog/Digital) converter 210 that converts sensing data of the pressure sensors 200, and an information processing device 212 that processes the converted sensing data.

Specifically, as illustrated in FIG. 20, the pressure sensor device 20 includes the keyboard 604 formed of an upper keyboard 604a and a lower keyboard 604b in a pair that are created by a 3D printer, or the like. For example, the same number of pairs of the upper keyboard 604a and the lower keyboard 604b as that of the keyboards (white keys and black keys) of the piano can be arranged. The upper keyboard 604a is a keyboard that is pressed by a finger of the taught person or the player and a force applied by pressing the key pressing causes the upper keyboard 604a to move up and down. On the other hand, the lower keyboard 604b is arranged in a fixed manner to receive the upper keyboard 604a and incorporates pressure sensors 200 that detect motions of the upper keyboard 604a. More specifically, in the modification, at least two protrusions 202 are arranged on a bottom surface of the upper keyboard 604a along a longitudinal direction of the keyboard and enter into holes 204 that are formed on the top surface of the lower keyboard 604b such that the holes 204 are opposed to the protrusions 202. Furthermore, the pressure sensors 200 are arranged on bottom surfaces of the holes 204. Accordingly, when the upper keyboard 604a is pressed and accordingly moves down, the protrusions 202 entering into the holes 204 press the pressure sensors 200, so that the key pressing by the finger of the taught person or the player can be detected. The sensing data of the pressure that is detected by the pressure sensors 200 is converted by the AD converter 210 from an analog signal into a digital signal and then is output to the in processing device 212.

In the modification, the positions of the pressure sensors 200 arranged may be changed as appropriate according to to which of the white key 600 and the black key the upper keyboard 604a and the lower keyboard 604b in a pair correspond.

(Exemplary Detection)

Detection of a position of key pressing using a finger of the taught person or the player on a keyboard and detection of a magnitude of a force caused by the key pressing that are detection by the pressure sensors 200 described above will be described with reference to FIG. 21. As illustrated in FIG. 21, two pressure sensors 200a are arranged, for example, per keyboard along the longitudinal direction of the keyboard. The pressure sensor 200 on the front side that is positioned on the side of the taught person or the player is the pressure sensor 200a and the pressure sensor 200 positioned in the back with respect to the taught person or the player as the pressure sensor 200b. A pressure that is detected by the pressure sensor 200a is $F_1$ and a pressure that is detected by the pressure sensor 200b is $F_2$. In that case, a magnitude F of the force caused by key pressing by the taught person or the player is detectable as a net force of the pressures $F_1$ and $F_2$ that are detected by the two pressure sensors 200a and 200b. In other words, the magnitude F of the force caused by key pressing by the taught person or the player is detectable as the following Equation (1).

$$F=F_1+F_2 \qquad (1)$$

Key pressing by the taught person or the player causes the keyboard, that is, the upper keyboard 604a to move like a seesaw. Thus, when a length of the keyboard is $L_0$ and a position of key pressing by the taught person or the player is L with respect to the back end of the keyboard serving as a start point, it is possible to calculate the position L of key pressing from the ratio of the pressures $F_1$ and $F_2$ that are detected by the two pressure sensors 200a and 200b, using Equation (2) below.

$$L=L_0 \times \{F_1/F\} \qquad (2)$$

Furthermore, the two pressure sensors 200 are arranged per keyboard along the longitudinal direction of the keyboard in FIG. 20; however, the modification is not limited thereto. For example, the two pressure sensors 200 may be arranged along the lateral direction of the keyboard. In the modification, triaxial sensors may be used instead of the pressure sensors 200.

(Exemplary Feedback)

An exemplary method of providing the result of detection by the above-described pressure sensors 200 to the user as feedback will be described with reference to FIG. 22. In the modification, for example, it is possible to provide the result of detection by the pressure sensors 200 to the user as feedback using a display screen 820 like that illustrated in FIG. 22. The display screen 820 contains a keyboard display screen 822 and, for example, a position in which the taught person presses a key (a position in the longitudinal direction of the keyboard) can be displayed as a marker 824a (white circle in FIG. 22). A position in which a player who is a model for the taught person presses the key may be displayed together by a marker 824b (a circle hatched with slashes in FIG. 22). Such display allows the user to clearly recognize the difference in the key pressing position between the taught person and the model player. Furthermore, the modification is not limited to representation of the key pressing positions in the mode illustrated in FIG. 22. For example, in the modification, the positions in which the taught person and the player press the key may be displayed in a superimposed manner on the piano keyboard that is pressed by the taught person in a real space using an AR. (Augmented Reality) technique. In this case, the mode of display may be the markers 824 like those illustrated in FIG. 22 or may be animation, or the like. Furthermore, in this case, for example, the display mode can be modified using a transparent head mound display (HMD below) that is worn on the head of the taught person, or the like. In the modification, the HMD is not limited to a transparent display and the HMD may be a non-transparent display. In the latter case, the HMD may include an imaging device, such as a camera, and display the positions in which the taught person and the player press the key in a superimposed manner on a captured image of the piano keyboard in a real space. Furthermore, in the latter case, the HMD may display the positions in which the taught person and the player press the key in a superimposed manner on a display that schematically represents the keyboard in a virtual reality space.

Furthermore, as illustrated in FIG. 22, the display screen 820 may contain a key pressing force display screen 826 that displays, per keyboard, the change over time in the magnitude F of force caused by key pressing by the taught person or the player. Also in this case, the change over time in the magnitude F of force caused by key pressing by the player serving as a model for the taught person may be displayed together in a different color or line type (separately displayed in a solid line and a broken line in FIG. 22). Such displaying allows the user to clearly recognize per keyboard the force caused by key pressing by the player serving as the model for the taught person and a difference in the change of the force.

As described above, according to the modification, it is possible to provide key pressing by the taught person or the player, that is, a motion of a keyboard caused by the key pressing, the position of the key pressing, the magnitude of force resulting from the key pressing, etc., to the user as feedback in realtime via the display screen 820.

In the modification, when a triaxial sensor is used, not only a position in the longitudinal direction of a keyboard that is pressed by the taught person but also a position in the lateral direction of the keyboard may be represented and the change over time in the displacement of the keyboard in the vertical direction may be represented. Such displaying makes it possible to provide feedback of more detailed three-dimensional sensing data to the user as feedback.

6.2. Modification 2

Figure 23:
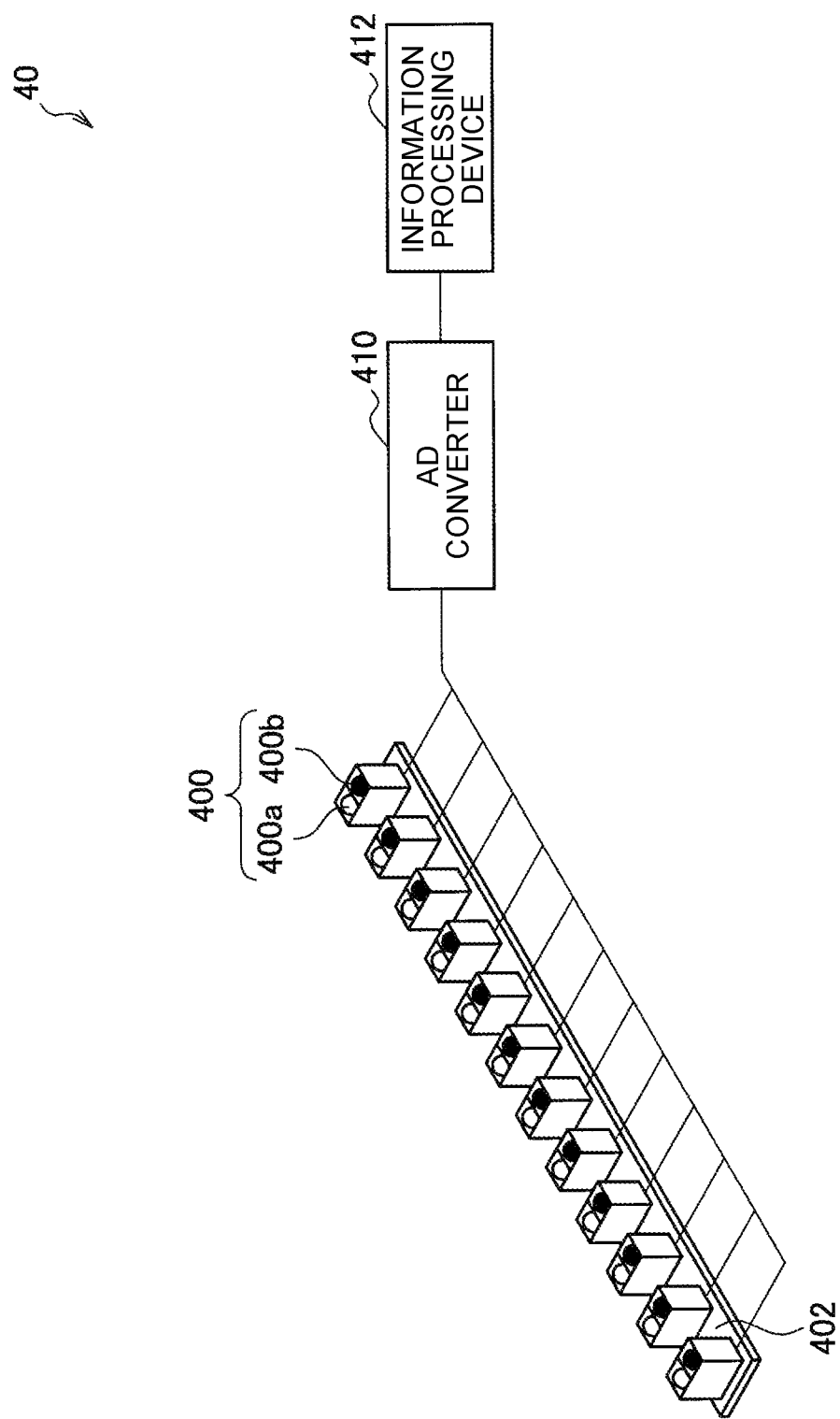
FIG. 23 is an (first) explanatory view for explaining a configuration of a photoreflector sensor device 40 according to Modification 2 of a second embodiment of the disclosure.
Figure 24:
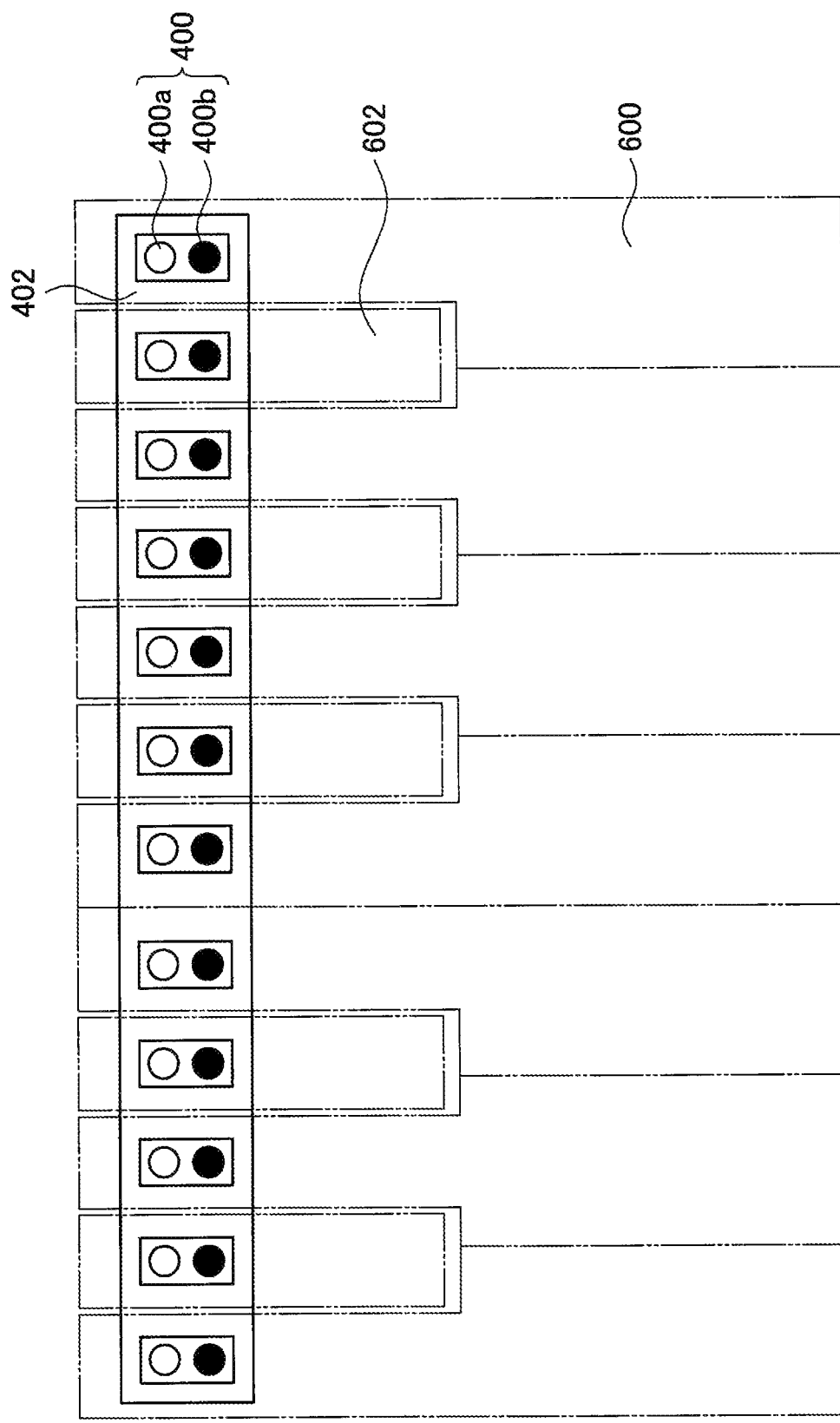
FIG. 24 is an (second) explanatory view for explaining a configuration of the photoreflector sensor device 40 according to the modification.
Figure 25:
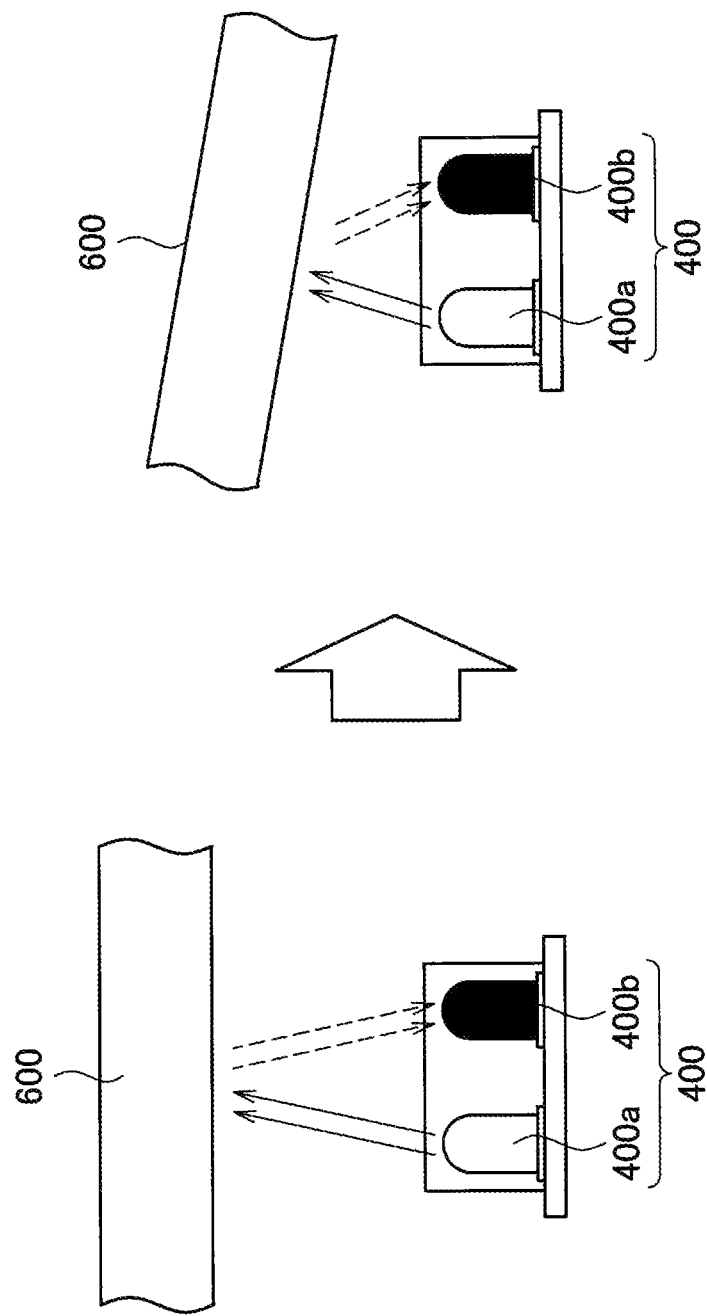
FIG. 25 is an explanatory view for explaining moves of a photoreflector sensor 400 according to the modification.
Figure 26:
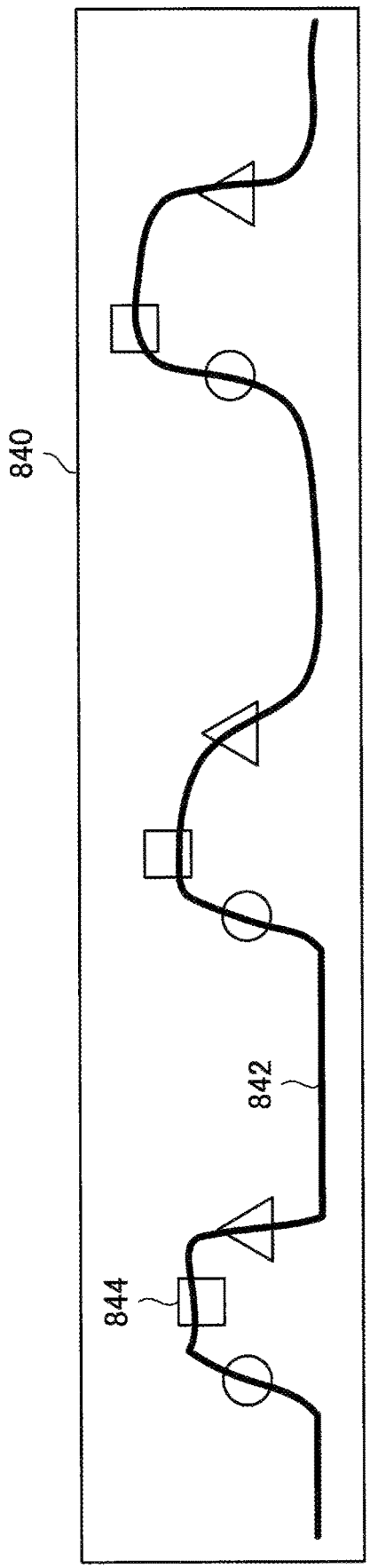
FIG. 26 is an (first) explanatory view for explaining exemplary feedback of a result of measuring by the photoreflector sensor device 40 according to the modification.
Figure 27:
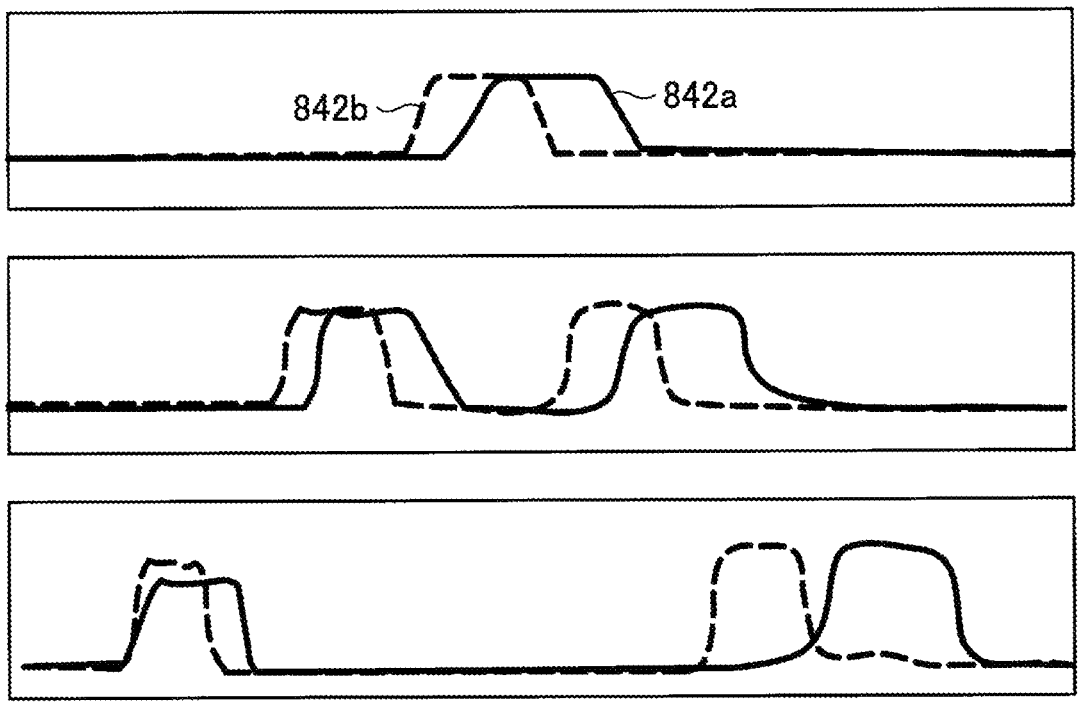
FIG. 27 is an (second) explanatory view for explaining exemplary feedback of a result of measuring by the photoreflector sensor device 40 according to the modification.
Figure 28:
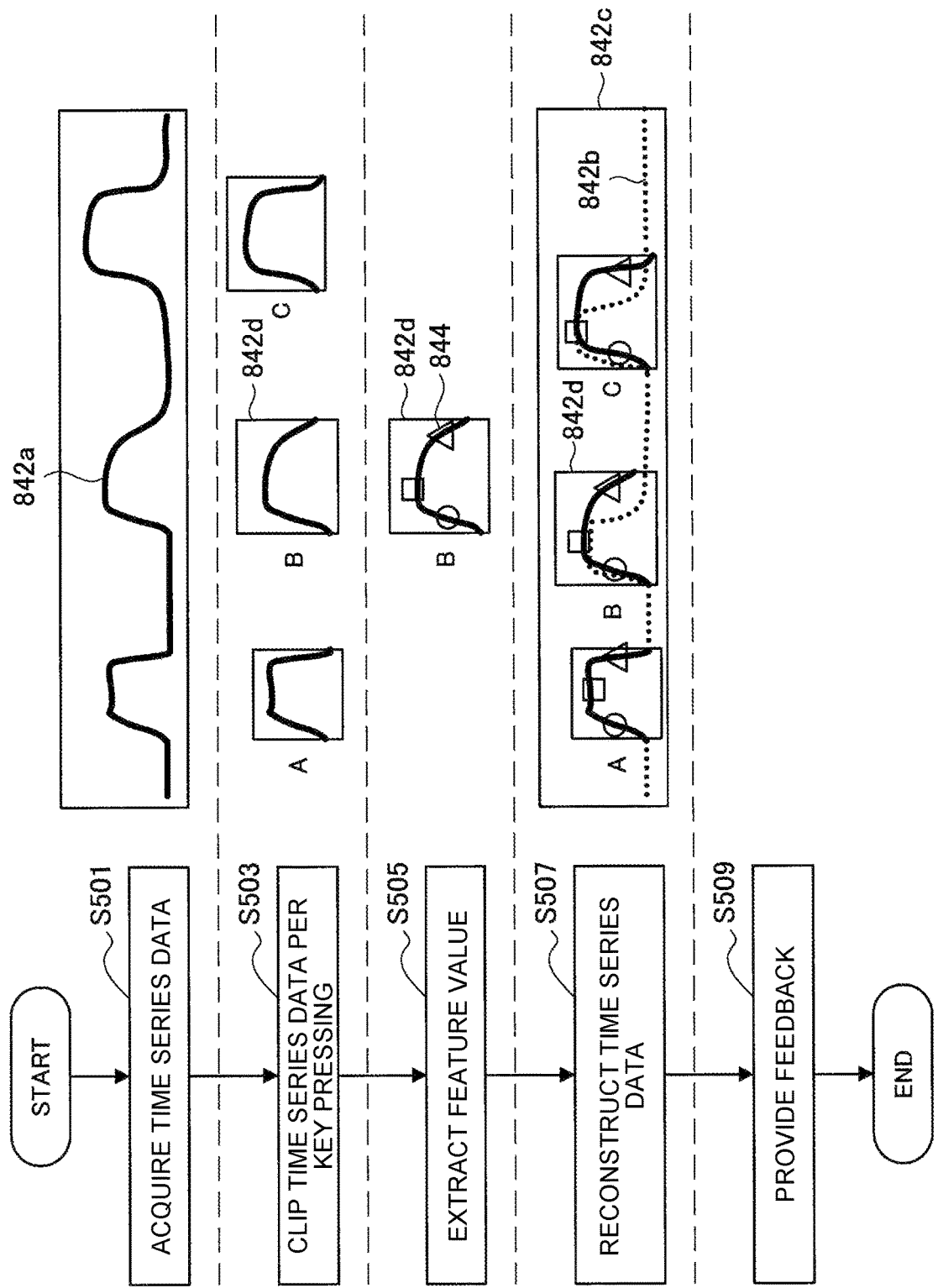
FIG. 28 is a flowchart of a process of analyzing a result of measuring by the photoreflector sensor device 40 according to the modification.
Figure 29:
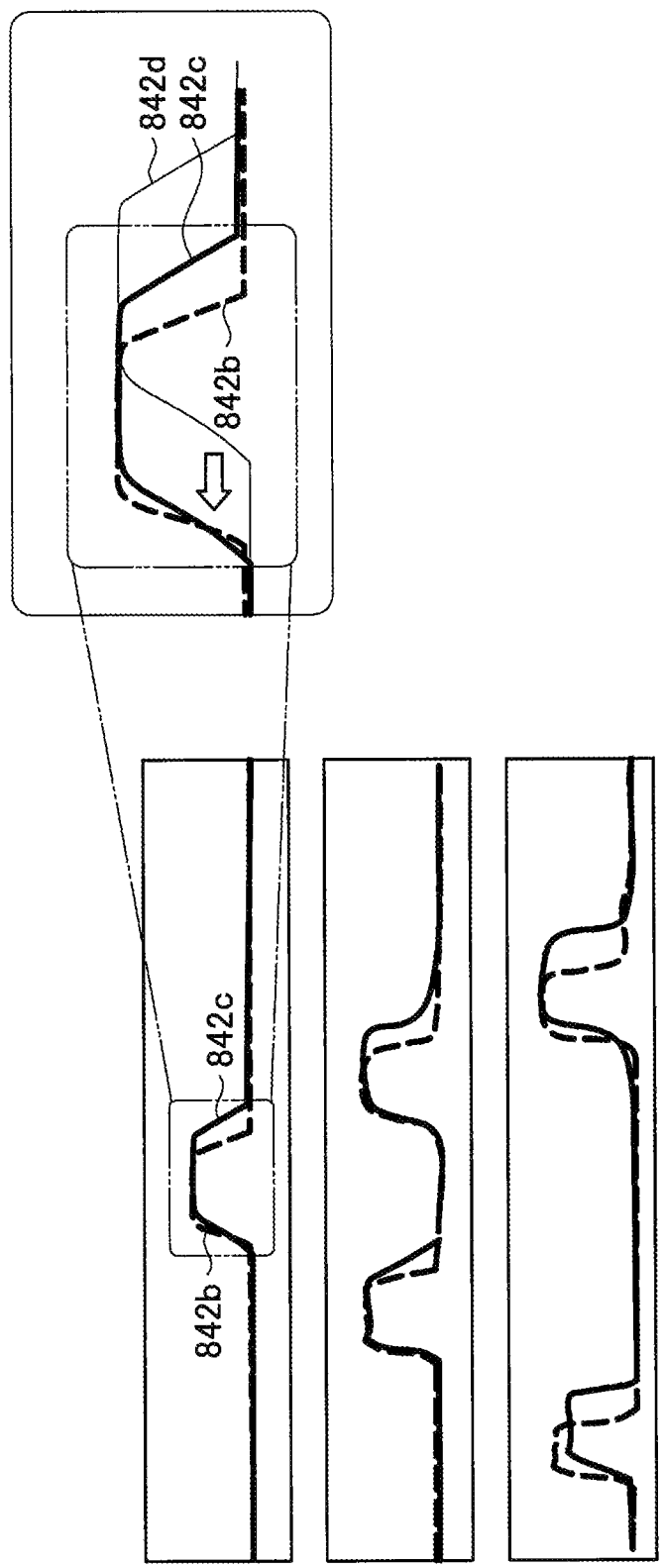
FIG. 29 is an explanatory view to explain the process of analyzing a result of measuring by the photoreflector sensor device 40 according to the modification.

In the above-described modification, the pressure sensors 200 are used and, in the embodiment, a photoreflector sensor device 40 may be used instead of the pressure sensors 200. An example using the photoreflector sensor device 40 will be described as Modification 2 with reference to FIGS. 23 to 29. FIG. 23 and FIG. 24 are explanatory views for explaining a configuration of the photoreflector sensor device 40 according to the modification. FIG. 25 is an explanatory view for explaining an operation of a photoreflector sensor 400 according to the modification. FIGS. 26 and 27 are explanatory views for explaining exemplary feedback of a result of measuring by the photoreflector sensor device 40 according to the modification. FIG. 28 is a flowchart of a process of analyzing a result of measuring by the photoreflector sensor device 40 according to the modification. FIG. 29 is an explanatory view for explaining the process of analyzing a result of measuring by the photoreflector sensor device 40 according to the modification.

(Configuration)

First of all, the configuration of the photoreflector sensor device 40 will be described with reference to FIGS. 23 to 25. As illustrated in FIG. 23, the photoreflector sensor device 40 according to the modification includes a substrate 402 that is detachably arranged under the keyboards of various pianos and a plurality of photoreflector sensors 400 that are arrayed on the substrate 402 such that the photoreflector sensors 400 correspond to the keyboards and that detect motions of the keyboards that are pressed. Furthermore, the photoreflector sensor device 40 mainly includes an AD converter 410 that converts the sensing data of the photoreflector sensor 400 and an information processing device 412 that processes the converted sensing data. The photoreflector sensor device 40 according to the modification can be detachably arranged under the keyboards of various pianos. Thus, the photoreflector sensor device 40 may be mounted on a piano when the piano is manufactured or shipped or may be attached after the piano is shipped.

Specifically, as illustrated in FIG. 24, one photoreflector sensor 400 is arranged under each keyboards (each white key 600 and each black key 602). Note that, in FIG. 24, 12 keys corresponding to an octave (specifically, seven white keys 600 and five black keys 602) are represented and the photoreflector sensors 400 are arranged such that the photoreflector sensors 400 correspond respectively to the twelve keyboards. The photoreflector sensors 400 are preferably arranged such that the photoreflector sensor 400 is positioned on a back lower side of each keyboards when viewed from the taught person or the player. Each of the photoreflector sensors 400 is formed of a light emitting device 400*a* that emits light and a light receiving device 400*b* that receives light in a pair.

More specifically, as illustrated in FIG. 25, the light emitting device 400*a* of the photoreflector sensor 400 is formed of an LED (light emitting diode), or the like, and is capable of emitting light with a given wavelength. Furthermore, the light receiving device 400*b* of the photoreflector sensor 400 is formed of a photodiode, or the like, and is capable of generating a photocurrent (signal) according to the amount of received light. Thus, the light that is emitted by the light emitting device 400*a* is partly reflected on the bottom surface of the white key 600 and reaches the light receiving device 400*b*, so that the light is detectable by the light receiving device 400*b*. For example, when the white key 600 is pressed by the taught person or the player and thus moves down, the amount of light detected by the light receiving device 400*b* varies because the length of path in which the light emitted by the light emitting device 400*a* travels until the light is detected by the light receiving device 400*b* varies. Thus, according to the photoreflector sensor 400, the amount of light detected by the light receiving device 400*b* varies according to the displacement of the white key 600 in the vertical direction and therefore it is possible to detect the displacement of the white key 600 using a signal (voltage value) from the photoreflector sensor 400.

In the modification, the photoreflector sensor 400 has a time resolution of approximately 2 mm and a space resolution of approximately 0.01 mm and thus is capable of accurately acquiring the change in the display of the displacement of the keyboard. More specifically, in the modification, for example, an instance when the signal of the photoreflector sensor 400 exceeds a given threshold can be regarded as a time when the keyboard stars moving (key pressing start time) (time at which the keyboard starts moving down). In the modification, the threshold can be set as appropriate in consideration of noises of the photoreflector sensor 400 (white noise, or the like) and fluctuations and, for example, the threshold can be set at a doubled value of a standard deviation of a signal value from the photoreflector sensor 400 at the time when the keyboard is still at the upper positon. In the modification, it is possible to accurately acquire the change in the mount of move of the keyboard over time, which makes it possible to acquire, per keyboard, not only the above-described key pressing start time but also a key pressing end time at which key pressing ends (the time at which the keyboard starts moving up) and a key pressing duration from the key pressing start time to the key pressing end time. Furthermore, in the modification, it is possible to acquire, per keyboard, a speed of key pressing (a moving speed of the keyboard), an acceleration (acceleration of move of the keyboard), and a change in the displacement over time.

(Exemplary Feedback)

Furthermore, an exemplary method of providing the result of detection by the photoreflector sensor 400 to the user as feedback will be described with reference to FIGS. 26 and 27. In the sets of time series data 842, 842*a* and 842*b* in FIG. 26 and FIG. 27, the displacement of a keyboard that moves down is represented on the upper side in the drawing.

In the modification, it is possible to detect a time of event and a feature value from the time series data 842 of the displacement of a keyboard that is obtained from key pressing by the taught person or the player and provides the time of event and the feature value as feedback to the user. The time of event herein means the key pressing start time, the key pressing end time, a time at which the keyboard is in the lowest position (a moving-down end time), a time at which a keyboard is in the highest position (a moving-up end time), a time at which the speed of key pressing is at maximum (a maximum speed reached time), a time at which the acceleration is at maximum (a maximum acceleration reached time), or the like, and is not particularly limited. In the modification, the time of event and the feature value to be detected are not particularly limited. More specifically, as illustrated in FIG. 26, representing the time of event by a marker 844 makes it possible to give feedback of the timing at which an event occurs to the user. What time of event and what feature value are displayed may be selected by the user.

Furthermore, as illustrated in FIG. 27, time series data 842*b* of the displacement of the keyboard caused by key pressing by the player serving as a model for the taught person may be displayed together in a different color or a line type. For example, in FIG. 27, the time series data 842*b* of the displacement of the keyboard caused by the key pressing by the player is represented in a line of a line type different from that of the time series data 842*a* of the displacement of the keyboard caused by key pressing by the taught person. Such display allows the user to clearly recognize, per keyboard, a difference in the change over time in the displacement of the keyboard caused by key pressing by and in the feature value between the taught person and the player serving as a model for the taught person. As a result, according to the modification, it is possible to visually know the timing of pressing the keyboard, the timing of releasing the finger from the keyboard, and the speed of moving the finger, which makes it possible to master the technique easily and promote the learning. In the embodiment, the displacement of the keyboard caused by key pressing is not limited to being displayed as the time series data 842*b* of the displacement, and the displacement may be represented, by changing the color, gradations of color, or the pattern of a keyboard 904 (refer to FIG. 33) illustrated in the keyboard display screen 872 (refer to FIG. 33). Details of such display of the displacement will be described below.

In the modification, the data that is provided as feedback to the user is not limited to the change over time in the displacement of the keyboard, and the data may be the change over time in the moving speed, moving acceleration, or the like. In the modification, using the marker 844, the key pressing start, time, the key pressing end time, the time at which the keyboard is in the lowest position (the moving-down end time), the time at which the keyboard is in the highest position (the moving-up end time), the time at which the speed of key pressing is at maximum (the maximum speed reached time), the maximum speed reached time during moving up or down of the keyboard, or a duration in which the maximum speed reached or a duration in which the maximum acceleration is reached while the keyboard is moving up or down.

(Analysis Method)

In the modification, when the time-series data 842*a* of the displacement of the keyboard caused by key pressing by the taught person and the time-series data 842*b* of the displacement of the keyboard caused by key pressing by the model player are compared with each other, even when the same playing (a music, a phrase, a scale, an arpeggio, a chord, or the like) is performed, the timing of each pressing may differ. In such a case, even when the time-series data 842*a* of the displacement of the keyboard caused by key pressing by the taught person and the time-series data 842*b* of the displacement of the keyboard caused by key pressing by the model player are displayed in a superimposed manner, it may be difficult to know at a glance the difference in the key pressing duration, the key pressing speed (the moving speed of the keyboard), the acceleration (moving acceleration of the keyboard), or the like, between the taught person and the player.

Thus, in the modification, as in FIG. 27 described above, in addition to a "phrase comparison mode" display in which the time series data 842*a* of the displacement of the keyboard caused by key pressing by the taught person is displayed together with the time series data 842*b* of the displacement of the keyboard caused by key pressing by the model player, display in other display modes may be performed. Specifically, in the modification, a "single tone comparison mode" display for comparing the change over time in the displacement of the keyboard per single tone may be performed. The "single tone comparison mode" enables a display by constructing time series data 842*c* by clipping and arraying the time series data 842*a* per key pressing such that the timing of key pressing in the time series data 842*a* on the taught person and the timing of key pressing in the time series data 842*b* on the player conform with each other.

The analyzing method for performing the "single tone comparison mode" will be described below with reference to FIGS. 28 and 29.

As illustrated in FIG. 28, the analyzing method according to the modification includes steps from S501 to S509. Details of each step included in the analysis method will be described.

(Step S501)

First of all, the photoreflector sensor device 40 acquires the time series data 842*a* of the displacement of a keyboard caused by key pressing by the taught person.

(Step S503)

The photoreflector sensor device 40 then extracts the time at which each key pressing starts and the time at which each key pressing ends from, the time series data 842*a* obtained at step S501. The photoreflector sensor device 40 regards an instance at which the signal of the photoreflector sensor 400 exceeds a given threshold as the time at which the keyboard starts moving (the key pressing start time). Furthermore, the photoreflector sensor device 40 regards an instance at which the signal of the photoreflector sensor 400 is under the given threshold as a time at which the finger separates from the keyboard (key pressing end time). Accordingly, the photoreflector sensor device 40 is able to extract the time at which each key pressing starts and the time at which each key pressing ends. Based on the extracted time, the photoreflector sensor device 40 clips an interval corresponding to each key pressing as a time series interval 842*d* from the time series data 842*a* and holds the interval.

(Step S505)

The photoreflector sensor device 40 then extracts, from each time series interval 842*d* that is clipped at step S503, a feature value, such as the key pressing start time, the key pressing end time, the time at which the keyboard is in the lowest position (the moving-down end time), the time at which a keyboard is in the highest position (the moving-up end time), the time at which the speed of key pressing is at maximum (the maximum speed reached time), or a duration in which the maximum speed is reached or a duration in which the maximum acceleration is reached while the keyboard is moving up or down. Specifically, for example, the learning unit 348 that is described in the first embodiment extracts, per key pressing, the change over time in the displacement of the keyboard that is pressed by the taught person or the player per key pressing and extracts a feature value (third information) from part of the extracted change of each key pressing over time (the time series interval 842*d*). The photoreflector sensor device 90 visualizes the extracted feature value by superimposing the marker 844 on the time series interval 842*d*.

(Step S507)

The photoreflector sensor device 40 performs reconstruction by, for example, arraying the clipped time series interval 842*d* in alignment with the time series data 842*b* of the displacement of the keyboard caused by key pressing by the player serving as a model for the taught person. Specifically, as illustrated in FIGS. 28 and 29, each time series interval 842*d* is shifted and arrayed such that the key pressing start time in each time series interval 842*d* conforms with the key pressing start time of corresponding key pressing in the time series data 842*b* and thereby the time series data on the taught person is reconstructed as sequential data. More specifically, for example, the learning unit 348 described in the first embodiment reconstructs again part of the extracted change over time of each key pressing (the time series interval 842*d*) as sequential data according to given rules. In the following description, the time series data on the taught person that is obtained by reconstruction will be referred to as time series data 842*c*.

(Step S509)

The photoreflector sensor device 40 further displays the time series data 842*c* that is obtained at step S507 described above such that the time series data 842*c* is superimposed onto the time series data 842*b* of the displacement of the keyboard caused by key pressing by the player serving as the model for the taught person, thereby providing feedback to the user.

In the modification, as described above, the sets of time series data 842*b* and 842*c* such that timing of key pressing (the key pressing start time) in the time series data 842*c* on the taught person and the timing of key pressing in the time series data 842*b* on the player conform with each other. In the modification, such displaying allows the user to know at a glance the difference in the key pressing duration, the key pressing speed (moving speed of the keyboard) and the acceleration (moving acceleration of the keyboard) between the taught person and the player and thus makes mastering the technique easy and promote the learning.

(Modification of Feedback)

Figure 30:
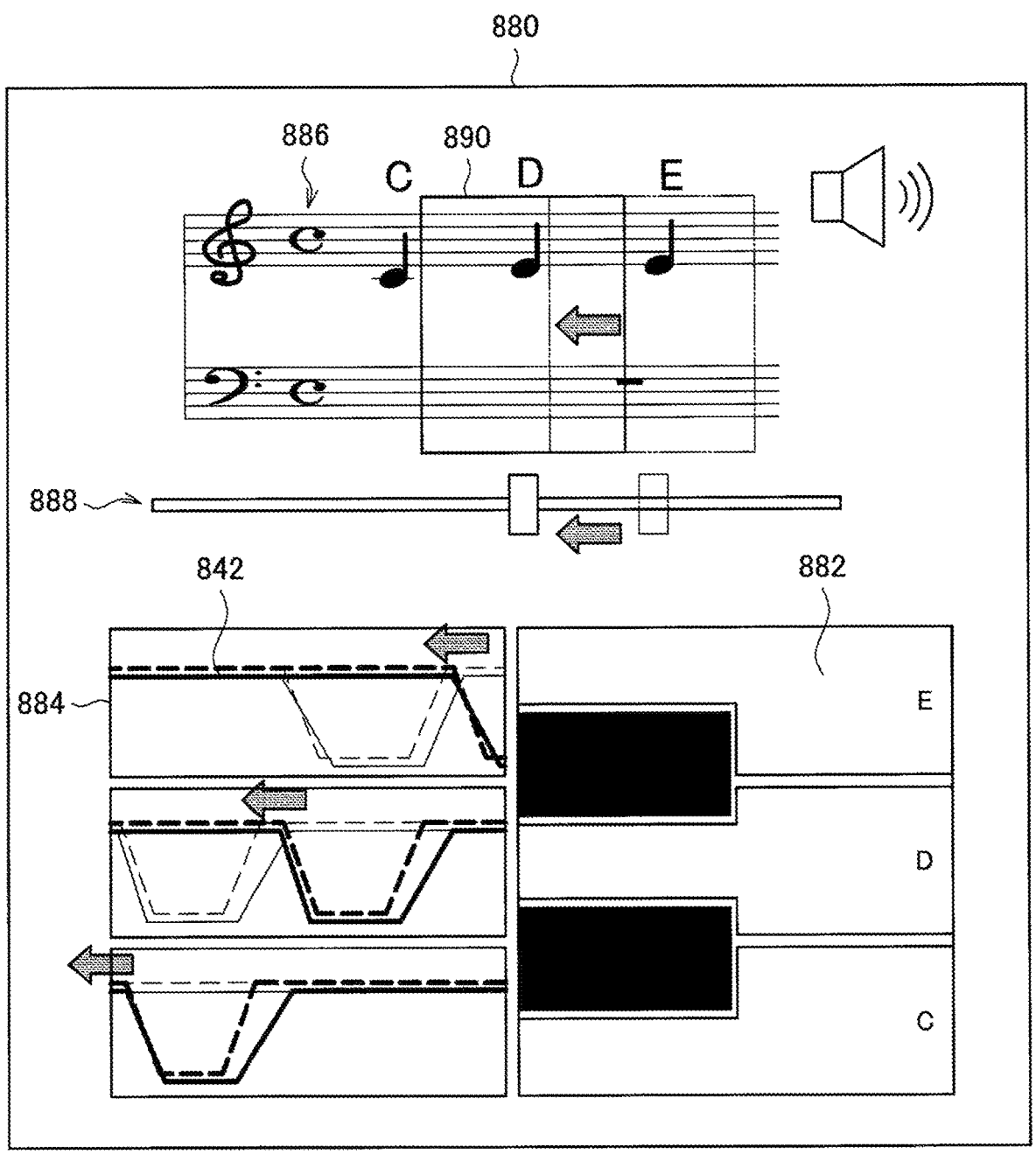
FIG. 30 is an (third) explanatory view to explain exemplary feedback of a result of measuring by the photoreflector sensor device 40 according to the modification.
Figure 31:
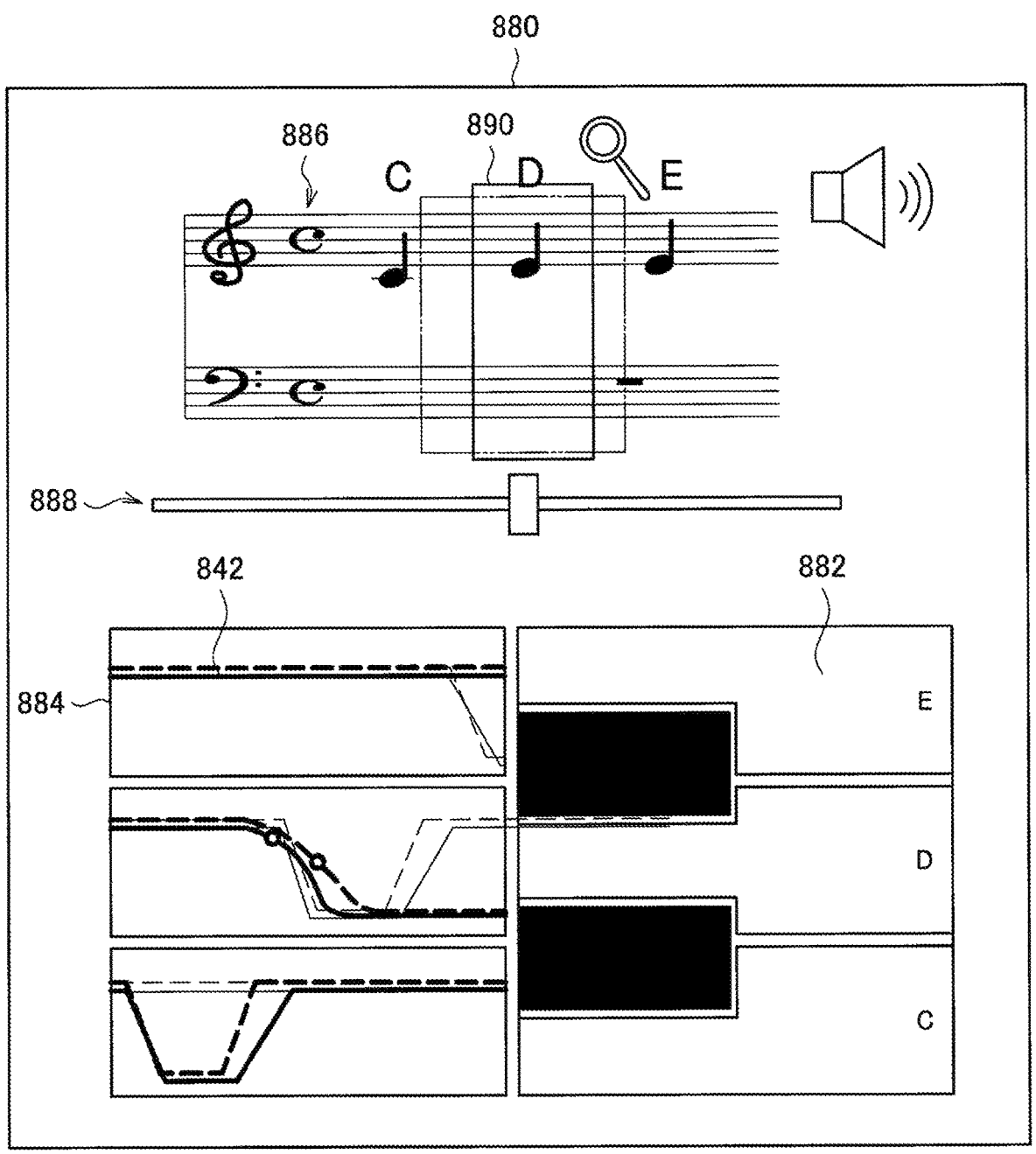
FIG. 31 is an (fourth) explanatory view to explain exemplary feedback of a result of measuring by the photoreflector sensor device 40 according to the modification.

The above-described method of providing the result of detection by the photoreflector sensors 400 to the user may be modified as follows. More modifications will be described with reference to FIGS. 30 and 31. FIGS. 30 and 31 are explanatory views to explain exemplary feedback of the result of measuring by the photoreflector sensor device 40 according to the modification. In the time series data 842 in FIGS. 30 and 31, the displacement of a keyboard in the case where the keyboard moves down is represented on the lower side in the drawing.

In the modification, as illustrated in FIG. 30, a keyboard display screen 882 and a time series data display 884 that displays the time series data 842 of the displacement of each keyboard such that the time series data 842 corresponds to the keyboard that is displayed on the keyboard display screen 882 are displayed in the lower space of the display screen 880. The time series data display 884 displays the time series data 842*a* of the displacement of the keyboard caused by key pressing by the taught person and the time series data 842*b* of the displacement of the keyboard caused by key pressing by the player serving as a model for the taught person.

In the modification, as illustrated in FIG. 30, a score display screen 886 is displayed in the lower space of the display screen 880. The score display screen 886 has a frame 890 and parts corresponding to notes in the frame 890 correspond to the time series data 842 that is displayed by the time series data display 884. Furthermore, a slide bar 888 is arranged under the score display screen 886 and the user moves the slide bar 888 and accordingly the frame 890 of the score display screen 886 moves, which makes it possible to change the area of the time series data 842 displayed on the time series data display 884. In other words, in the modification, it is possible to display the corresponding part of the score in synchronization with the time series data 842 that is provided as feedback to the user. Sound corresponding to part of the score may be output in synchronization with the time series data 842 that is provided as feedback to the user. Such outputting allows the user to easily know to which part of playing (such as a music or a phrase) the time series data 842 being displayed, corresponds. Note that, the modification is not limited to changing the area of the time series data 842 to be displayed on the time series data display 884 by moving the frame 890 of the score display screen 886 using the slide bar 888. For example, in the modification, the frame 890 of the score display screen 886 may be moved by moving the area of the time series data 842 that is displayed on the time series data display 884 using the slide bar 888. Furthermore, the modification is not limited to the slide bar 888, and the area to be displayed on the score display screen 886 and the area of the time series data 842 to be displayed on the time series data display 884 may be changed by swiping, pinching in, or pinching out the score display screen 886 or the time series data display 884.

In the modification, a display screen 880*a* like that illustrated in FIG. 31 may be used. In the display screen 880*a*, the user moves the slide bar 888 and thereby the size of the frame 890 of the score display screen 886 varies, which makes it possible to change the area of the time series data 842 to be displayed on the time series data display 884. In other words, in the modification, the user is able to select the time range of the time series data 842 to be displayed on the time series data display 884 by zooming in or zooming out the time series data 842. Such display allows the user to easily zoom in or zoom out the time series data 842 of a desired range of the playing (such as a music or a phrase) and accordingly allows the user to easily know the feature value, etc. For example, in the modification, the time range of the time series data 842 can be zoomed in and this makes it possible to visualize the shift in the timing of key pressing of the three tones between the time series data 842 obtained when the taught person plays the chord of "Do, Mi and Sol" and the time series data 842 on the model player serving as a model. In the modification, such a minute shift can be visualized and this allows the user to easily recognize the shift that is difficult to recognize by audition, or the like, which makes it possible to promote mastering further skilled playing by the taught person. The modification is not limited to changing the area of the time series data 842 to be displayed on the time series data display 884 by changing the size of the frame 890 on the score display screen 886 using the slide bar 888. For example, in the modification, the size of the frame 890 on the score display screen 886 by changing the size of the area of the time series data 842 displayed on the time series data display 884 using the slide bar 888. In other words, in the modification, the score display screen 886 and the time series data display 884 are displayed in synchronization with each other.

In the modification, the time series data 842 on another person that is used for comparison with the time series data 842 on the taught person may be the time series data 842 formed of a representative value (collective intelligence), such as an average that is extracted from the time series data 842 on multiple experts or may be the time series data 842 on a specific expert. Furthermore, in the modification, the time series data 842 to be compared may be preferably selected such that the level is gradually increased according to the level of the level of expertise of the taught person. This effectively stimulates the motivation of the taught person and more smoothly increases the level of playing by the taught person.

Furthermore, in the modification, the time series data 842 is preferably tagged previously by the size of the hands of the player corresponding to the time series data 842 to be compared. When such tagging is performed, in the modification, it is possible to automatically select the time series data 842 to be compared in accordance with the size of the hands of the taught person. Furthermore, the modification is not limited to the above-described size of hands, and the time series data 842 may be tagged with attribute information, such as a grasping power, a shape of hands, the size of body, the level of expertise, age, gender, or the like. In the modification, such tagging makes it possible to select preferable time series data for comparison in consideration of an individual difference and provide a personally tailored lesson.

In the modification, it is also possible to compare at least three multiple sets of the time series data 842, and it is possible to check the trace to development of the taught person by displaying the time series data 842 on the time series data 842 on the taught person in the past in a superimposed manner. Furthermore, in the modification, it is possible to digitize the degree of development or represent the change in expertise by a graph.

6.3. Modification 3

Figure 32:
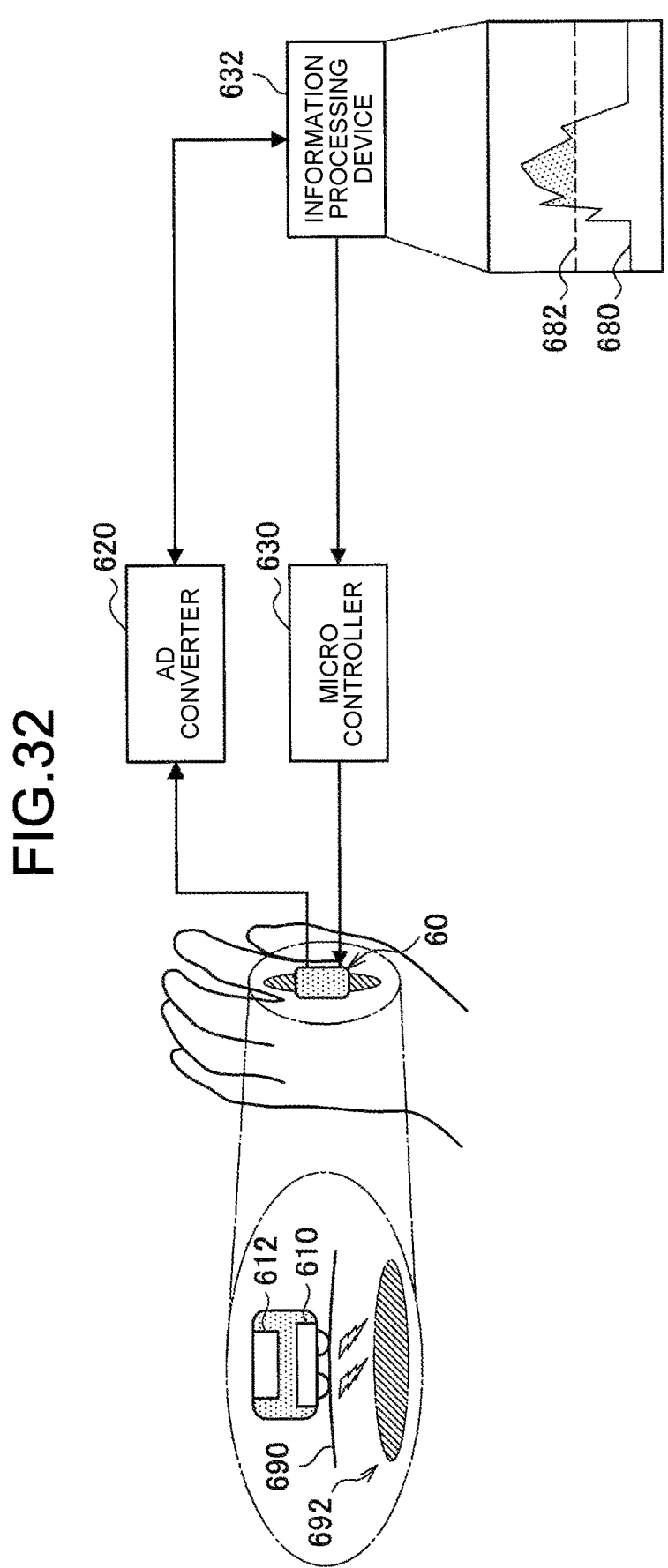
FIG. 32 an explanatory view for explaining a configuration of a muscle activity sensor device 60 according to Modification 3 of the second embodiment of the disclosure.

The feedback described above is mainly by display using a screen and, in the embodiment, feedback may be given by giving tactile stimulation to the taught person. An example in which an amount of muscle activity of the taught person is sensed and, based on the sensing data, tactile stimulation is given using a vibrator 612 (refer to FIG. 32) will be described as Modification 3 with reference to FIG. 32. FIG. 32 is an, explanatory view for explaining a configuration of a muscle activity sensor device 60 of the modification of the disclosure.

(Configuration)

First of all, with reference to FIG. 32, the configuration of the muscle activity sensor device 60 will be described. As illustrated in FIG. 32, the muscle activity sensor device 60 is worn on the base of the thumb, the index finger, the middle finger, etc., and is capable of detecting amounts of muscle activity of the respective fingers of the taught person and providing feedback by vibration based on the detected amounts of muscle activity. Specifically, the muscle activity sensor device 60 includes a myoelectric potential sensor 610 and the vibrator 612 that provides feedback by tactile stimulation. In the modification, the muscle activity sensor device 60 is preferably a device that is an integration of the myoelectric potential sensor 610 and the vibrator 612. Furthermore, an AD converter 620 that converts sensing data of the myoelectric potential sensor 610, a micro controller 630 that controls the vibrator 612 and an information processing device 632 that processes the converted sensing data and that controls the micro controller 630 are connected to the muscle activity sensor device 60.

Specifically, the myoelectric potential sensor 610 is attached to part of a skin 690 of a hand of the taught person and is able to detect the change in the myoelectric potential caused by contraction activity of a muscle 692 (specifically, muscle fibers). Furthermore, the detected sensing data of the myoelectric potential converted by the AD converter 620 from an analog signal into a digital signal and the digital signal is then output to the information processing device 632. The information processing device 632 compares myoelectric potential sensing data 680 with a given threshold 682 and, based on the result of comparison, outputs a signal to the micro controller 630, thereby enabling control on the vibrator 612. The vibrator 612 is, for example, a vibration device that is mounted on a smartphone, or the like, and it is possible to change the amplitude of vibration and the vibration frequency according to control via the micro controller 630. In the modification, a configuration further shortening the duration from detection of an amount of muscle activity by the myoelectric potential sensor 610 until vibration of the vibrator 612 is preferable and such a configuration enables feedback of timing of weakening or tensing muscles more accurately in real time to the taught person.

(Exemplary Feedback)

A method of providing the result of detection by the above-described muscle activity sensor device 60 as feedback to the taught person will be described in detail.

Specifically, as described above, the information processing device 632 compares the myoelectric potential sensing data 680 with the threshold 682. It is possible to set the threshold 682, for example, at an X percent with respect to the potential at the maximum muscle contraction of the corresponding muscle 692. When the myoelectric potential sensing data 680 exceeds the threshold 682 (or is under the given threshold), the information processing device 632 outputs a signal to the micro controller 630 to cause the vibrator 612 to vibrate.

More specifically, in the modification, the vibration frequency of the vibrator 612 may be changed according to the magnitude of myoelectric potential. For example, when the myoelectric potential exceeds the given threshold, the information processing device 632 determines that the corresponding muscle 692 is tensed more than required and applies vibration at a high frequency to the taught person, via the vibrator 612. This allows the taught person to recognize that the muscle 692 is in a "strained condition" and weaken the corresponding muscle. The vibration frequency at that time is preferable approximately 250 Hz at which human sensitivity to vibration is considered to be the highest. Particularly, in piano playing, the muscle 692 is required to be weakened in some cases and it is difficult to accurately play while being aware of weakening. According to the modification, however, the taught person is allowed to easily recognize the his/her "strained condition" and thus the taught person is able to weaken the muscle 692.

On the other hand, for example, when the myoelectric potential is under the given threshold, the information processing device 632 determines that it is required to turn the muscle 692 into a more strained condition and gives vibration at a low frequency to the taught person via the vibrator 612. This enables the taught person to turn the muscle 692 into a more strained condition.

According to the description given above, the information processing device 632 controls the frequency, and in the modification, the magnitude of amplitude may be controlled or both the frequency and the magnitude of amplitude may be controlled. For example, the information processing device 632 controls both the frequency and the magnitude of amplitude and this makes it possible to not only provide feedback indicating into which of weakening or straining the muscle 692 is controlled to the user but also provide feedback on how much weakening should be performed or how much straining should be performed on the taught person.

In the modification, when myoelectric potentials of the multiple muscles 692 are detected, as in the above-described embodiment, feedback may be provided to the taught person based on a level of collaboration of the multiple muscles 692. In the modification, for example, in a situation where the muscle 692 of the thumb and the muscle 692 of the little finger are required to be strained (contract), applying vibrations to the muscle 692 of the thumb and the muscle 692 of the little finger enables provision of information on whether which of the muscles 692 is strained quickly or more strongly to the taught person as feedback. This enables the taught person, to master cooperative moves of the multiple muscles 692 required for playing piano via tactile perception.

The myoelectric potential contains noise because of the effect of impedance of the skin 690, fat, etc., of the taught person. In other words, even when the muscle 692 is resting, the magnitude of myoelectric potential differs from one another. In the modification, the myoelectric potential of the muscle 692 of the taught person that is resting (background noise) and the myoelectric potential at the time when the muscle is strained at maximum. In the modification, by normalizing the myoelectric potential that is newly detected using the difference between the myoelectric potential in the resting condition and the myoelectric potential in the most strained condition, it is possible to deal with the difference in the myoelectric potential between individuals and accurately detect the myoelectric potential that is caused by weakening and straining the muscle 692.

According to the description given above, the myoelectric potential is compared with the given threshold and feedback is provided to the taught person using vibration, but the modification is not limited to this. For example, when the myoelectric potential exceeds the given threshold over a given duration, or when the myoelectric potential is under the given threshold over a given duration, feedback may be provided to the taught person using vibration. In other words, the modification is not limited to myoelectric potential and a muscle activity time, or the like, may be used.

The modification is not particularly limited and is not limited to the muscles 692 of hand fingers and muscles of other parts of the body may be used as long as myoelectric potential can be detected. In the modification, biological information other than myoelectric potential, such as information of joint angles and angular velocities, may be used.

(Combination)

The muscle activity sensor device 60 according to the modification may be used in combination with the haptic mechanism 710 described above. Specifically, the muscle activity sensor device 60 may be mounted on the tips of fingers of the taught person and the exoskeleton robot 712 may be worn on the joints of hand fingers. In this case, feedback on how much the corresponding muscle is weakened or strained is provided to the taught person by the muscle activity sensor device 60. On the other hand, information on in what direction and what directions fingers are to be moved, is provided as feedback to the taught person using the exoskeleton robot 712.

Such a combination enables the taught person to perform multi-modality learning using tactile perception of the tips of fingers and the haptic perception of joints. Furthermore, in the modification, combination with visual feedback and auditory feedback allows the taught person to easily know the difference in moves between the taught person and another person (for example, an expert) and the difference between the his/her previous move and the current move. Thus, in the modification, it is possible to support the taught person in mastering "knacks", that is, support mastering a performance.

In the modification, the haptic mechanism 710 may change the degree of force to be applied to the joints of hand fingers and the rate of application (for example, double speed, slow motion, or the like). Sound of a piano played by the taught person may be output. For example, reproducing the speed of motions of the hand fingers of the taught person by the haptic mechanism 710 and applying the reproduced speed to the hand fingers of the taught person haptically perceivable allows the taught person to recognize the margin of the speed of motions of the hand fingers of the taught person at present. For example, using haptic application by the haptic mechanism 710 to hand fingers of the taught person while gradually making motions fast, fast motions of hand fingers of the taught person may be promoted.

As described above, according to each modification of the second embodiment of the disclosure, it is possible to provide an information processing device that is usable to support mastering a performance and that provides information on a performance of a user as feedback to the user for which various sensors are obtained; an information processing method; and a program. Furthermore, according to each modification of the embodiment, it is possible to support the taught person in mastering a performance, for example, perform a remote lesson, a self-lesson, etc.

Each embodiment, each example, and each modification can be carried out in combination with each other and it is understood that the combinations belong to the technical scope of the disclosure.

7. THIRD EMBODIMENT

Figure 33:
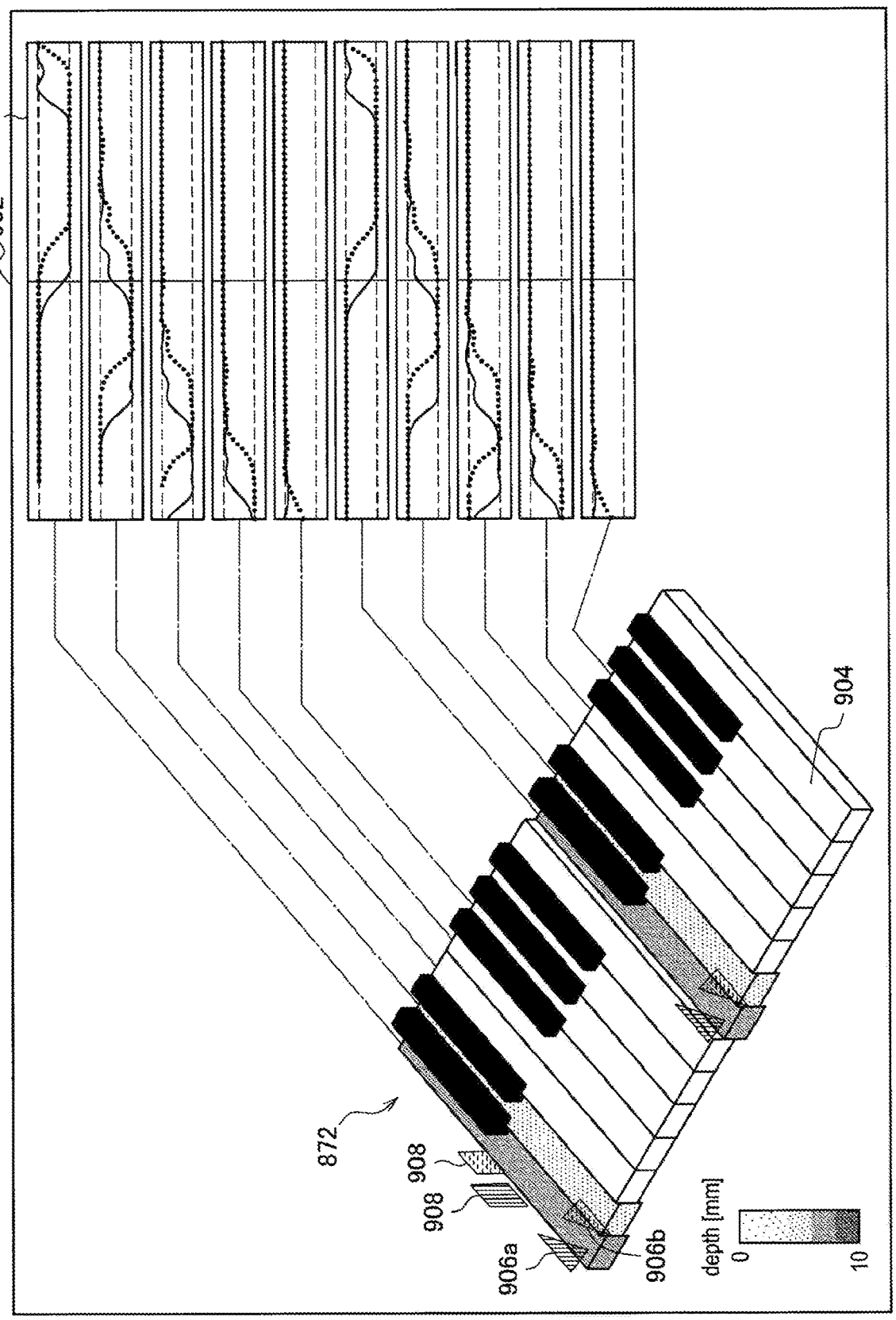
FIG. 33 is an (first) explanatory view to explain exemplary feedback according to a third embodiment of the disclosure.
Figure 34:
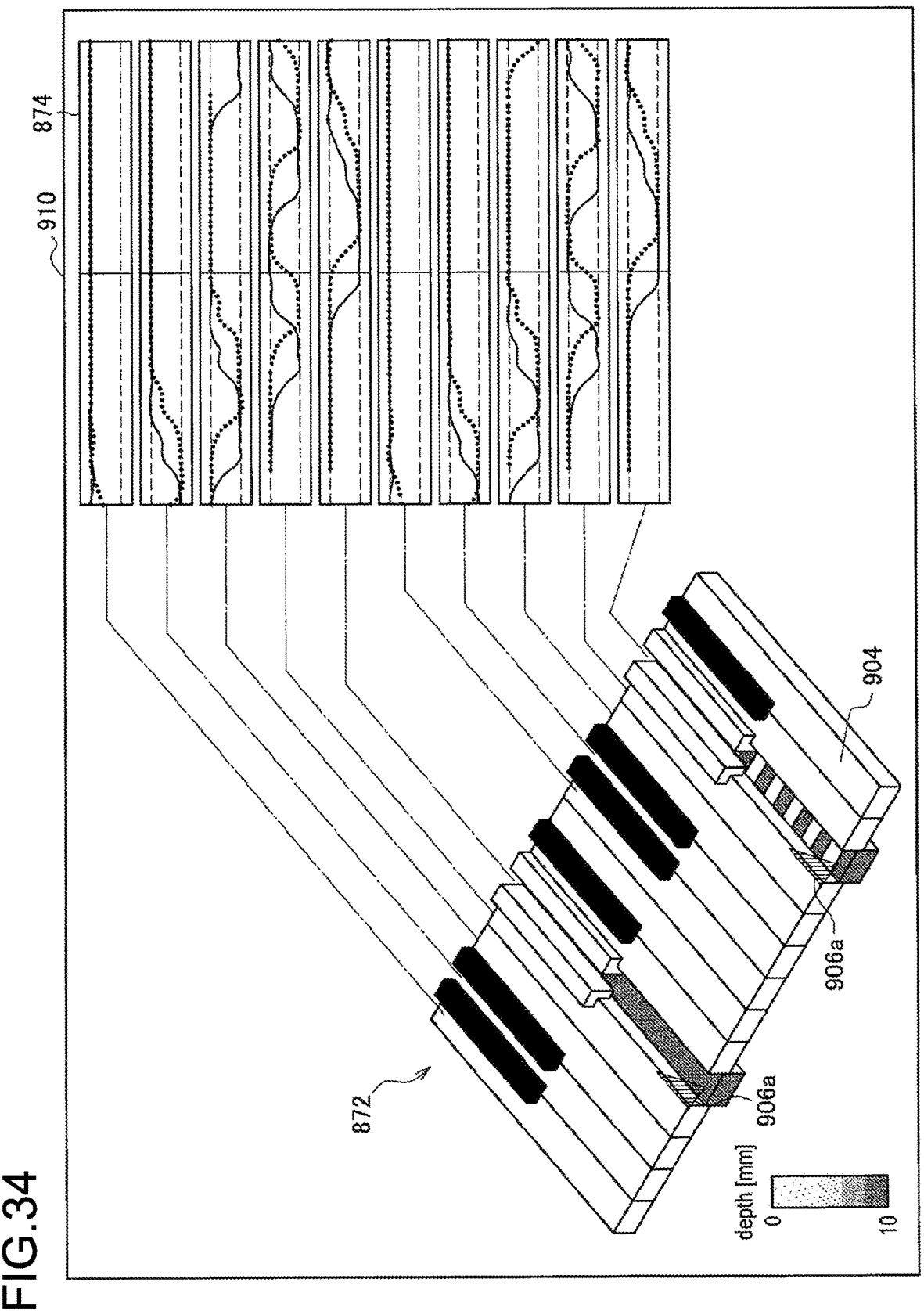
FIG. 34 is an (second) explanatory view to explain exemplary feedback according to the third embodiment of the disclosure.

It is possible to modify the above-described feedback method of the embodiment of the disclosure as follows. Exemplary various types of feedback will be described below as a third embodiment of the disclosure with reference to FIGS. 33 and 34. FIGS. 33 and 34 are explanatory views to explain the exemplary feedback according to the third embodiment of the disclosure.

As in the above-described embodiments, the user side device 70 provides feedback to a taught person based on the feedback information 506 that is received. Specifically, the user side device 70 displays a display screen 902 like that illustrated in FIG. 33 to the taught person during or after playing. The display screen 902 contains on its right a keyboard display screen 872 schematically representing a keyboard and contains on its left a time series data display 874 representing time series data of the speed of hand fingers of the taught person (or a player) pressing corresponding keyboards. The keyboard display screen 872 and the time series data display 874 are reproduction of moves of each keyboard in playing by the taught person, or the like, and the speed is changed or the area of the keyboards or playing to be reproduced is changed in reproduction, that is, the reproduction is enabled under condition required by the user.

Specifically, each keyboard 904 contained in the keyboard display screen 872 enables reproduction of motion of each keyboard caused by playing by the taught person (or the player) by animation (for example, reproduction animation speed can be set at a speed required by the user) and further enables representation, of displacement of keyboards that are pressed by the taught person, or the like, during playing using differences in color, gradations of color, and pattern. In the embodiment, for example, a corresponding keyboard 904 is represented in a thicker color as the keyboard moves down to be close to the bottom, and a corresponding keyboard 904 is represented, in a lighter color as the keyboard moves up. In the embodiment, it is possible to not only reproduce displacements of corresponding keyboards but also represent the displacements of the respective keyboards by color, which allows the user to easily know the displacement of each keyboard. In the embodiment, an animation that is a reproduction of motions of fingers, etc., based on the sensing data 500 acquired by another sensor device 10 (for example, the glove-type sensor device 10 mounted on the hands of the taught person or the muscle activity sensor device 60) may be displayed on each keyboard 904 in a superimposed manner.

In the embodiment, in synchronization with a motion of each keyboard 904 obtained by reproducing by animation a motion of each keyboard caused by playing by the taught person, playing sounds acquired in the playing may be reproduced. Furthermore, as for reproduction of the playing sounds, it is also possible to set a speed required by the user as in motion reproduction.

In addition, in the embodiment, the display screen 902 may display not only the displacement but also the moving speed. For example, on a timing display 906*a* that is triangular in FIG. 33 is displayed near the timing when the keyboard moving down speed (key pressing speed or moving speed) is at maximum and the timing display 906*b* that is triangular in FIG. 33 is displayed near the timing when the keyboard moving up speed is at maximum. The shape of the timing display 906 is not limited to the rectangular shape like that illustrated in FIG. 33. Bar displays 908*a* and 908*b* that are rectangular are bars representing the moving speed of a keyboard like bar charts. For example, the bars are displayed such that, when a keyboard moves down, the bar display 908 with a given color or pattern extends downward according to the moving speed of the keyboard and, on the other hand, when the keyboard moves up, the bar display 908 with a given color or pattern extends upward. In the embodiment, displaying using the timing displays 906 and the bar displays 908 allow the taught person, or the like, to instinctively know the moving speed of the keyboard, that is, the timing when the key pressing speed or the speed is at maximum.

In the embodiment, direct comparison with a role model that is a model is also enabled. For example, using a wire frame, or the like, motions of keyboards caused by role model playing serving as a model may be drawn by animation in a superimposed manner on motions of keyboards caused by playing by the taught person.

In the embodiment, feedback may be given using a display screen 910 like that illustrated in FIG. 34. As described above, the display screen 910 contains on its right the keyboard display screen 872 schematically representing a keyboard and contains on its left the time series data display 874 representing time series data of the speed of hand fingers of the taught person (or a player) pressing corresponding keyboards.

Furthermore, in the embodiment, an elastically deformable member formed of urethane, or the like, and a position sensor are set on the piano keyboard part. Specifically, in the embodiment, the member is arranged such that, when each keyboard moves down by only a given distance (for example, 10 mm), the member has contact with the bottom of the keyboard. Furthermore, the position sensor is arranged on the bottom surface of each keyboard. The position sensor is capable of measuring a position accurately and thus is capable of detecting a state in which, when a keyboard is pressed deeply, the bottom surface of the keyboard makes contact with the member and further pressing the keyboard deeply deforms the member slightly and accordingly the keyboard sinks deeper than the aforementioned given distance.

Thus, as illustrated in FIG. 34, the respective keyboards 904 contained in the keyboard display screen 872 enable reproduction of motion of each keyboard caused by playing by the taught person (or the player) by animation and representation of the depth of the keyboard that is pressed by the taught person (or player) during playing using differences in color, gradations of color, pattern, or the like.

Specifically, in FIG. 34, a stripe pattern of the keyboard 904 represents that the corresponding keyboard sinks deeper than the given distance, that is, the keyboard is pressed unnecessarily. Unnecessarily pressing a keyboard attenuates vibrancy and hardens the tone and further causes the player to use unnecessary energy and thus, in general, unnecessarily pressing a keyboard should be avoided. In the embodiment, the keyboard 904 is displayed in a different color, pattern, or the like, in order to represent that the corresponding keyboard sinks deeper than the given distance and this allows the taught person, or the like, to easily know the degree of pressing each keyboard and, as a result, the taught person, or the like, plays with an awareness of not unnecessarily pressing keyboards, which should be avoided in general.

8. SUPPLEMENT

The embodiments of the disclosure described above, for example, can cover a program for causing a computer to function as the information processing apparatus according to the embodiment and a non-temporal tangible medium in which the program is recorded. The program may be distributed via a communication network, such as the Internet (wireless communication also covered).

Each step of the processes of the above-described embodiments of the disclosure is not necessarily implemented according to the order described herein. For example, each step may be processed in a changed order as appropriate. Each step may be implemented in parallel partly or individually instead of being implemented chronologically. Furthermore, also as for the implementing method of each step, each step is not necessarily implemented according to the method described herein and each step may be implemented by another functional unit and using another method.

The preferable embodiments of the disclosure have been described in detail with reference to the accompanying drawings; however, the technical scope of the disclosure is not limited to the examples. It is obvious that those with general knowledge in the technical field of the disclosure can reach various exemplary modifications or exemplary corrections within the scope of technical idea described in the claims and it is understood that they naturally belong to the technical scope of the disclosure.

The effects described herein are explanatory and exemplary only and thus are not definitive. In other words, the technique according to the disclosure can achieve, together with the above-described effects or instead of the above-described effects, other effects obvious to those skilled in the art from the description herein.

The following configuration also belongs to the technical scope of the disclosure.

(1) An information processing device including:

a sensing data acquisition unit configured to acquire multiple sets of sensing data from at least one sensors configured to sense a condition of multiple movement elements in a performance that is performed because multiple parts of a body of a user move;

a calculator configured to calculate collaboration information representing move collaborativeness of the movement elements from the acquired multiple sets of sensing data; and a notification unit configured to notify the user of feedback information based on the calculated collaboration information.

(2) The information processing device according to (1), wherein the calculator is configured to calculate collaboration information on the movement elements having a relationship with a performance condition that is set, previously.

(3) The information processing device according to (2), further comprising a storage configured to store relationship information representing relationships between various performance conditions and the collaboration information on the movement elements having a relationship with each of the performance conditions, wherein the calculator is configured, to calculates the collaboration information from the acquired multiple sets of sensing data based on the relationship information that is stored previously in the storage.

(4) The information processing device according to (3), further comprising a learning unit configured to, using the multiple sets of sensing data corresponding respectively to the performance conditions, perform machine learning on the relationship between the various performance conditions and the collaboration information on the movement elements and learns the relationship information.

(5) The information processing device according to (4), wherein the learning unit is configured to perform multivariate analysis on the relationship information and extracts, as first feature information, the collaboration information that features each of the performance conditions.

(6) The information processing device according to (4), wherein the learning unit is configured to extract, as second feature information, the collaboration information that features the performance of the user based on the acquired multiple sets of sensing data.

(7) The information processing device according to (6), wherein the learning unit is configured to classify a condition of the performance of the user based on the second feature information.

(8) The information processing device according to (5), further comprising a comparator configured to select the first feature information that relates to the performance condition that is set previously, compare the selected first feature information and the collaboration information on the user that is calculated by the calculator with each other, and generate the feedback information based on a result of the comparing.

(9) The information processing device according to (8), wherein the notification unit is configured to select a mode of notification of the generated feedback information based on the feedback information.

(10) The information processing device according to (9), wherein the notification unit is configured to notify the user of the feedback information by controlling a display device to display a given image.

(11) The information processing device according to (10), wherein the notification unit is configured to notify the user of the feedback information by displaying a position on a keyboard that is pressed by the user.

(12) The information processing device according to (10) or (11), wherein the notification unit is configured to notify the user of the feedback information by displaying a change over time in at least one of a displacement, a moving speed, and a moving acceleration of the key that is pressed by the user.

(13) The information processing device according to (12), wherein the user is notified of the feedback information by displaying, together with the change over time, a time at which the keyboard starts moving down, a time at which the keyboard ends moving down, a time at which the keyboard starts moving up, a time at which the keyboard ends moving up and a time at which a maximum speed is reached and a time at which a maximum acceleration is reached while the keyboard is moving down or moving up.

(14) The information processing device according to (12) or (13), wherein the notification unit is configured to display a score corresponding to key pressing by the user in synchronization with the change over time.

(15) The information processing device according to (9), wherein the notification unit is configured to notify the user of the feedback information by controlling a wearable device that is worn on the body of the user to cause a tactile stimulation on the user.

(16) The information processing device according to (15), wherein the notification unit is configured to notify the user of the feedback information by causing a tactile stimulation on the user based on a result of comparing an amount of muscle activity of part of the user and a threshold with each other.

(17) The information processing device according to (9), wherein the notification unit is configured, to notify the user of the feedback information by controlling an audio output device to output a given sound.

(18) The information processing device according to (8), further comprising an attribute information acquisition unit configured to acquire attribute information on the user, wherein the comparator is configured to select the first feature information based on the acquired, attribute information.

(19) The information processing device according to (2), wherein the performance condition is represented by at least one of movement patterns, movement speeds, movement accuracies, and amounts of movement of the movement elements of the user in the performance.

(20) The information processing device according to (2), wherein the condition of the performance is represented by a condition of a result caused by the performance.

(21) The information processing device according to any one of (1) to (20), wherein the multiple sets of sensing data include at least one of sets of sensing data obtained from an acceleration sensor, a gyro sensor, an angular velocity sensor, a vibration sensor, a pressure sensor, a biological information sensor, a bending sensor, and a position sensor.

(22) The information processing device according to any one of (1) to (21), wherein the multiple sets of sensing data include at least one of sets of sensing data obtained from an imaging device that captures images of the user, a pressure sensor that senses a pressure that is applied by part of the body of the user, and a nuclear magnetic resonance sensor that senses a nuclear magnetic resonance in the user.

(23) The information processing device according to any one of (1) to (22), wherein the multiple sets of sensing data include at least one of sets of sensing data obtained from a photoreflector sensor that senses motions of the keyboard that is pressed by part of the body of the user.

(24) The information processing device according to (23), wherein the photoreflector sensor is detachably arranged under keyboards of various pianos.

(25) The information processing device according to any one of (1) to (24), wherein the multiple sets of sensing data include sensing data obtained from a sound pickup device that senses sound that is caused by the performance.

(26) An information processing method comprising:
acquiring multiple sets of sensing data from at least one sensors configured to sense a condition of multiple movement elements in a performance that is performed because multiple parts of a body of a user move;
calculating collaboration information representing move collaborativeness of the movement elements from, the acquired multiple sets of sensing data; and
notifying the user of feedback information based on the calculated collaboration information.

(27) A program for causing a computer to implement functions comprising:
acquiring multiple sets of sensing data from at least one sensors configured to sense a condition of multiple movement elements in a performance that is performed because multiple parts of a body of a user move;
calculating collaboration information representing move collaborativeness of the movement elements from the acquired multiple sets of sensing data; and
notifying the user of feedback information based on the calculated collaboration information.

REFERENCE SIGNS LIST

1 INFORMATION PROCESSING SYSTEM
10 SENSOR DEVICE
20 PRESSURE SENSOR DEVICE
30 SERVER
40 PHOTOREFLECTOR SENSOR DEVICE
60 MUSCLE ACTIVITY SENSOR DEVICE
70 USER SIDE DEVICE
90 NETWORK
100 SENSOR UNIT
140, 340, 740 MAIN CONTROLLER
142, 342 DATA ACQUISITION UNIT
144, 344 PROCESSOR
152, 352 OUTPUT CONTROLLER
160, 360, 760 COMMUNICATION UNIT
190 ELECTRODE
192, 824a, 824b, 844 MARKER
194 HIGH-SPEED PHOTOGRAPHY CAMERA
110 196, 200 PRESSURE SENSOR
198 MICROPHONE
202 PROTRUSION
204 HOLE
210, 410, 620 AD CONVERTER
212, 412, 632, 900 INFORMATION PROCESSING DEVICE
300 INPUT UNIT
310 OUTPUT UNIT
346 CALCULATOR
348 LEARNING UNIT
350 COMPARATOR
370, 770 STORAGE
372 DB
400 PHOTOREFLECTOR SENSOR
400a LIGHT EMITTING DEVICE
400b LIGHT RECEIVING DEVICE
402 SUBSTRATE
500 SENSING DATA
502 PLAYING CONDITION
504 COLLABORATION LEVEL
506 FEEDBACK INFORMATION
600 WHITE KEY
604, 838, 904 KEYBOARD
604a UPPER KEYBOARD
604b LOWER KEYBOARD
610 MYOELECTRIC POTENTIAL SENSOR
612 VIBRATOR
630 MICRO CONTROLLER
680 MYOELECTRIC POTENTIAL SENSING DATA
682 THRESHOLD
690 SKIN
692 MUSCLE
710 HAPTIC MECHANISM
712 EXOSKELETON ROBOT
712a EXOSKELETON MEMBER
714 DISPLAY UNIT
716 AUDIO OUTPUT UNIT
800, 806, 820, 862, 870, 880, 880a, 902, 910 DISPLAY SCREEN
802, 808, 864 HAND FINGER. DISPLAY SCREEN
804 CONFORMITY INDEX BAR
810 VECTOR
832, 834, 840, 866 IMAGING IMAGE
822, 836, 872, 882 KEYBOARD DISPLAY SCREEN
826 KEY: PRESSING FORCE DISPLAY SCREEN
842L 842a, 842b, 842c TIME SERIES DATA
842d TIME SERIES INTERVAL
850 WINDOW
868 AREA DISPLAY
874, 884 TIME SERIES DATA
876 SPEED DISPLAY
886 SCORE DISPLAY SCREEN
888 SLIDE BAR
890 FRAME
906, 906a, 906b TIMING DISPLAY
908, 908a, 908b BAR DISPLAY
950 CPU
952 ROM
934 RAM
956 RECORDING MEDIUM
958 INPUT OUTPUT INTERFACE
960 HAPTIC DEVICE
962 DISPLAY DEVICE
964 AUDIO OUTPUT DEVICE
968 COMMUNICATION INTERFACE
970 BUS

The invention claimed is:

1. An information processing device comprising:
a sensing data acquisition unit configured to acquire multiple sets of sensing data from a plurality of sensors configured to sense a condition of multiple movement elements in a performance that is performed because multiple parts of a body of a user move;
a calculator configured to calculate collaboration information representing a level of move collaborativeness of the movement elements from the acquired multiple sets of sensing data; and
a notification unit configured to notify the user of feedback information based on the calculated collaboration information,
wherein the level of move collaborativeness is acquired by calculating similarity of the movement elements among the acquired multiple sets of sensing data, and
wherein the sensing data acquisition unit, the calculator, and the notification unit are each implemented via at least one processor.

2. The information processing device according to claim 1, wherein the calculator calculates the collaboration information on the movement elements having a relationship with a performance condition that is set previously.

3. The information processing device according to claim 2, further comprising:
a storage configured to store relationship information representing relationships between various performance conditions and the collaboration information on the movement elements having a relationship with each of the performance conditions,
wherein the calculator calculates the collaboration information from the acquired multiple sets of sensing data based on the relationship information that is stored previously in the storage, and
wherein the storage is implemented via at least one non-transitory computer-readable storage medium.

4. The information processing device according to claim 3, further comprising:
a learning unit configured to, using the multiple performance conditions and the multiple sets of sensing data corresponding to each of the multiple performance conditions, perform machine learning on the relationship between the various performance conditions and the collaboration information on the movement elements in order to learn the relationship information,
wherein the learning unit is implemented via at least one processor.

5. The information processing device according to claim 4,
wherein the learning unit is further configured to
perform multivariate analysis on the relationship information, and
extract, as first feature information, the collaboration information that features each of the performance conditions.

6. The information processing device according to claim 5,
wherein the learning unit is further configured to extract, as second feature information, the collaboration information that features the performance of the user based on the acquired multiple sets of sensing data.

7. The information processing device according to claim 6,
wherein the learning unit is further configured to classify a condition of the performance of the user based on the second feature information.

8. The information processing device according to claim 5, further comprising:
a comparator configured to
select the first feature information that relates to the performance condition that is set previously,
compare the selected first feature information and the collaboration information on the user that is calculated by the calculator with each other, and
generate the feedback information based on a result of the comparing;
wherein the comparator is implemented via at least one processor.

9. The information processing device according to claim 8,
wherein the notification unit is further configured to select a mode of notification of the generated feedback information based on the feedback information.

10. The information processing device according to claim 9,
wherein the notification unit notifies the user of the feedback information by at least one of controlling a display device to display a given image, controlling a wearable device that is worn on the body of the user to perform a tactile stimulation on the user, or controlling an audio output device to output a given sound.

11. The information processing device according to claim 10,
wherein the notification unit notifies the user of the feedback information by displaying a position on a keyboard that is pressed by the user.

12. The information processing device according to claim 10,
wherein the notification unit notifies the user of the feedback information by displaying a change over time in at least one of a displacement, a moving speed, or a moving acceleration of the key that is pressed by the user.

13. The information processing device according to claim 8, further comprising
an attribute information acquisition unit configured to acquire attribute information on the user,
wherein the comparator selects the first feature information based on the acquired attribute information, and
wherein the attribute information acquisition unit is implemented via at least one processor.

14. The information processing device according to claim 2,
wherein the performance condition is represented by at least one of movement patterns, movement speeds, movement accuracies, amounts of movement of the movement elements of the user in the performance, or a condition of a result caused by the performance.

15. The information processing device according to claim 1,
wherein the multiple sets of sensing data include at least one of sets of sensing data obtained from an acceleration sensor, a gyro sensor, an angular velocity sensor, a vibration sensor, a pressure sensor, a biological information sensor, a bending sensor, or a position sensor.

16. The information processing device according to claim 1,
wherein the multiple sets of sensing data include at least one of sets of sensing data obtained from an imaging device that captures images of the user, a pressure sensor that senses a pressure that is applied by part of the body of the user, or a nuclear magnetic resonance sensor that senses a nuclear magnetic resonance in the user.

17. The information processing device according to claim 1,
wherein the multiple sets of sensing data include sets of sensing data obtained from a photoreflector sensor that senses motions of a keyboard that is pressed by at least one part of the body of the user.

18. The information processing device according to claim 1,
wherein the multiple sets of sensing data include sensing data obtained from a sound pickup device configured to sense sound that is caused by the performance.

19. An information processing method comprising:
acquiring multiple sets of sensing data from a plurality of sensors configured to sense a condition of multiple movement elements in a performance that is performed because multiple parts of a body of a user move;
calculating collaboration information representing a level of move collaborativeness of the movement elements from the acquired multiple sets of sensing data; and notifying the user of feedback information based on the calculated collaboration information,
wherein the level of move collaborativeness is acquired by calculating similarity of the movement elements among the acquired multiple sets of sensing data.

20. A non-transitory computer-readable storage medium having embodied thereon a program, which when executed by a computer causes the computer to execute a method, the method comprising:
acquiring multiple sets of sensing data from a plurality of sensors configured to sense a condition of multiple movement elements in a performance that is performed because multiple parts of a body of a user move;
calculating collaboration information representing a level of move collaborativeness of the movement elements from the acquired multiple sets of sensing data; and
notifying the user of feedback information based on the calculated collaboration information,
wherein the level of move collaborativeness is acquired by calculating similarity of the movement elements among the acquired multiple sets of sensing data.

* * * * *